(12) United States Patent
Sasada et al.

(10) Patent No.: US 7,070,838 B2
(45) Date of Patent: Jul. 4, 2006

(54) LIQUID CRYSTALLINE COMPOUND, LIQUID CRYSTAL COMPOSITION AND THEIR POLYMERS

(75) Inventors: Yasuyuki Sasada, Chiba (JP); Motoki Yanai, Chiba (JP)

(73) Assignees: Chisso Petrochemical Corporation, Tokyo (JP); Chisso Corporation, Osaka (JP)

( * ) Notice: Subject to any disclaimer, the term of this patent is extended or adjusted under 35 U.S.C. 154(b) by 190 days.

(21) Appl. No.: 10/873,280

(22) Filed: Jun. 23, 2004

(65) Prior Publication Data
US 2005/0007541 A1 Jan. 13, 2005

(30) Foreign Application Priority Data
Jun. 23, 2003 (JP) ............................ 2003-177672

(51) Int. Cl.
| | |
|---|---|
| C09K 19/52 | (2006.01) |
| C09K 19/30 | (2006.01) |
| C09K 19/32 | (2006.01) |
| C09K 19/34 | (2006.01) |
| C09K 19/12 | (2006.01) |
| C09K 19/20 | (2006.01) |
| C09K 19/38 | (2006.01) |
| C08F 18/20 | (2006.01) |
| C07C 25/17 | (2006.01) |
| C07C 25/24 | (2006.01) |
| C07C 69/76 | (2006.01) |

(52) U.S. Cl. .................. 428/1.1; 428/1.3; 252/299.01; 252/299.61; 252/299.62; 252/299.63; 252/299.64; 252/299.65; 252/299.66; 252/299.67; 252/299.7; 570/127; 570/128; 570/129; 570/183; 560/62; 560/65; 560/83; 349/117; 526/326; 526/329.7

(58) Field of Classification Search ........... 252/299.01, 252/299.61, 299.62, 299.63, 299.64, 299.65, 252/299.66, 299.67, 299.7; 570/127, 128, 570/129, 183; 560/62, 65, 83; 349/117; 428/1.1, 1.3; 526/326, 329.7
See application file for complete search history.

(56) References Cited

U.S. PATENT DOCUMENTS

| | | | |
|---|---|---|---|
| 6,491,990 B1 | 12/2002 | Parri et al. | |
| 6,660,344 B1 * | 12/2003 | Lub ............................ | 428/1.1 |
| 6,666,989 B1 * | 12/2003 | Toyne et al. ........... | 252/299.01 |
| 6,894,141 B1 * | 5/2005 | Satoh et al. ................ | 528/196 |
| 2003/0011725 A1 * | 1/2003 | Ohkawa et al. .............. | 349/96 |
| 2004/0173773 A1 * | 9/2004 | Matsumoto et al. ... | 252/299.61 |
| 2004/0209006 A1 * | 10/2004 | Matsumoto et al. ......... | 428/1.1 |
| 2005/0031801 A1 * | 2/2005 | Shundo et al. ............... | 428/1.1 |
| 2005/0082513 A1 * | 4/2005 | Seki et al. ............. | 252/299.01 |
| 2005/0101752 A1 * | 5/2005 | Matsumoto et al. ........ | 526/319 |
| 2005/0213009 A1 * | 9/2005 | Yanai et al. ................. | 349/137 |
| 2005/0224757 A1 * | 10/2005 | Syundo et al. ......... | 252/299.61 |

FOREIGN PATENT DOCUMENTS

| | | |
|---|---|---|
| EP | 0 466 183 | 1/1992 |
| EP | 1 209 515 | 5/2002 |
| JP | 8-3111 | 1/1996 |
| JP | 2002-003845 | 1/2002 |
| JP | 2002-212561 | 7/2002 |
| JP | 2002-332484 | 11/2002 |

OTHER PUBLICATIONS

Dirk J. Broer et al., "In-situ photopolymerization of oriented liquid-crystalline acrylate, 3$^{a)}$, Oriented polymer networks from a mesogenic diacrylate", Makromol. Chem., 190, 2255-2268, 1989.

* cited by examiner

*Primary Examiner*—Shean C. Wu
(74) *Attorney, Agent, or Firm*—Wenderoth, Lind & Ponack, L.L.P.

(57) ABSTRACT

The present invention provides a compound represented by formula (1) defined in the specification and a liquid crystal composition comprising the compound. The invention further provides a polymer obtained by polymerization of compound or composition above, and further the present invention provides a film, an optical anisotropic material, A ¼ or ½ wavelength functional plate, an optical compensation element, an optical element and a liquid crystal display element employing the polymer.

57 Claims, No Drawings

LIQUID CRYSTALLINE COMPOUND, LIQUID CRYSTAL COMPOSITION AND THEIR POLYMERS

BACKGROUND OF THE INVENTION

1. Field of the Invention

The present invention relates to liquid crystalline compounds comprising a polymerizable functional group and 2-trifluoromethyl- or 2-difluoromethyl-1,4-phenylene, as well as to compositions comprising the compounds, and their polymers and uses thereof.

2. Related Art

Polymerization of polymerizable liquid crystal compounds aligned in the nematic state yields polymers having fixed alignment states and exhibiting optical anisotropy. Polymers with optical anisotropy are employed as optical compensation films for liquid crystal display elements. One commonly used polymerizable liquid crystal compound is 1,4-bis(4-(substituted)-benzoyloxy)benzene (see Non-patent document 1, Patent document 1).

On the other hand, the optical compensation film must have optimum alignment, depending on the construction and purpose of use of the liquid crystal display element, in order to exhibit its maximum optical compensation function. Specifically, it is necessary to exhibit planar, homeotropic, hybrid, tilted and twisted alignments at appropriate times. The state of alignment is determined by the chemical structure of the material. Polymerizable compounds have therefore been desired which easily exhibit desired alignments (see Patent document 2).

Monofunctional polymerizable liquid crystal compounds containing 2-trifluoromethyl- or 2-difluoromethyl-1,4-phenylene, compounds with sulfoxyl groups, compounds with urethane bonds, compounds with —C≡C— among the bonding groups, compounds with silacyclohexane rings and compounds with —N═N— among the bonding groups are disclosed in the prior art documents listed below (see Patent documents 1,3–7).

Patent document 1: U.S. Pat. No. 6,491,990

Patent document 2: JP-A 8-3111/1996

Patent document 3: JP-A 332484/2002

Patent document 4: JP-A 212561/2002

Patent document 5: JP-A 3845/2002

Patent document 6: EP466183

Patent document 7: EP1209515

Non-patent document 1: Macromoleculare Chemie 1989, 190, 2255–2268

Nevertheless, no polymerizable liquid crystal compounds have been known which easily exhibit desired molecular alignments. It is an object of the present invention to solve this problem of the prior art.

SUMMARY OF THE INVENTION

The present invention comprises a compound (the following item A), a liquid crystal composition (the following item B), a polymer (the following item C) obtained by the compound or the composition and the uses of the polymer including a film, an optical anisotropic material, a ¼ wavelength functional plate, a ½ wavelength functional plate, an optical compensation element, an optical element and a liquid crystal display element.

A. A compound represented by the following formula (1):

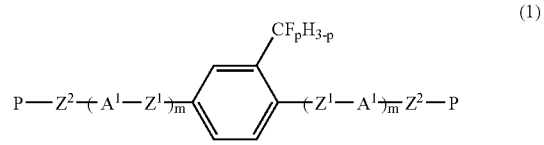

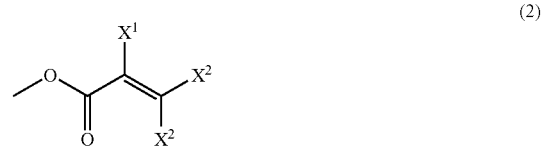

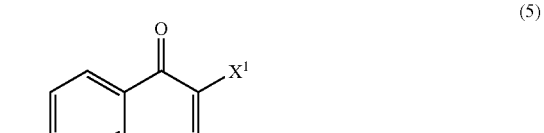

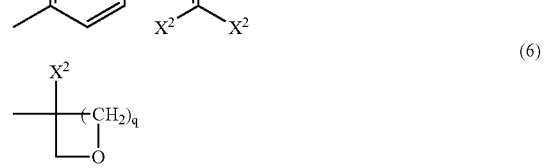

wherein identical symbols in these formulas may have the same structure or they may have independently different structures; each P is independently a polymerizable group of any of formulas (2) to (6) above; each $A^1$ is independently 1,4-cyclohexylene, 1,4-cyclohexenylene, 1,4-phenylene, naphthalene-2,6-diyl, tetrahydronaphthalene-2,6-diyl, fluorene-2,7-diyl, or bicyclo[2.2.2]octane-1,4-diyl, where any —$CH_2$— of these rings is optionally replaced with —O—, any —CH═ is optionally replaced with —N═, and any hydrogen is optionally replaced with a halogen, C1–5 alkyl or halogenated alkyl; each $Z^1$ is independently a single bond, —$(CH_2)_2$—, —$(CF_2)_2$—, —$(CH_2)_4$—, —$CH_2O$—, —$OCH_2$—, —COO—, —OCO—, —CH═CH—, —CF═CF—, —C≡C—, —C≡C—COO—, —OCO—C≡C—, —CH═CH—COO—, —OCO—CH═CH—, —$(CH_2)_2$—COO—, —OCO—$(CH_2)_2$—, —C≡C—CH═CH—, —CH═CH—C≡C—, —$OCF_2$—, or —$CF_2O$—; each $Z^2$ is independently a single bond or C1–20 alkylene, where any —$CH_2$— in the alkylene is optionally replaced with —O—, —S—, —COO—, or —OCO—; $X^1$ is hydrogen, a halogen, $CF_3$ or C1–5 alkyl; each $X^2$ is independently hydrogen, a halogen or C1–5 alkyl; m and n are each independently 0, 1 or 2; each p is 2 or 3; each q is 0 or 1; and when at least one $Z^1$ is —C≡C—, P is formula (3), (4) or (5).

B. A liquid crystal composition comprising at least two compounds, wherein at least one of the compounds is the compound according to compound A above.

C. A polymer comprising at least one of the constituent units represented by the following formulas (2p) to (6p):

(2p)
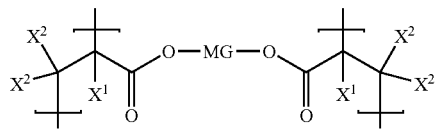

(3p)
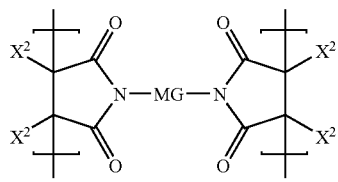

(4p)
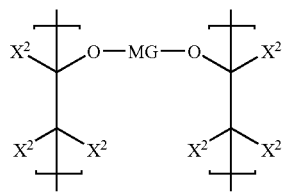

(5p)
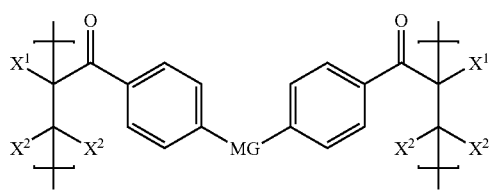

(6p)
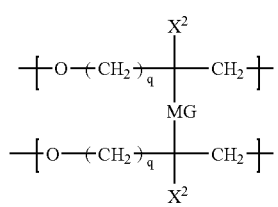

(1p)
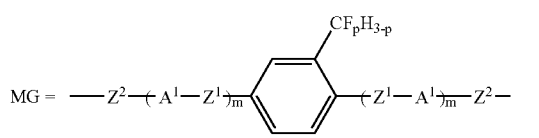

wherein MG represents the mesomorphic residue portion (1p) of formula (1); each $A^1$ is independently 1,4-cyclohexylene, 1,4-cyclohexenylene, 1,4-phenylene, naphthalene-2,6-diyl, tetrahydronaphthalene-2,6-diyl, fluorene-2,7-diyl, or bicyclo[2.2.2]octane-1,4-diyl, where any —$CH_2$— of these rings is optionally replaced with —O—, any —CH= is optionally replaced with —N=, and any hydrogen is optionally replaced with a halogen, C1–5 alkyl or halogenated alkyl; each $Z^1$ is independently a single bond, —$(CH_2)_2$—, —$(CF_2)_2$—, —$(CH_2)_4$—, —$CH_2O$—, —$OCH_2$—, —COO—, —OCO—, —CH=CH—, —CF=CF—, —C≡C—, —C≡C—COO—, —OCO—C≡C—, —CH=CH—COO—, —OCO—CH=CH—, —$(CH_2)_2$—COO—, —OCO—$(CH_2)_2$—, —C≡C—CH=CH—, —CH=CH—C≡C—, —$OCF_2$—, or —$CF_2O$—; each $Z^2$ is independently a single bond or C1–20 alkylene, where any —$CH_2$— in the alkylene is optionally replaced with —O—, —S—, —COO—, or —OCO—; $X^1$ is hydrogen, a halogen, $CF_3$ or C1–5 alkyl; each $X^2$ is independently hydrogen, a halogen or C1–5 alkyl; m and n are each independently 0, 1 or 2; each p is 2 or 3; each q is 0 or 1; with the proviso that $Z^1$ is not —C≡C— in formulas (2p) and (6p).

DETAILED DESCRIPTION

As a result of much research carried out with the aim of achieving the aforestated object, the present inventors have discovered that liquid crystalline compounds comprising a polymerizable functional group and 2-trifluoromethyl- or 2-difluoromethyl-1,4-phenylene have the properties described above, and can be employed as polymerizable liquid crystalline compounds which are useful as materials for optical compensation films for liquid crystal display elements. It was also discovered that the compounds of the invention exhibit a liquid crystal phase and have other excellent properties such as satisfactory compatibility with other liquid crystalline compounds. In addition, the compounds of the invention have excellent polymerizability and readily yield polymers with high degrees of polymerization by photoirradiation for short periods. A shorter photopolymerization period is advantageous for fixing of the alignment of liquid crystals. The compounds of the invention also give polymers with high polymerization degrees by thermal polymerization. Moreover, the compounds of the invention have excellent adhesion with other substrates, glass, triacetylcellulose and the like, which is an advantage for the assembly of optical compensation films for liquid crystal display elements. The invention has the following construction:

1. A compound represented by the following formula (1):

(1)
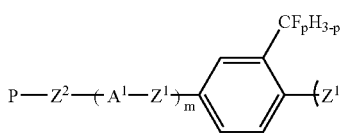

(2)
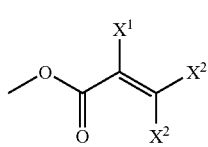

(3)
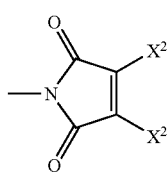

(4)
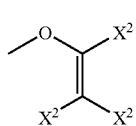

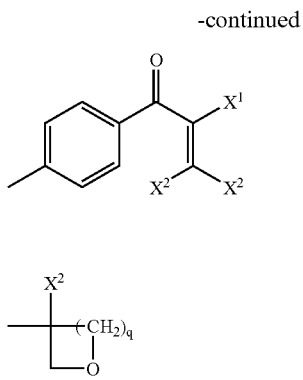
(5)

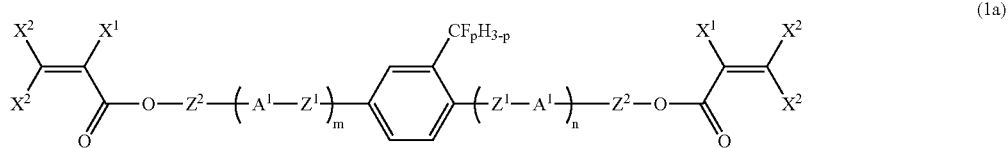
(6)

wherein identical symbols in these formulas may have the same structure or they may have independently different structures; each P is independently a polymerizable group of any of formulas (2) to (6) above; each $A^1$ is independently 1,4-cyclohexylene, 1,4-cyclohexenylene, 1,4-phenylene, naphthalene-2,6-diyl, tetrahydronaphthalene-2,6-diyl, fluorene-2,7-diyl, or bicyclo[2.2.2]octane-1,4-diyl, where any —CH$_2$— of these rings is optionally replaced with —O—, any —CH= is optionally replaced with —N=, and any hydrogen is optionally replaced with a halogen, C1–5 alkyl or halogenated alkyl; each $Z^1$ is independently a single bond, —(CH$_2$)$_2$—, —(CF$_2$)$_2$—, —(CH$_2$)$_4$—, —CH$_2$O—, —OCH$_2$—, —COO—, —OCO—, —CH=CH—, —CF=CF—, —C≡C—, —C≡C—COO—, —OCO—C≡C—, —CH=CH—COO—, —OCO—CH=CH—, —(CH$_2$)$_2$—COO—, —OCO—(CH$_2$)$_2$—, —C≡C—CH=CH—, —CH=CH—C≡C—, —OCF$_2$—, or —CF$_2$O—; each $Z^2$ is independently a single bond or C1–20 alkylene, where any —CH$_2$— in the alkylene is optionally replaced with —O—, —S—, —COO—, or —OCO—; $X^1$ is hydrogen, a halogen, CF$_3$ or C1–5 alkyl; each $X^2$ is independently hydrogen, a halogen or C1–5 alkyl; m and n are each independently 0, 1 or 2; each p is 2 or 3; each q is 0 or 1; and when at least one $Z^1$ is —C≡C—, P is formula (3), (4) or (5).

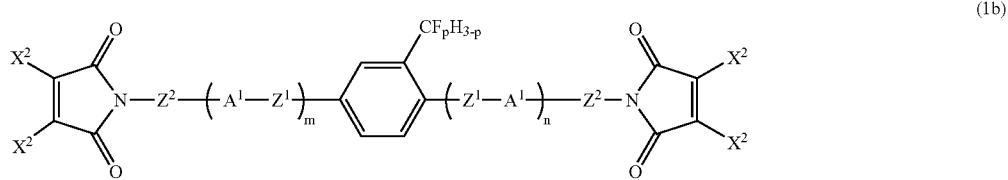
(1a)

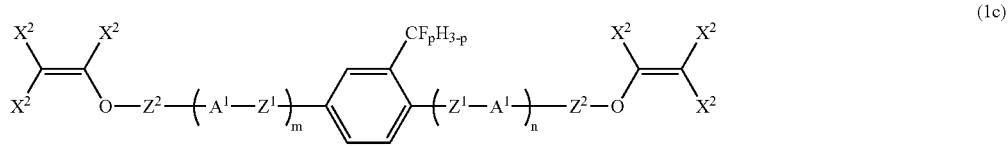
(1b)

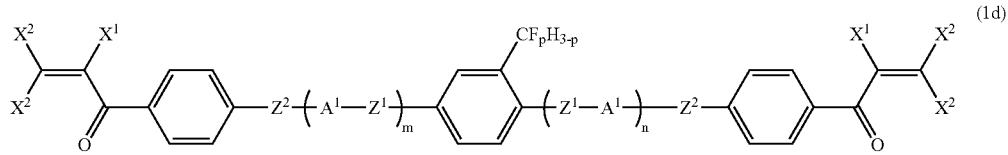
(1c)

(1d)

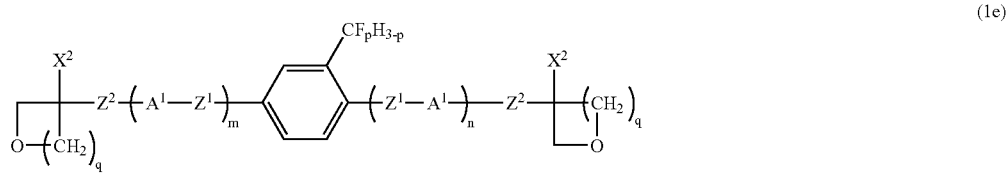
(1e)

wherein $A^1$, $Z^1$, $Z^2$, $X^1$, $X^2$, m, n, p and q are as defined above.

5. The compound according to item 4, wherein each $A^1$ in formulas (1a) to (1e) is independently 1,4-cyclohexylene or 1,4-phenylene.

6. The Compound according to item 4, wherein each $A^1$ in formulas (1a) to (1e) is independently 1,4-cyclohexylene or 1,4-phenylene, and each $Z^1$ is independently a single bond, —(CH$_2$)$_2$—, —COO— or —OCO—.

7. The compound according to item 4, wherein each $A^1$ in formulas (1a) to (1e) is independently 1,4-cyclohexylene or 1,4-phenylene, and each $Z^1$ is independently —CH$_2$O—, —OCH$_2$—, —CH═CH—COO—, —OCO—CH═CH—, —(CH$_2$)$_2$—COO— or —OCO—(CH$_2$)$_2$—.

8. The compound according to item 4, wherein each $Z^2$ in formulas (1a) to (1e) is independently a single bond, linear C1–20 alkylene, linear C3–20 alkylene having any one of —CH$_2$— optionally replaced with —O—, —S—, —COO— or —OCO—, or linear C4–20 alkylene having any two of —CH$_2$— optionally replaced with —O— or —S—, with the proviso that both —$Z^2$—P and P—$Z^2$— in formula (1) have none of moieties including —O—O—, —O—S—, —S—O— and —S—S—.

9. The compound according to item 4, wherein each $A^1$ in formulas (1a) to (1e) is independently 1,4-cyclohexylene or 1,4-phenylene, and each $Z^2$ is independently a single bond, linear C1–20 alkylene, linear C3–20 alkylene having any one of —CH$_2$— optionally replaced with —O—, —S—, —COO— or —OCO—, or linear C4–20 alkylene having any two of —CH$_2$— optionally replaced with —O— or —S—, with the proviso that both —$Z^2$—P and P—$Z^2$— in formula (1) have none of moieties including —O—O—, —O—S—, —S—O— and —S—S—.

10. The compound according to item 4, wherein each $A^1$ in formulas (1a) to (1e) is independently 1,4-cyclohexylene or 1,4-phenylene, and each $Z^1$ is independently a single bond, —(CH$_2$)$_2$—, —COO—, —OCO—, —CH$_2$O—, —OCH$_2$—, —CH═CH—COO—, —OCO—CH═CH—, —(CH$_2$)$_2$—COO— or —OCO—(CH$_2$)$_2$—, and each $Z^2$ is independently a single bond, linear C1–20 alkylene, linear C3–20 alkylene having any one of —CH$_2$— optionally replaced with —O—, —S—, —COO— or —OCO—, or linear C4–20 alkylene having any two of —CH$_2$— optionally replaced with —O— or —S—, with the proviso that both —$Z^2$—P and P—$Z^2$— in formula (1) have none of moieties including —O—O—, —O—S—, —S—O— and —S—S—.

11. The compound according to item 4, wherein each of $X^1$ and $X^2$ in formulas (1a) to (1e) is independently fluorine or chlorine.

12. The compound according to item 4, wherein each $A^1$ in formulas (1a) to (1e) is independently 1,4-cyclohexylene or 1,4-phenylene, and each $Z^1$ is independently a single bond, —(CH$_2$)$_2$—, —COO—, —OCO—, —CH$_2$O—, —OCH$_2$—, —CH═CH—COO—, —OCO—CH═CH—, —(CH$_2$)$_2$—COO— or —OCO—(CH$_2$)$_2$—, and each $Z^2$ is independently a single bond, linear C1–20 alkylene, linear C3–20 alkylene having any one of —CH$_2$— optionally replaced with —O—, —S—, —COO— or —OCO—, or linear C4–20 alkylene having any two of —CH$_2$— optionally replaced with —O— or —S—, with the proviso that both —$Z^2$—P and P—$Z^2$— in formula (1) have none of moieties including —O—O—, —O—S—, —S—O— and —S—S—, and each of $X^1$ and $X^2$ is independently fluorine or chlorine.

13. A compound represented by any one of the following formulas:

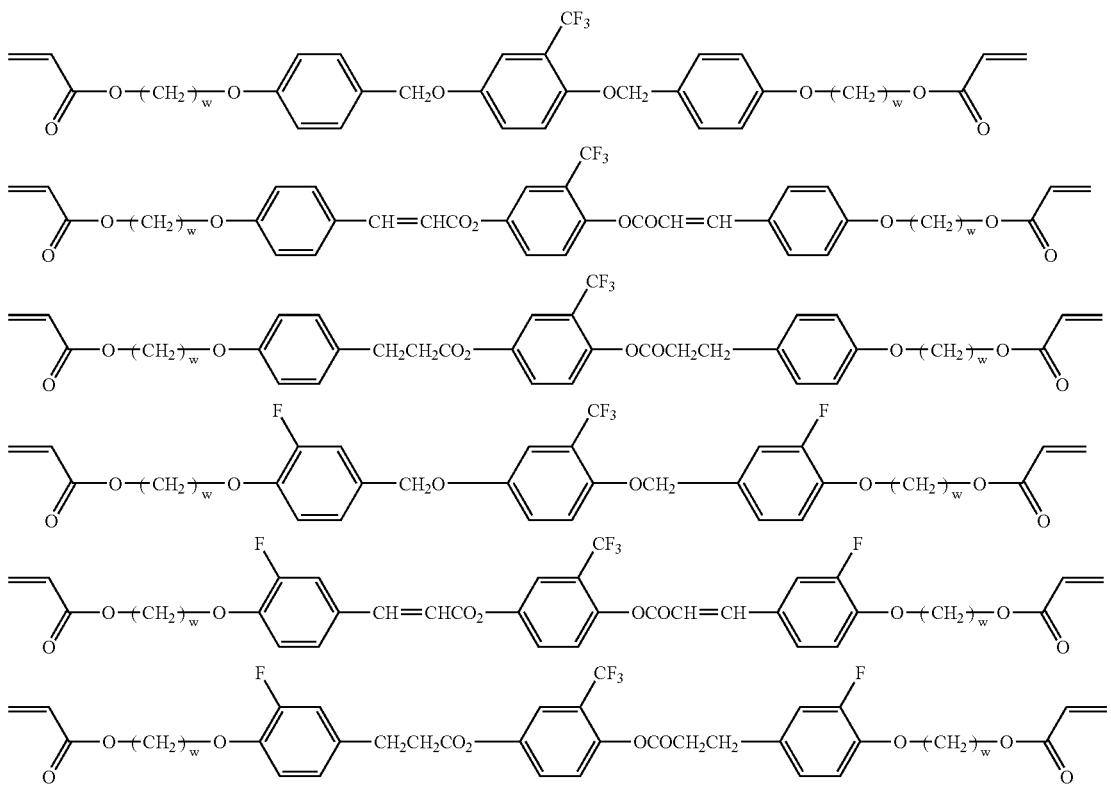

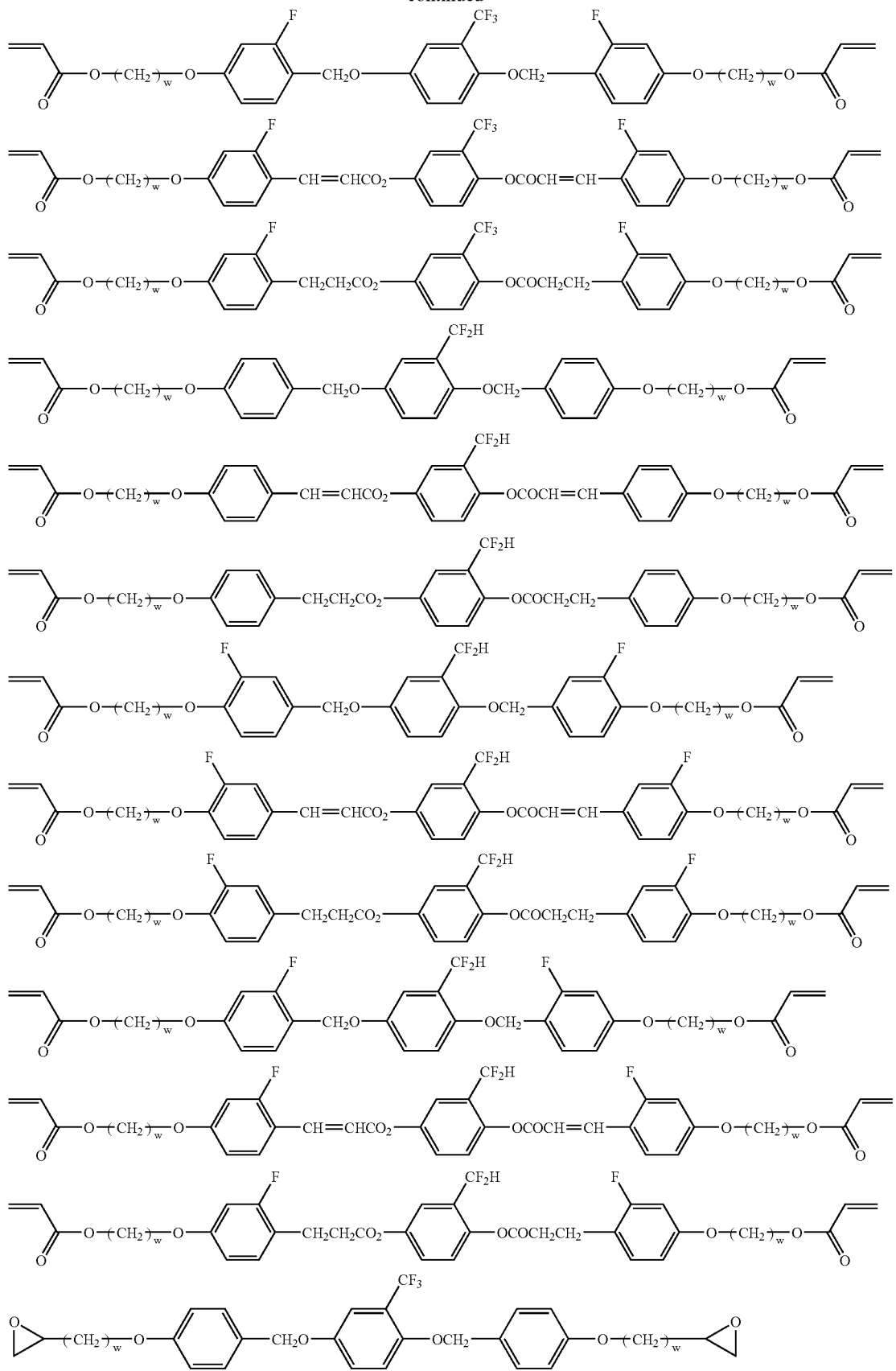

-continued
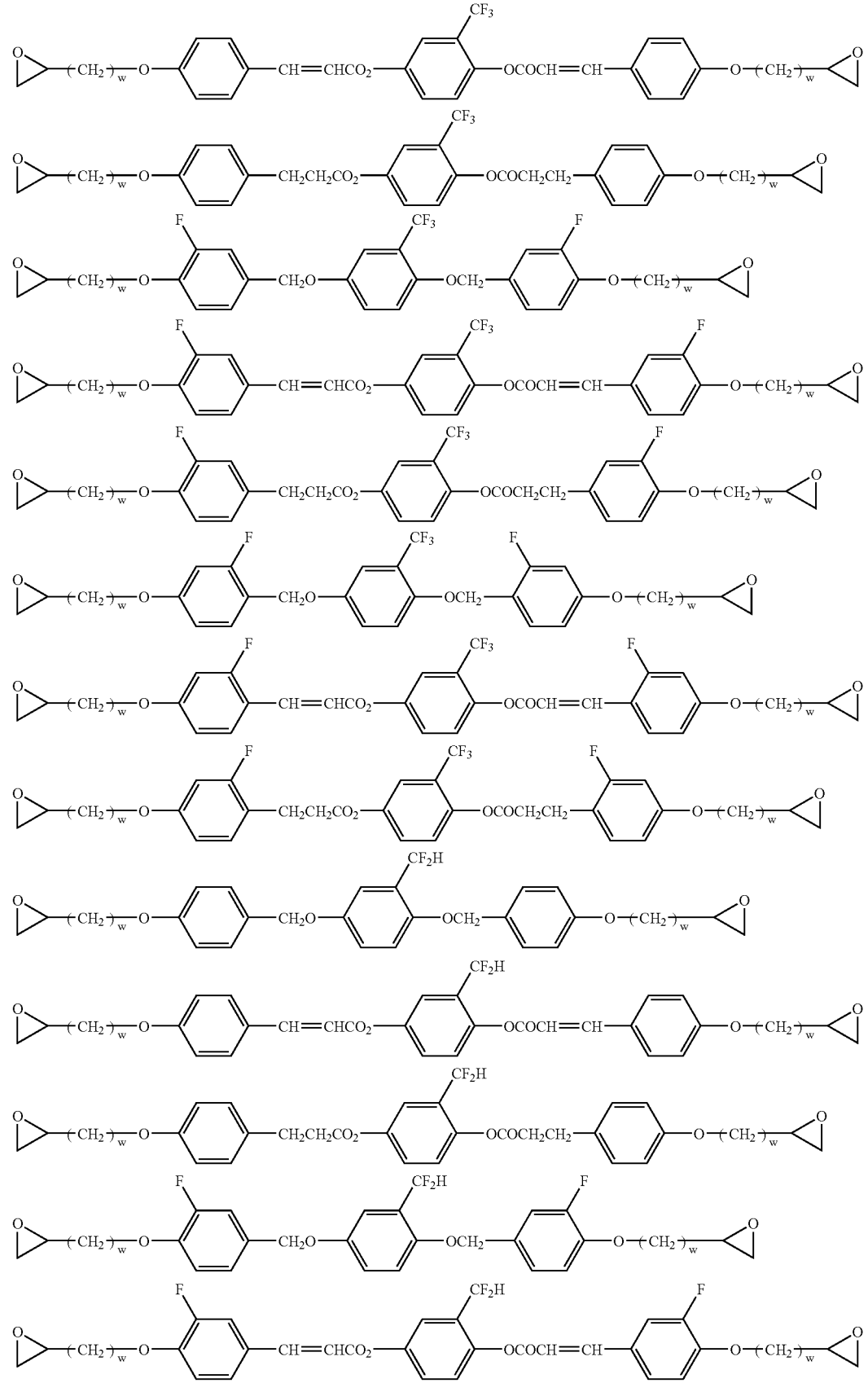

-continued
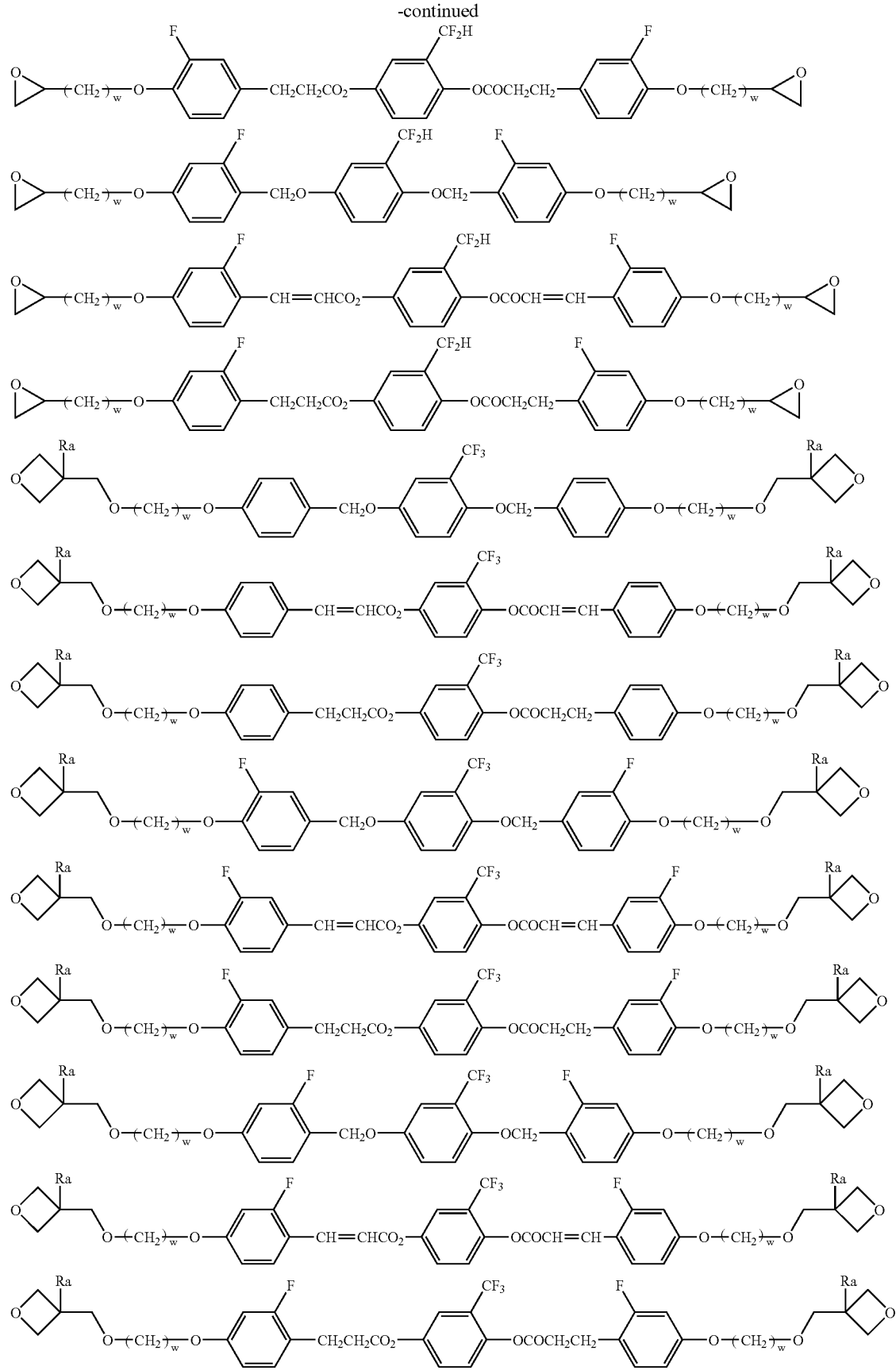

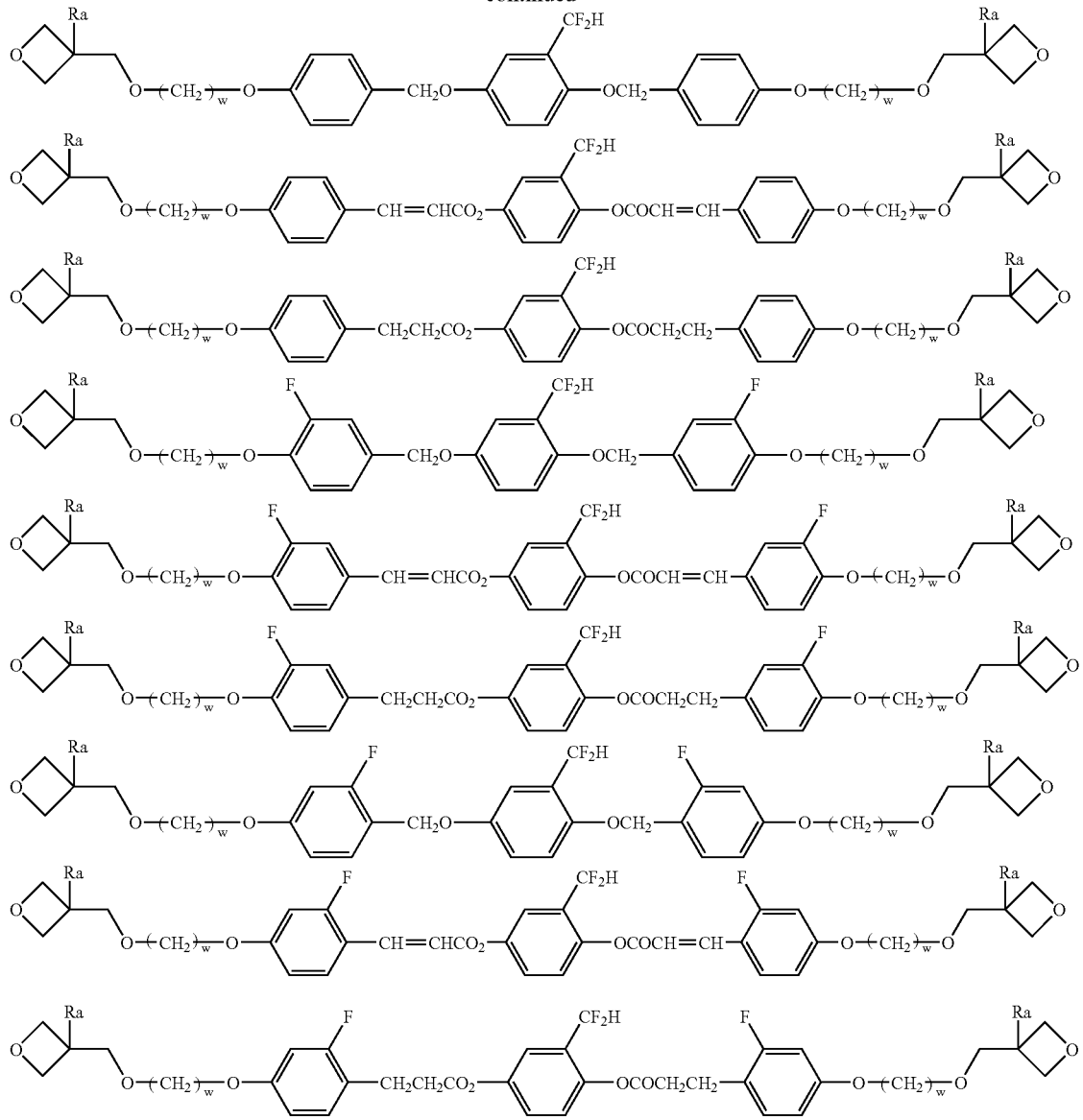

-continued wherein each w is independently an integer of 2 to 8, each Ra independently represents methyl, ethyl or propyl.

14. A liquid crystal composition comprising at least two compounds, wherein at least one of the compounds is the compound according to item 1.
15. A liquid crystal composition comprising at least two compounds, wherein at least one of the compounds is the compound according to item 4.
16. A liquid crystal composition comprising at least two compounds, wherein at least one of the compounds is the compound according to item 12.
17. A liquid crystal composition comprising at least two compounds, wherein at least one of the compounds is the compound according to item 13.
18. The liquid crystal composition according to item 14, wherein all of the compounds are polymerizable compounds.
19. The liquid crystal composition according to item 15, wherein all of the compounds are polymerizable compounds.
20. The liquid crystal composition according to item 16, wherein all of the compounds are polymerizable compounds.
21. The liquid crystal composition according to item 17, wherein all of the compounds are polymerizable compounds.
22. A liquid crystal composition which comprises at least two compounds, wherein all of those are polymerizable compounds, and at least one of those is the compound according to item 1, and further at least one of those is a compound other than said compound.
23. A liquid crystal composition which comprises at least two compounds, wherein all of those are polymerizable compounds, and at least one of those is the compound according to item 4, and further at least one of those is a compound other than said compound.

24. A liquid crystal composition which comprises at least two compounds, wherein all of those are polymerizable compounds, and at least one of those is the compound according to item 12, and further at least one of those is a compound other than said compound.
25. A liquid crystal composition which comprises at least two compounds, wherein all of those are polymerizable compounds, and at least one of those is the compound according to item 13, and further at least one of those is a compound other than said compound.
26. A liquid crystal composition which comprises at least two compounds, wherein all of those are polymerizable compounds, and at least one of those is the compound according to item 1, and further at least one of those is a compound selected from the group consisting of compounds represented by the following formulas (A), (B) and (C):

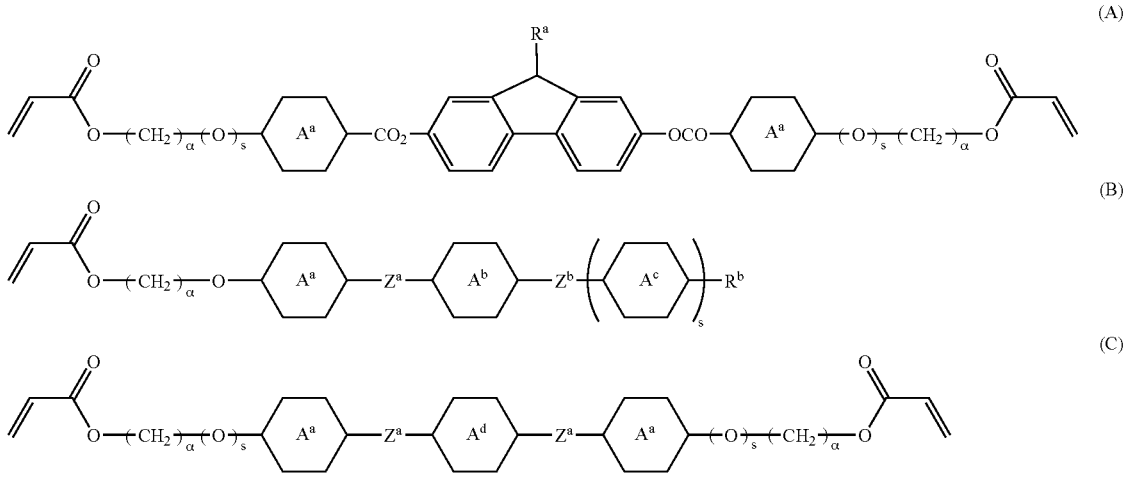

wherein $R^a$ is hydrogen, methyl, ethyl or propyl; $R^b$ is CN, C1–20 alkyl or C1–20 alkoxy; rings $A^a$, $A^b$ and $A^c$ are each independently 1,4-cyclohexylene, 1,4-phenylene or 1,4-phenylene having any hydrogen optionally replaced with fluorine; ring $A^d$ is 1,4-phenylene, 2-methyl-1,4-phenylene or 2,3-bis(trifluoromethyl)-1,4-phenylene; $Z^a$ and $Z^b$ are each independently a single bond, —(CH$_2$)$_2$—, —COO—, or —OCO—; each α is independently an integer of 1–20; and s is 0 or 1.

27. A liquid crystal composition which comprises at least two compounds, wherein all of those are polymerizable compounds, and at least one of those is the compound according to item 4, and further at least one of those is a compound selected from the group consisting of compounds represented by the above formulas (A), (B) and (C).
28. A liquid crystal composition which comprises at least two compounds, wherein all of those are polymerizable compounds, and at least one of those is the compound according to item 12, and further at least one of those is a compound selected from the group consisting of compounds represented by the above formulas (A), (B) and (C).
29. A liquid crystal composition which comprises at least two compounds, wherein all of those are polymerizable compounds, and at least one of those is the compound according to item 13, and further at least one of those is a compound selected from the group consisting of compounds represented by the above formulas (A), (B) and (C).
30. The liquid crystal composition according to item 17, wherein the liquid crystal composition further comprises an optically active compound.
31. The liquid crystal composition according to item 18, wherein the liquid crystal composition further comprises an optically active compound.
32. The liquid crystal composition according to item 19, wherein the liquid crystal composition further comprises an optically active compound.
33. The liquid crystal composition according to item 20, wherein the liquid crystal composition further comprises an optically active compound.
34. The liquid crystal composition according to item 21, wherein the liquid crystal composition further comprises an optically active compound.
35. The liquid crystal composition according to item 24, wherein the liquid crystal composition further comprises an optically active compound.
36. The liquid crystal composition according to item 28, wherein the liquid crystal composition further comprises an optically active compound.
37. A polymer comprising at least one of the constituent units represented by the following formulas (2p) to (6p):

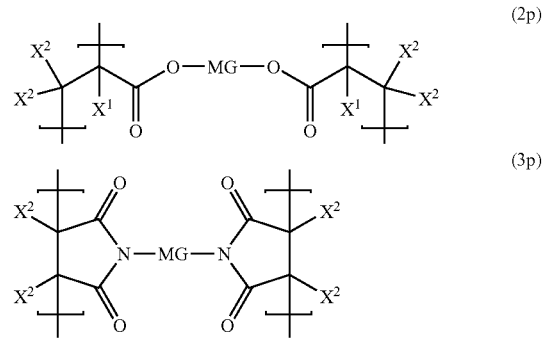

-continued

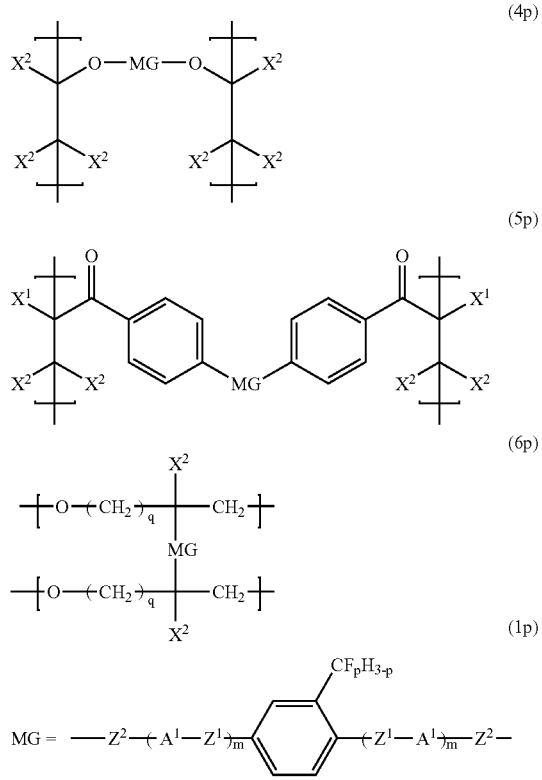

wherein MG represents the mesomorphic residue portion (1p) of formula (1); each $A^1$ is independently 1,4-cyclohexylene, 1,4-cyclohexenylene, 1,4-phenylene, naphthalene-2,6-diyl, tetrahydronaphthalene-2,6-diyl, fluorene-2,7-diyl, or bicyclo[2.2.2]octane-1,4-diyl, where any —$CH_2$— of these rings is optionally replaced with —O—, any —CH= is optionally replaced with —N=, and any hydrogen is optionally replaced with a halogen, C1–5 alkyl or halogenated alkyl; each $Z^1$ is independently a single bond, —$(CH_2)_2$—, —$(CF_2)_2$—, —$(CH_2)_4$—, —$CH_2O$—, —$OCH_2$—, —COO—, —OCO—, —CH=CH—, —CF=CF—, —C≡C—, —C≡C—COO—, —OCO—C≡C—, —CH=CH—COO—, —OCO—CH=CH—, —$(CH_2)_2$—COO—, —OCO—$(CH_2)_2$—, —C≡C—CH=CH—, —CH=CH—C≡C—, —$OCF_2$—, or —$CF_2O$—; each $Z^2$ is independently a single bond or C1–20 alkylene, where any —$CH_2$— in the alkylene is optionally replaced with —O—, —S—, —COO—, or —OCO—; $X^1$ is hydrogen, a halogen, $CF_3$ or C1–5 alkyl; each $X^2$ is independently hydrogen, a halogen or C1–5 alkyl; m and n are each independently 0, 1 or 2; each p is 2 or 3; each q is 0 or 1; with the proviso that $Z^1$ is not —C≡C— in formulas (2p) and (6p).

38. The polymer according to item 37, wherein each $A^1$ in formula (1p) is independently 1,4-cyclohexylene or 1,4-phenylene, and each $Z^1$ is independently a single bond, —$(CH_2)_2$—, —COO—, —OCO—, —$CH_2O$—, —$OCH_2$—, —CH=CH—COO—, —OCO—CH=CH—, —$(CH_2)_2$—COO— or —OCO—$(CH_2)_2$—, and each $Z^2$ is independently a single bond, linear C1–20 alkylene, linear C3–20 alkylene having any one of —$CH_2$— optionally replaced with —O—, —S—, —COO— or —OCO—, or linear C4–20 alkylene having any two of —$CH_2$— optionally replaced with —O— or —S—, with the proviso that both —$Z^2$—P and P—$Z^2$— in formula (1) have none of moieties including —O—O—, —O—S—, —S—O— and —S—S—.

39. A polymer obtained by polymerization of the composition according to item 27.

40. The polymer according to item 39, wherein the weight-average molecular weight is at least 500 and no greater than 500,000.

41. The polymer according to item 39, wherein the weight-average molecular weight is 500,000 or greater.

42. The polymer according to item 39, wherein the refractive index is at least 1.35 and no greater than 1.60.

43. A film made of a polymer comprising at least one of the constituent units represented by the above formulas (2p) to (6p).

44. The film according to item 43, wherein each $A^1$ in formula (1p) is independently 1,4-cyclohexylene or 1,4-phenylene, and each $Z^1$ is independently a single bond, —$(CH_2)_2$—, —COO—, —OCO—, —$CH_2O$—, —$OCH_2$—, —CH=CH—COO—, —OCO—CH=CH—, —$(CH_2)_2$—COO— or —OCO—$(CH_2)_2$—, and each $Z^2$ is independently a single bond, linear C1–20 alkylene, linear C3–20 alkylene having any one of —$CH_2$— optionally replaced with —O—, —S—, —COO— or —OCO—, or linear C4–20 alkylene having any two of —$CH_2$— optionally replaced with —O— or —S—, with the proviso that both —$Z^2$—P and P—$Z^2$— in formula (1) have none of moieties including —O—O—, —O—S—, —S—O— and —S—S—.

45. A ¼ wavelength functional plate employing an optical anisotropic material made of the polymer according to item 39.

46. A ½ wavelength functional plate employing an optical anisotropic material made of the polymer according to item 39.

47. An optical anisotropic material comprising the polymer according to item 39, wherein the liquid crystal backbone in the thin layer of the optical anisotropic material exhibits a hybrid alignment.

48. An optical anisotropic material comprising the polymer according to item 39, wherein the liquid crystal backbone in the thin layer of the optical anisotropic material exhibits a homogeneous alignment.

49. An optical anisotropic material comprising the polymer according to item 39, wherein the liquid crystal backbone in the thin layer of the optical anisotropic material exhibits a tilted alignment.

50 An optical anisotropic material comprising the polymer according to item 39, wherein the liquid crystal backbone in the thin layer of the optical anisotropic material exhibits a homeotropic alignment.

51. An optical anisotropic material comprising the polymer according to item 39 having a chiral nematic phase or cholesteric phase, wherein the liquid crystal backbone in the thin layer exhibits a helical structure.

52 The optical anisotropic material according to item 51, which selectively reflects all or a portion of the region of light in a wavelength range of 350–750 nm.

53. The optical anisotropic material according to item 51, which selectively reflects all or a portion of the region of light in a wavelength range of 100–350 nm.

54. The optical anisotropic material according to item 51, wherein the pitch of the helical structure induced by the chiral nematic phase or cholesteric phase varies continuously in the direction of thickness of the optical anisotropic material.

55. An optical compensation element comprising the optical anisotropic material according to item 51.
56. An optical element comprising a combination of the optical anisotropic material according to item 51 with a polarizing plate.
57. A liquid crystal display element comprising the optical anisotropic material according to item 51.

The term "liquid crystalline" as used according to the present invention does not mean solely that the compound exhibits a liquid crystal phase. The term will also be used in reference to compounds which exhibit no liquid crystal phase themselves but can be used as components of liquid crystal compositions when mixed with other liquid crystal compounds. "(Meth)acryloyloxy" means "acryloyloxy or methacryloyloxy", "(meth)acrylate" means "acrylate or methacrylate", and "(meth)acrylic acid" means "acrylic acid or methacrylic acid".

The term "optionally" used in reference to specific groups in the chemical formulas throughout the claims and the Detailed Description of the present specification means that not only the position but also the number of those groups is optional. The plurality of $A^1$ groups in formula (1) are independently 1,4-cyclohexylene, 1,4-cyclohexenylene, 1,4-phenylene, naphthalene-2,6-diyl, tetrahydronaphthalene-2,6-diyl, fluorene-2,7-diyl or bicyclo[2.2.2]octane-1,4-diyl, where any —$CH_2$— of these rings is optionally replaced with —O—, any —CH= is optionally replaced with —N=, and any hydrogen is optionally replaced with a halogen, C1–5 alkyl or halogenated alkyl. Fluorine and chlorine may be mentioned as halogens, with fluorine being preferred. Preferred alkyl groups are methyl, ethyl and propyl.

Preferred groups for $A^1$ include 1,4-cyclohexylene, 2,2-difluoro-1,4-cyclohexylene, 1-fluoro-1,4-cyclohexylene, 1-trifluoromethyl-1,4-cyclohexylene, 1,4-cyclohexenylene, 2-fluoro-1,4-cyclohexenylene, 1,4-phenylene, 2-fluoro-1,4-phenylene, 2,3-difluoro-1,4-phenylene, 2,5-difluoro-1,4-phenylene, 2,6-difluoro-1,4-phenylene, 2-trifluoromethyl-1,4-phenylene, 2-methyl-1,4-phenylene, naphthalene-2,6-diyl, pyridine-2,5-diyl, pyridazine-3,6-diyl, pyrimidine-2,5-diyl and 1,3-dioxane-2,5-diyl. Particularly preferred groups for $A^1$ are 1,4-cyclohexylene and 1,4-phenylene.

The orientation of the ring is not fixed. Also, 2,2-difluoro-1,4-cyclohexylene and 3,3-difluoro-1,4-cyclohexylene, for example, have identical rings and in such cases only one will be mentioned.

Each P in formula (1) is independently a polymerizable group represented by formulas (2) to (6). Each $X^1$ in the formulas is hydrogen, a halogen, —$CF_3$ or C1–5 alkyl, and $X^1$ is preferably hydrogen or —$CF_3$ for higher polymerizability. Each $X^2$ is hydrogen, a halogen or C1–5 alkyl, and $X^2$ is preferably hydrogen for higher polymerizability. Reference letter q is 0 or 1, and when q is 0, (6) is oxirane and when q is 1, (6) is oxetane. Both of these compounds are preferred because they exhibit high polymerizability.

Each $Z^1$ in formula (1) is a bonding group bonding two rings together. Multiple $Z^1$ groups are independently a single bond, —$(CH_2)_2$—, —$(CF_2)_2$—, —$(CH_2)_4$—, —$CH_2O$—, —$OCH_2$—, —COO—, —OCO—, —CH=CH—, —CF=CF—, —C≡C—, —C≡C—COO—, —OCO—C≡C—, —CH=CH—COO—, —OCO—CH=CH—, —$(CH_2)_2$—COO—, —OCO—$(CH_2)_2$—, —C≡C—CH=CH—, —CH=CH—C≡C—, —$OCF_2$— or —$CF_2O$—, with the proviso that at least one $Z^1$ is —C≡C—, and P in formula (1) is formula (3), (4) or (5).

Compound (1) exhibits a wide liquid crystal phase temperature range when $Z^1$ is a single bond, —$(CH_2)_2$—, —$(CH_2)_4$—, —$CH_2O$—, —$OCH_2$—, —COO—, —OCO—, —CH=CH—COO—, —OCO—CH=CH—, —CH=CH— or —CF=CF—. A wider temperature range is exhibited particularly when $Z^1$ is a single bond, —COO—, —OCO— or —CH=CH—. When $Z^1$ is —$(CF_2)_2$—, —$OCF_2$— or —$CF_2O$—, low surface energy and a relatively wide liquid crystal phase temperature range is exhibited. When $Z^1$ is —CH=CH—, —C≡C—, —C≡C—COO—, —OCO—C≡C—, —C≡C—CH=CH— or —CH=CH—C≡C—, a large birefringence is exhibited. The structure may be selected so as to achieve the desired properties. When $Z^1$ is —CH=CH—COO— or —OCO—CH=CH—, a large birefringence and a wide liquid crystal phase temperature range are exhibited.

Each $Z^2$ in formula (1) is independently a single bond or C1–20 alkylene, and any —$CH_2$— of the alkylene may be optionally replaced with —O—, —S—, —COO— or —OCO—. More preferably, $Z^2$ is a single bond or C1–20 alkylene, or C1–20 alkylene having 1 or 2 oxygen atoms. The preferred number of carbon atoms in the alkylene is from 2 to 10 and more preferably from 2 to 8. A carbon atom number of 1 represents acetal, which tends to result in reduced chemical stability. The viscosity of Compound (1) is increased with 11 or more carbon atoms.

$Z^2$ may also have the branched structure represented by formula ($Z^2$–1) below.

($Z^2$-1)

In formula ($Z^2$–1), $MGP^1$ represents an organic residue containing a mesomorphic residue MG, $MGP^2$ represents an organic residue containing a polymerizable group P, MG and P have the same meanings as in items 43 and 1, $R^c$ represents methyl, ethyl or propyl, and the carbon indicated by * is an asymmetric carbon.

The reference letters m and n are independently 0, 1 or 2, but m+n is no greater than 4. Compound (1) exhibits low viscosity when m+n is 1, it exhibits a wide liquid crystal phase temperature range when m+n is 2, and it exhibits an even wider liquid crystal phase temperature range and a high transparent point when m+n is 3. Compounds of formula (1) wherein m+n is 4 exhibit an even higher transparent point, and are useful for preparation of compositions with suitable transparent points by admixture with compounds exhibiting no liquid crystal phase and compounds with low transparent points.

Reference letter p is 2 or 3, with 2-difluoromethyl-1,4-phenylene being obtained when p is 2, and 2-trifluoromethyl-1,4-phenylene being obtained when p is 3. When a compound of formula (1) or a liquid crystal composition comprising it is used in an optical compensation film, suitable alignment can also be achieved by appropriate selection of p.

The compounds of formula (1) have polymerizable groups represented by formulas (2) to (6) on both ends. When the emphasis is on industrial value, compounds (1a) to (1e) which have identical polymerizable groups on both ends are preferred from the standpoint of facilitating production, but the polymerizable groups on both ends may also be different.

All of the compounds of formula (1) exhibit favorable properties, but the following compounds (1a-1) to (1f-4) are particularly preferred compounds.

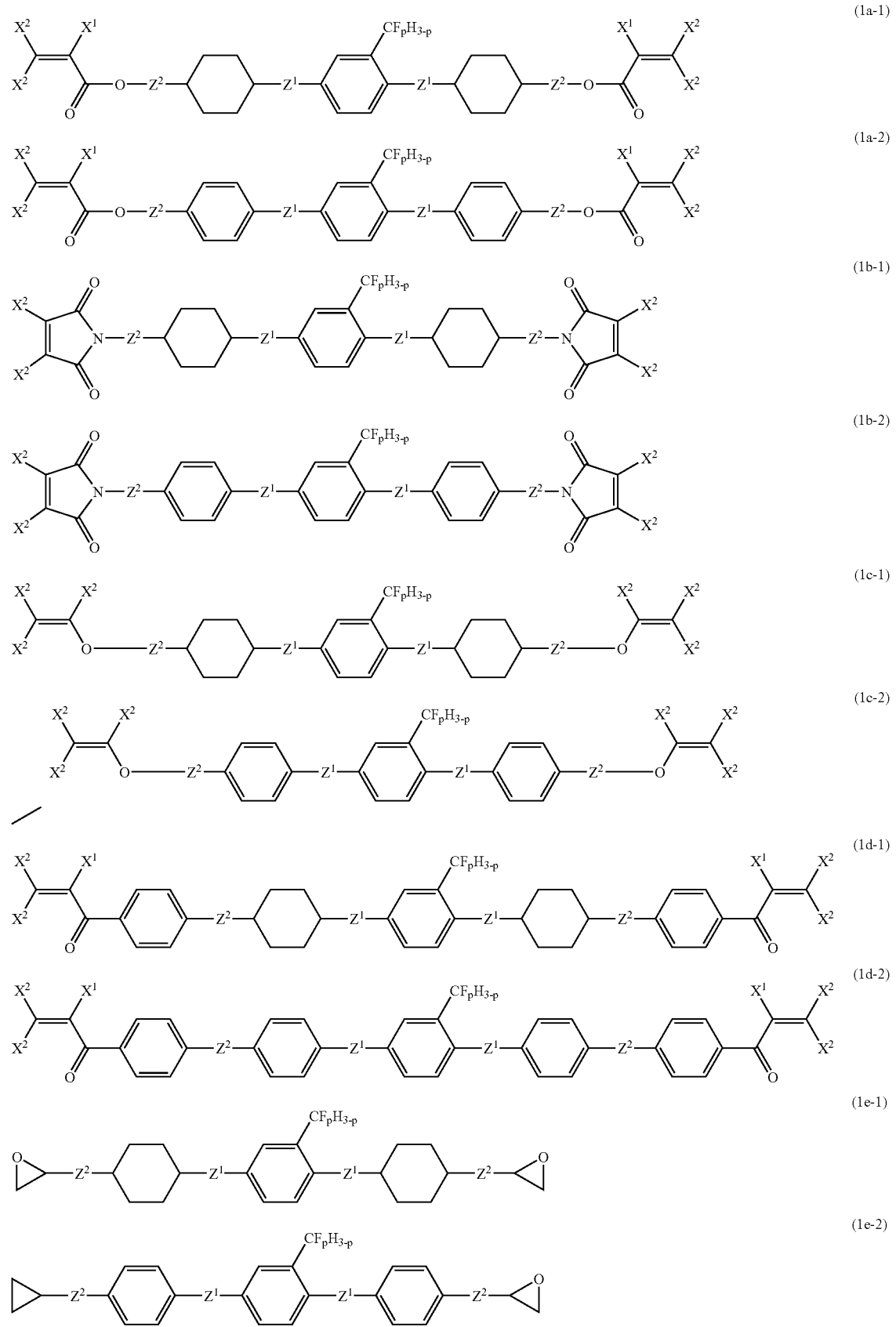

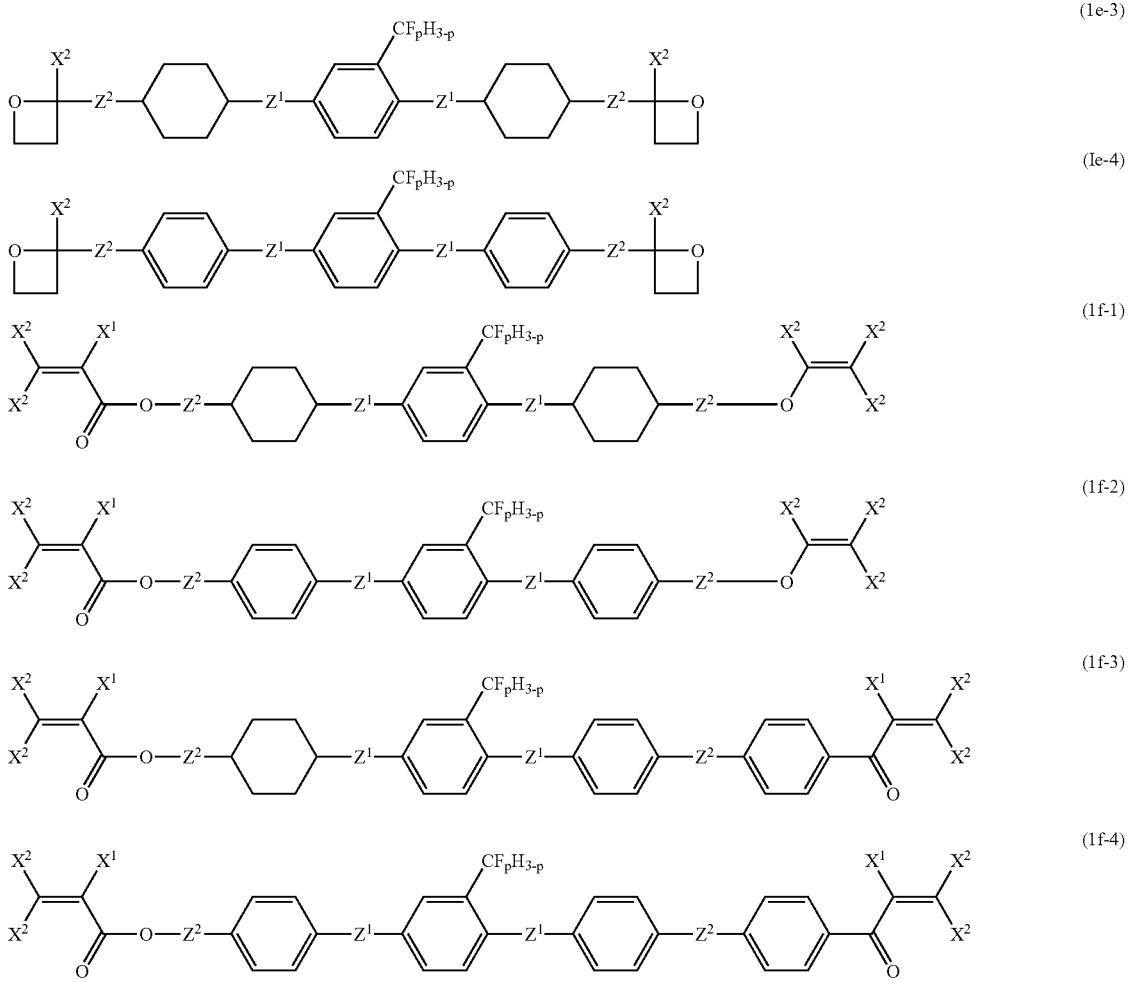
In these formulas, $A^1$, $Z^1$, $Z^2$, $X^1$ and $X^2$ have the same definitions as in formula (1). Also, any hydrogen in the 1,4-cyclohexylene or 1,4-phenylene groups of formulas (1a-1) to (1f-4) may be optionally replaced with a halogen, C1–5 alkyl or halogenated alkyl. Specifically, these include compounds having the structures of the following formulas (Cy-1) to (Ph-10).
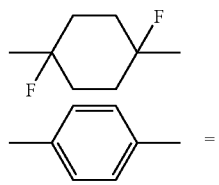

-continued (Ph-4)
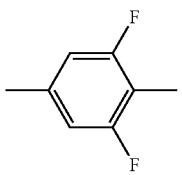

(Ph-5)
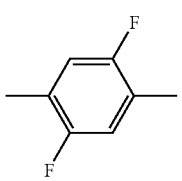

(Ph-6)
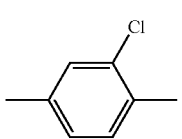

(Ph-7)
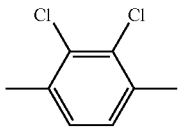

(Ph-8)
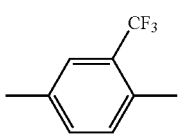

(Ph-9)
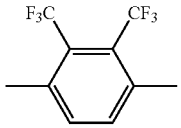

(Ph-10)
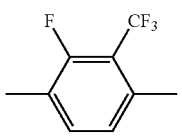

Compound (1) may be synthesized by a combination of synthetic organic chemical methods. Methods for introducing specific terminal groups, rings and bonding groups into starting compounds are described in Houben-Wyle, Methoden der Organische Chemie, Georg-Thieme Verlag (Stuttgart), Organic Syntheses (John Wily & Sons, Inc.), Organic Reactions (John Wily & Sons Inc.), Comprehensive Organic Synthesis (Pergamon Press), Shin-Jikken Kagaku Koza (Maruzen Publications), and other publications.

Synthesis of the bonding group $Z^1$ will now be explained through steps (I) to (XII). In this scheme, $MSG^1$ or $MSG^2$ is a monovalent organic group having at least one ring. A plurality of $MSG^1$ (or $MSG^2$) groups used for the scheme may be the same or different. Compounds (1A) to (1M) correspond to Compound (1).

(I) Production of Single Bond

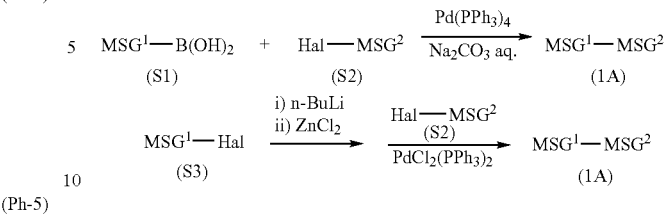

An arylboric acid (S1) is reacted with Compound (S2) synthesized by a publicly known process, in the presence of an aqueous carbonate solution and a catalyst such as tetrakis (triphenylphosphine)palladium to synthesize Compound (1A). Compound (1A) may also be synthesized by reacting Compound (S3) synthesized by a publicly known process, with n-butyllithium and then with zinc chloride, and then reacting this product with Compound (S2) in the presence of a catalyst such as dichlorobis(triphenylphosphine)palladium.

(II) Production of —CH═CH—

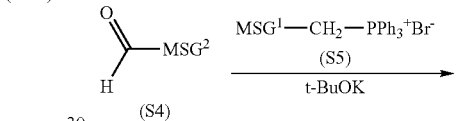

A phosphorylide produced by reacting a base such as potassium t-butoxide with a phosphonium salt (S5) synthesized by a publicly known process is reacted with aldehyde (S4) to synthesize Compound (1B). The cis form is produced depending on the reaction conditions and substrate, and the cis form may be isomerized to the trans form by a publicly known process if necessary.

(III) Production of —(CH$_2$)$_2$—

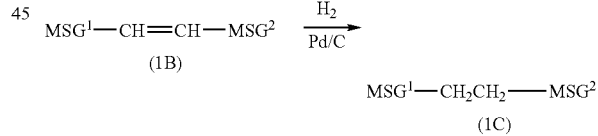

Compound (1B) is hydrogenated in the presence of a catalyst such as palladium carbon to synthesize Compound (1C).

(IV) Production of —(CF$_2$)$_2$—

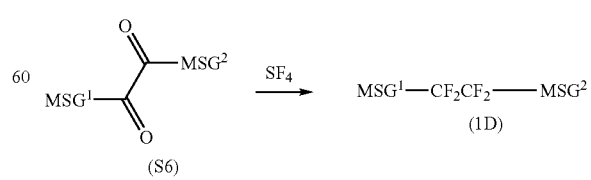

Diketone (S6) is fluorinated with sulfur tetrafluoride in the presence of a hydrogen fluoride as a catalyst according to the method described in J. Am. Chem. Soc., 2001, 123, 5414, to obtain Compound (1D) having a —(CF$_2$)$_2$— group.

(V) Production of —(CH$_2$)$_4$—

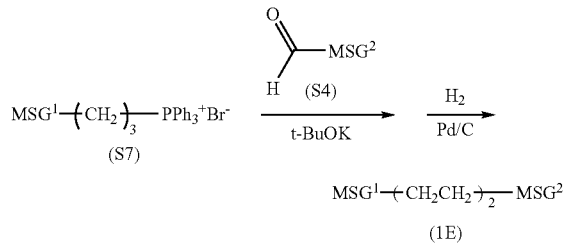

A compound with a —(CH$_2$)$_2$—CH═CH— group is obtained according to method (II) above, except for using phosphonium salt (S7) instead of phosphonium salt (5S). This is subjected to catalytic hydrogenation to synthesize Compound (1E).

(VI) Production of —CH$_2$O— or —OCH$_2$—

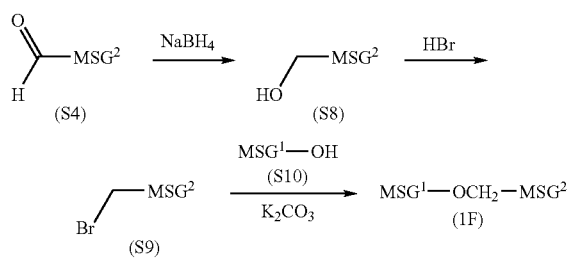

Compound (S4) is reduced with a reducing agent such as sodium borohydride to obtain Compound (S8). This is halogenated with hydrobromic acid or the like to obtain Compound (S9). Compound (S9) is reacted with Compound (S10) in the presence of potassium carbonate or the like to obtain Compound (1F). This method also allows synthesis of a compound with a —CH$_2$O— group.

(VII) Production of —COO— and —OCO—

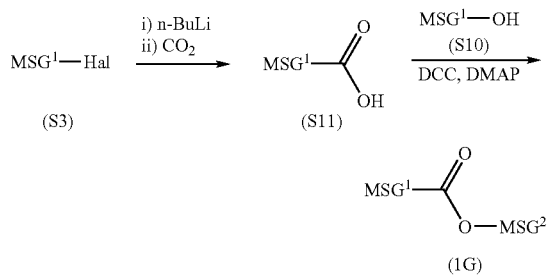

Compound (S3) is reacted with n-butyllithium and then with carbon dioxide to obtain carboxylic acid (S11). Compound (S11) and phenol (S10) are dehydrated in the presence of DCC (1,3-dicyclohexylcarbodiimide) and DMAP (4-dimethylaminopyridine) to synthesize Compound (1G) having a —COO— group. This method also allows synthesis of a compound with a —OCO— group.

(VIII) Production of —CF═CF—

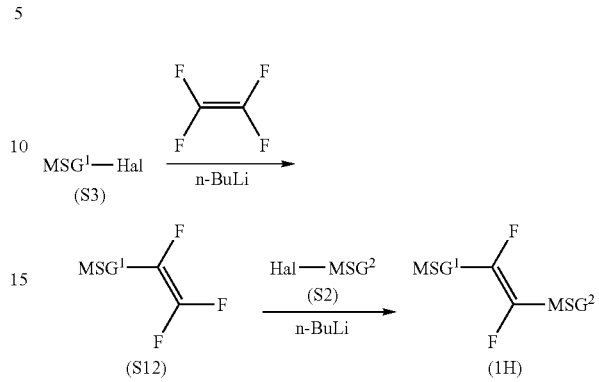

Compound (S3) is treated with n-butyllithium and then reacted with tetrafluoroethylene to obtain Compound (S12). Compound (S2) is treated with n-butyllithium and then reacted with Compound (S12) to synthesize Compound (1H). The cis form of Compound (1H) may also be produced by selecting the synthesis conditions.

(IX) Production of —C≡C—

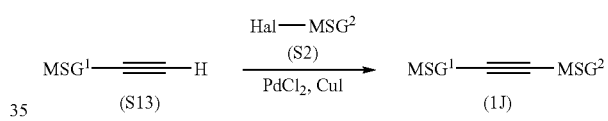

Compound (S13) is reacted with Compound (S2) in the presence of dichloropalladium and a copper halide to synthesize Compound (1J).

(X) Production of —C≡C—COO— and —OCO—C≡C—

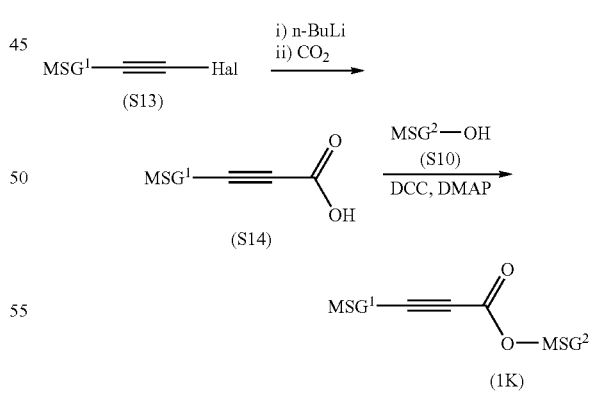

Compound (S13) is lithiated with n-butyllithium, and then reacted with carbon dioxide to obtain carboxylic acid (S14). Carboxylic acid (S14) and phenol (S10) are dehydrated in the presence of DCC and DMAP to synthesize Compound (1K) having a —C≡C—COO— group. This method also allows synthesis of a compound having a —OCO—C≡C— group.

(XI) Production of —C≡C—CH=CH— and —CH=CH—C≡C—

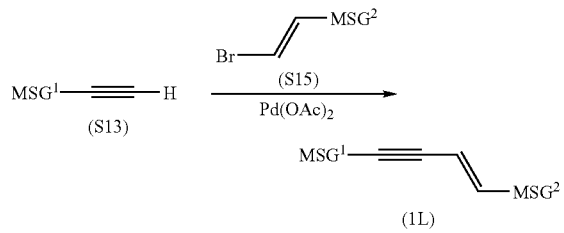

Compound (S13) and vinyl bromide (S15) may be subjected to cross coupling reaction to synthesize Compound (1L) having a —C≡C—CH=CH— group. The cis form of (1L) may be produced by using the cis form of Compound (S5).

(XII) Production of —CF$_2$O— and —OCF$_2$—

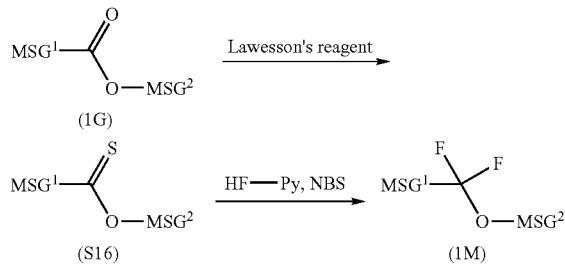

Compound (1G) is treated with a sulfurizing reagent such as Lawesson's reagent to obtain Compound (S16). Compound (S16) is then fluorinated with hydrogen fluoride-pyridine complex and NBS (N-bromosuccinimide) to synthesize Compound (1M) having a —CF$_2$O— group. Compound (1M) may also be synthesized by fluorination of Compound (S16) with (diethylamino)sulfur trifluoride (DAST). This method also allows synthesis of a compound having a —OCF$_2$— group. These bonding groups may also be produced by the method described in P. Kirsch et al., Angew. Chem. Int. Ed. 2001, 40, 1480.

A cinnamic acid derivative may be synthesized by reaction between aldehyde (S4) and an ylide (Ph$_3$P=CHCOOH). Such cinnamic acid derivatives may be esterified with various phenols (S10) to synthesize compounds according to formula (1) wherein the bonding group Z$^1$ is —CH=CH—COO— or —OCO—CH=CH—. These may be reduced by method (III) above to obtain compounds according to formula (1) wherein the bonding group Z$^1$— (CH$_2$)$_2$—COO— or —OCO—(CH$_2$)$_2$—.

2-Difluoromethyl-1,4-phenylene is represented when p is 2, and 2-trifluoromethyl-1,4-phenylene is represented when p is 3. Difluoromethyl may be introduced by fluorination of the corresponding aldehyde with DAST or SF$_4$, and trifluoromethyl may be introduced by fluorination of the corresponding carboxyl group with SF$_4$ or by trifluoromethylation of the corresponding halide. Examples of trifluoromethylating reagents include S-(trifluoromethyl) dibenzothiophenium trifluoromethanesulfonate. Such trifluoromethylating agents are commercially available as, for example, MEC-11, 12, 13 and 21 (registered trademarks of Daikin Industries, Ltd.). Compound (1) may also be produced by a publicly known synthetic organic chemical method from commercially available benzotrifluoride.

The polymerization sites shown in formulas (2) to (6) may be introduced using publicly known synthetic organic chemical methods. References include, for example, Japanese Patent Application No. 2001-378508, Japanese Patent Application No. 2002-115270, Japanese Patent Application No. 2002-335266 and Japanese Patent Application No. 2002-300068.

The first mode of this composition is a composition comprising at least one Compound (1) and a liquid crystalline compound having no polymerizable property. In the explanation which follows, "liquid crystalline compound having no polymerizable property" will be referred to as "non-polymerizable liquid crystals". Compound (1) exhibits excellent characteristics as liquid crystals, such as a suitable liquid crystal phase temperature range and satisfactory compatibility with other liquid crystalline compounds. Thus, a liquid crystal composition comprising Compound (1) and non-polymerizable liquid crystals may be used as the encapsulated composition for fabrication of a liquid crystal display element. The composition may be subjected to appropriate polymerization conditions for polymerization of Compound (1) in the composition to form a network structure of the polymer. The first mode of this composition, therefore, can be used as a material for PDLCs and PNLCs.

When Compound (1) is optically active, it is useful for adjustment of the helical pitch of the composition. The liquid crystal composition may also be used as a starting material for obtaining a polymer according to the invention, in which case a complex of the polymer of the invention and the liquid crystalline compound may be obtained. Examples of non-polymerizable liquid crystals include the liquid crystalline compounds listed in the LiqCryst™ liquid crystal compound database (LCI Publisher GmbH (Hamburg, Germany)). The liquid crystal composition may also contain additives such as dichromatic pigments.

The second mode of the composition of the invention is a composition comprising at least one Compound (1) and a polymerizable compound which is not Compound (1). In the explanation which follows, "polymerizable compound which is not Compound (1)" will be referred to as "other polymerizable compound", and the "composition comprising at least one Compound (1) and a polymerizable compound which is not Compound (1)" will be referred to simply as "polymerizable composition". The polymerizable composition preferably exhibits a liquid crystal phase, but it may not necessarily exhibit a liquid crystal phase, depending on the purpose. The explanation of this type of polymerizable composition is included in the following polymer explanation.

The first mode of a polymer according to the invention is a homopolymer obtained by polymerization of a single Compound (1). The second mode of a polymer according to the invention is a copolymer obtained by copolymerization of at least two Compounds (1). The third mode of a polymer according to the invention is a copolymer obtained by polymerization of a polymerizable composition comprising at least one Compound (1). All of these polymers have constituent units derived from polymerizable functional groups (2) to (6).

The other polymerizable compound is used to optimize the thin film forming property, mechanical strength and thermal strength and is not particularly restricted so long as it can be copolymerized with Compound (1), and it also does not need to exhibit a liquid crystal property. Polymerizable compounds exhibiting no liquid crystal property include vinyl derivatives, styrene derivatives, (meth)acrylic acid derivatives, sorbic acid derivatives, fumaric acid derivatives, itaconic acid derivatives and the like.

Preferred vinyl derivatives include vinyl chloride, vinyl fluoride, vinyl acetate, vinyl pivalate, vinyl 2,2-dimethylbutanoate, vinyl 2,2-dimethylpentanoate, vinyl 2-methylbutanoate, vinyl propionate, vinyl stearate, vinyl 2-ethyl-2-methylbutanoate, N-vinylacetamide, p-t-vinyl butylbenzoate, vinyl N,N-dimethylaminobenzoate, vinyl benzoate, ethylvinyl ether, hydroxybutyl monovinyl ether, t-amyl vinyl ether, cyclohexanedimethanolmethyl vinyl ether, α-, and β-vinylnaphthalene, methyl vinyl ketone, isobutyl vinyl ketone and the like. Preferred styrene derivatives include styrene, o-chlorostyrene, m-chlorostyrene, p-chlorostyrene, o-chloromethylstyrene, m-chloromethylstyrene, p-chloromethylstyrene, α-methylstyrene and the like.

Preferred (meth)acrylic acid derivatives include methyl (meth)acrylate, ethyl(meth)acrylate, butyl(meth)acrylate, 2-ethylhexyl(meth)acrylate, phenyl(meth)acrylate, 1,4-butanediol diacrylate, 1,6-hexanediol diacrylate, 1,9-nonanediol diacrylate, neopentylglycol diacrylate, triethyleneglycol diacrylate, dipropyleneglycol diacrylate, tripropyleneglycol diacrylate, tetraethyleneglycol diacrylate, trimethylolpropane triacrylate, trimethylol EO-addition triacrylate, pentaerythritol triacrylate, trisacryloyloxyethyl phosphate, bisphenol A EO-addition diacrylate, bisphenol A glycidyl diacrylate (trade name: VISCOAT 700, by Osaka Organic Chemical Co., Ltd.), polyethyleneglycol diacrylate dimethylitaconate and the like.

Preferred sorbic acid derivatives include sodium sorbate, potassium sorbate, lithium sorbate, 1-naphthylmethyl ammonium sorbate, benzylammonium sorbate, dodecylammonium sorbate, octadecylammonium sorbate, methyl sorbate, ethyl sorbate, propyl sorbate, isopropyl sorbate, butyl sorbate, t-butyl sorbate, hexyl sorbate, octyl sorbate, octadecyl sorbate, cyclopentyl sorbate, cyclohexyl sorbate, vinyl sorbate, allyl sorbate, propagyl sorbate and the like.

Preferred fumaric acid derivatives include dimethyl fumarate, diethyl fumarate, diisopropyl fumarate, dibutyl fumarate, dicyclopentyl fumarate, dicyclohexyl fumarate and the like. Preferred itaconic acid derivatives include diethyl itaconate, dibutyl itaconate, diisopropyl itaconate and the like. Butadiene, isoprene and the like may also be used. Polymerizable compounds exhibiting no liquid crystalline property are not limited to those mentioned above.

Other polymerizable compounds having a liquid crystalline property are liquid crystalline compounds having acryloyloxy groups, methacryloyloxy groups, fumaroyloxy groups, maleimidyl groups, oxirane rings or oxetane rings as functional groups, and there may be mentioned compounds which do not qualify as Compound (1). Among such compounds, liquid crystalline acrylic acid derivatives are preferred because they yield transparent polymers with high mechanical strength. These compounds are used to adjust the liquid crystal phase temperature range of the polymerizable composition.

In some cases, the time required for polymerization of the aforementioned other polymerizable compounds with a liquid crystalline property, other than acrylic acid derivatives with a liquid crystalline property, may be longer than acrylic acid derivatives. However, these polymerizable compounds are useful for inhibiting generation of by-products and thus enhancing the mechanical strength and thermal stability of the polymer. In order to maintain the features of the polymer of the invention while notably exhibiting the features as a copolymer, the proportion of constituent units other than those represented by formulas (2p) to (6p) must be 5–95 mole percent and more preferably 60–95 mole percent. Each of the amounts of constituent units exhibiting a liquid crystalline property and constituent units exhibiting no liquid crystalline property among the constituent units other than constituent units represented by formulas (2p) to (6p) may be varied as necessary within this range, so long as their total is within the range. Either of the two types may also be used alone.

As examples of polymerizable compounds with a liquid crystalline property other than those represented by formula (1) there may be mentioned those represented by the following formulas (BRM-1) to (BRM-16).

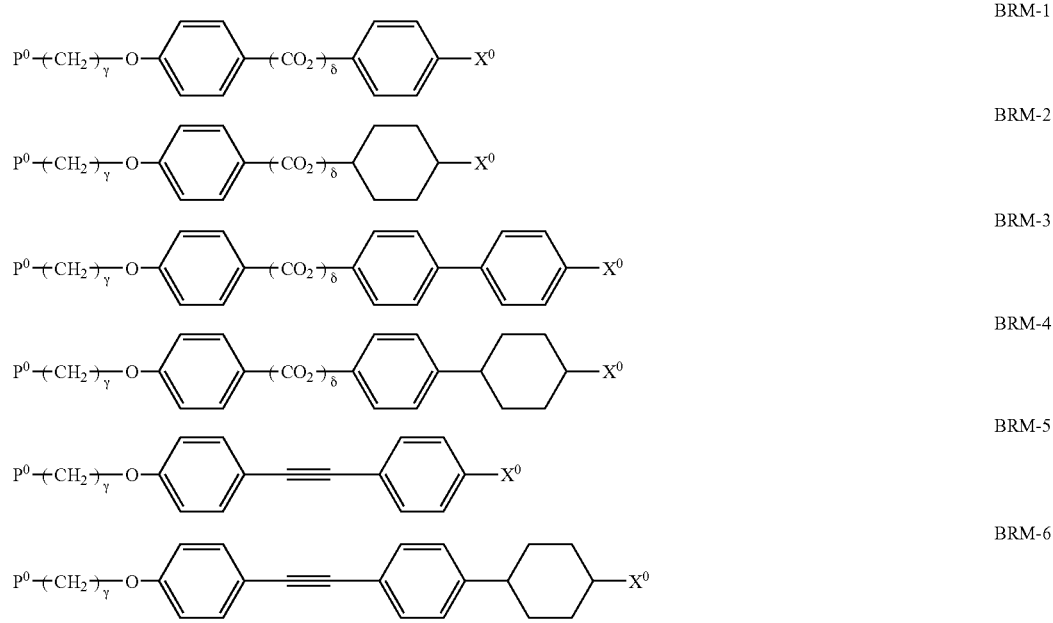

BRM-1

BRM-2

BRM-3

BRM-4

BRM-5

BRM-6

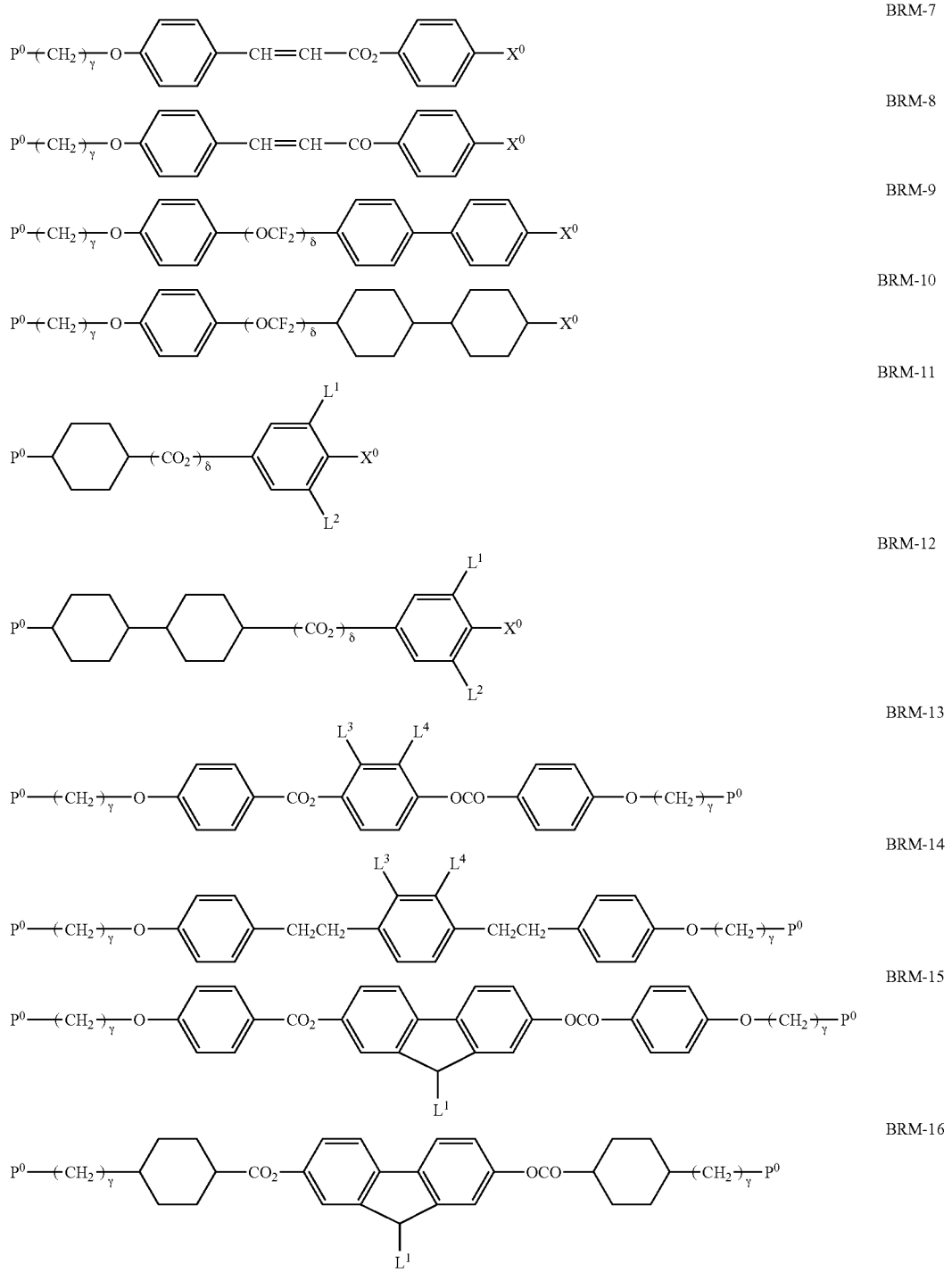

In formulas (BRM-1) to (BRM-16), $P^0$ is a polymerizable group containing an acryloyloxy group, methacryloyloxy group, fumaroyloxy group, maleimidyl group, oxirane ring or oxetane ring, γ is C2–15 alkylene, δ is 0 or 1, $X^0$ is C1–15 alkyl or alkoxy, a halogen, C1–3 halogenated alkyl or alkoxy, —CN or —O(CH$_2$)$_γ$P$^0$, and $L^1$, $L^2$, $L^3$ and $L^4$ are each independently hydrogen, a halogen, C1–15 alkyl, alkoxy, C1–3 halogenated alkyl or alkoxy, provided that when one of $L^3$ and $L^4$ is trifluoromethyl, the other is not hydrogen.

The following formulas (BRM-a-1) to (BRM-a-11) and formulas (BRM-b-1) to (BRM-b-13) represent particularly suitable examples of polymerizable compounds with a liquid crystalline property other than those of formula (1), but any liquid crystalline compounds having similar properties may be suitably used, and these examples do not restrict the construction of the composition of the invention in any way.

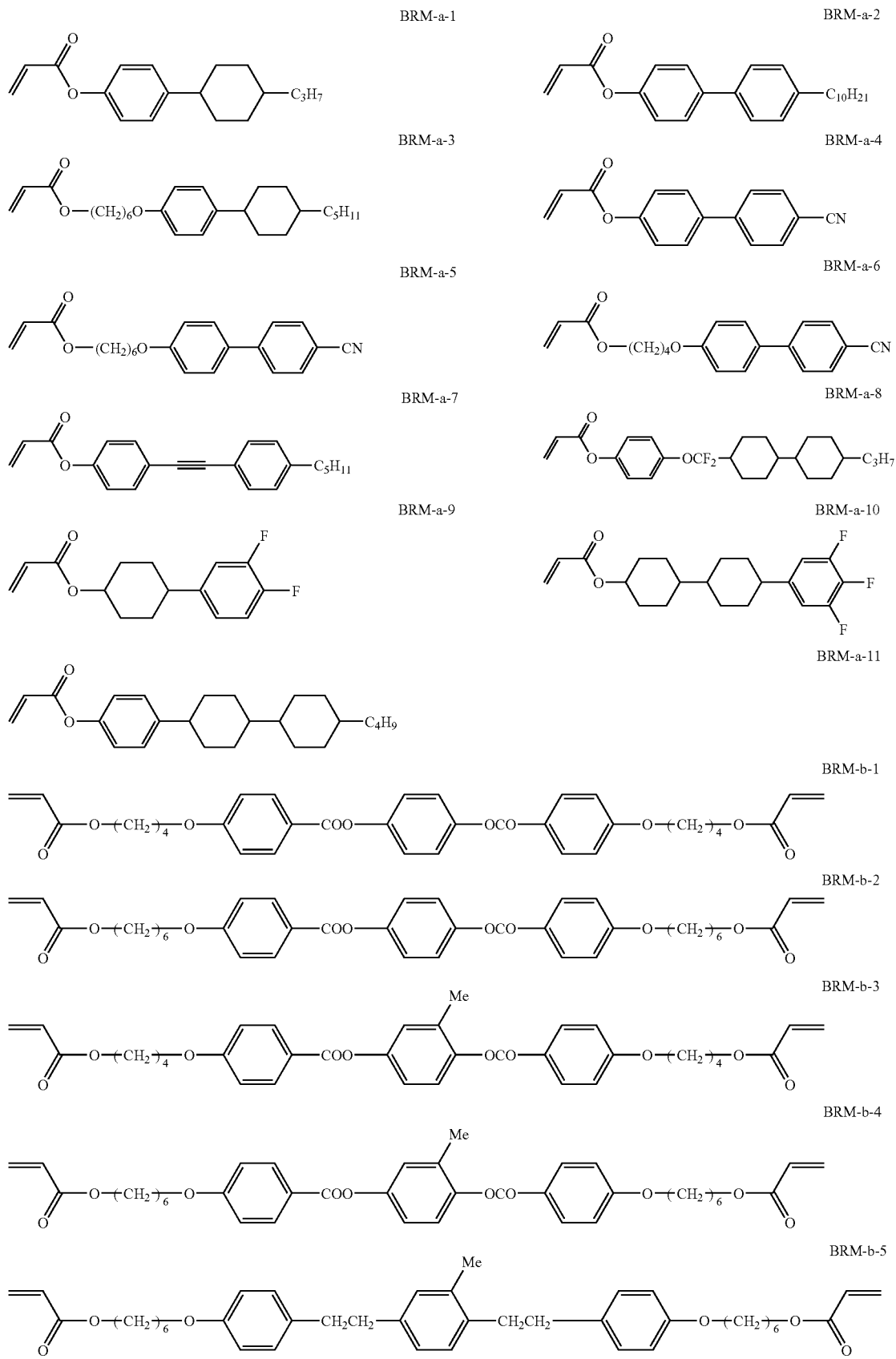

-continued

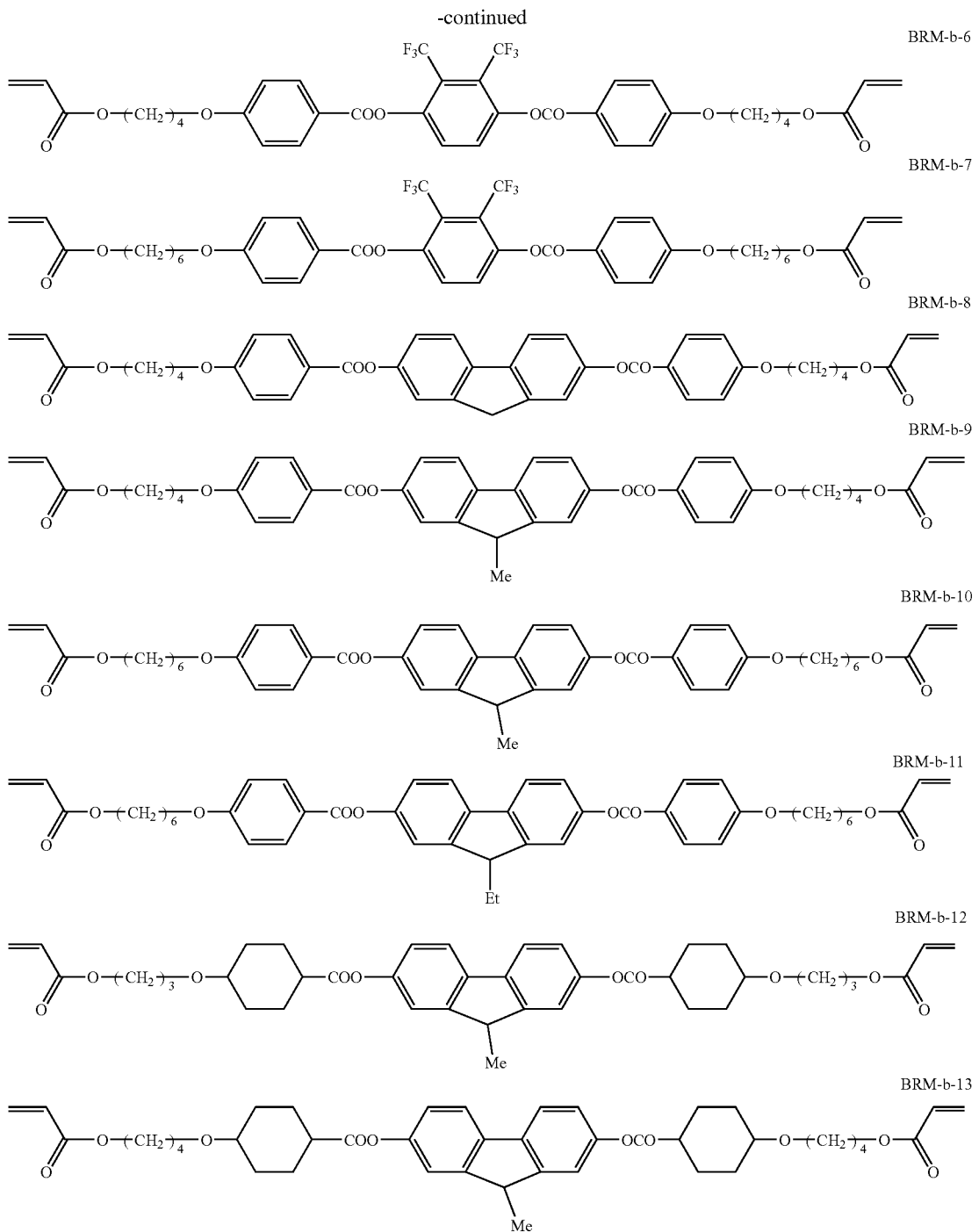

A polymer of the invention may be obtained by polymerization of one Compound (1), at least two Compounds (1) or a polymerizable composition comprising at least one Compound (1), with addition of a catalyst or solvent as necessary. In the case of a copolymer it may be a random copolymer, alternating copolymer, block copolymer, graft copolymer or the like. Repeating structures may be isotactic, syndiotactic or atactic.

Various different polymerization reaction processes may be utilized to obtain polymers of the invention from Compound (1). The polymerization reaction process utilized may be free radical polymerization, anionic polymerization, cationic polymerization, coordination polymerization or the like. The polymerization method used for production of the polymer of the invention is preferably selected as suitable for the purpose. For example, fabrication of an optical anisotropic film such as a retardation film, polarizing element or the like will require rapid polymerization while maintaining a liquid crystal phase state, and therefore polymerization by irradiation with ultraviolet rays or an electron beam is preferred. Compound (1) and the other polymerizable compound as an optional component may, if necessary, be polymerized in the presence of a photoradical polymerization initiator.

Examples of photoradical polymerization initiators include 2-hydroxy-2-methyl-1-phenylpropan-1-one (trade name: DAROCURE 1173), 1-hydroxycyclohexyl phenyl ketone (trade name: IRGACURE 184), 2,2-dimethoxy-1,2-diphenylethan-1-one (trade name: IRGACURE 651), IRGACURE 500 (trade name), IRGACURE-2959 (trade name), IRGACURE 907 (trade name), IRGACURE 369 (trade name), IRGACURE 1300(trade name), IRGACURE 819 (trade name), IRGACURE 1700 (trade name), IRGACURE 1800 (trade name), IRGACURE 1850 (trade name), DAROCURE 4265 (trade name), IRGACURE 784 (trade name), p-methoxyphenyl-2,4-bis(trichloromethyl)triazine, 2-(p-butoxystyryl)-5-trichloromethyl-1,3,4-oxadiazole, 9-phenylacridine, 1-(4-isopropylphenyl)-2-hydroxy-2-methylpropan-1-one, benzyl dimethyl ketal, 2-methyl-1-[4-(methylthio)phenyl]-2-morpholinopropane-1,2,4-diethylxanthone/p-methyl dimethylaminobenzoate mixture, and the like.

Polymers obtained by thermal polymerization or photopolymerization may be used for various applications such as protective films or liquid crystal alignment films, viewing angle compensation films and the like. Photopolymerization may be carried out by using polarized light, and especially polarized UV light, for alignment of the polymerizable molecules in the direction of the polarized light. Thus, polymers obtained by photopolymerization may also be applied for various protective films or liquid crystal alignment films, as well as alignment layers which require no rubbing. Since the polymers of the invention have optical anisotropy, they may be used alone as phase contrast films, or used in combinations with other phase contrast films for applications in polarizing elements, circular polarizing elements, elliptical polarizing elements, anti-reflection films, color compensation films, selective reflection films, viewing angle compensation films, and the like.

A composition comprising an appropriate amount of Compound (1) having optical activity, or a composition obtained by adding an appropriate amount of an optically active compound to Compound (1) having no optical activity, is coated onto an alignment-treated substrate and polymerized to obtain a phase contrast film exhibiting a helical (twist) structure. The properties of the obtained optical anisotropic material will depend on the helical pitch of the resulting helical structure. The helical pitch length may be adjusted by the type and amount of optically active compound added. A single optionally active compound may be added, but a plurality of optically active compounds may also be used for the purpose of canceling out the temperature dependency of the helical pitches. A polymerizable compound other than Compound (1) may also be included in addition to Compound (1) and the optically active compound.

Selective reflection of visible light as a property of the optical anisotropic material occurs as the helical structure acts on incident light and reflects circular polarized light or elliptical polarized light. The selective reflection property is expressed by $\lambda = n \cdot Pitch$ (where $\lambda$ is the center wavelength of selective reflection, n is the mean refractive index and Pitch is the helical pitch), and therefore $\lambda$ and its band ($\Delta\lambda$) may be appropriately adjusted by n and Pitch. Color purity can be improved by reducing $\Delta\lambda$, while reflection in a wider band can be achieved by increasing $\Delta\lambda$. The selective reflection is also significantly affected by the cell thickness. In order to maintain color purity, the cell thickness must not be too small. However, the cell thickness also must not be too large in order to maintain uniformity of alignment. Appropriate adjustment of the cell thickness is therefore necessary, and it is preferably 0.5–25 µm and more preferably 0.5–5 µm.

By producing a helical pitch which is even shorter than visible light, it is possible to prepare the negative type c-plate described in W. H. de Jeu, Physical Properties of Liquid Crystalline Materials, Gordon and Breach, New York (1980). The helical pitch can be shortened by using an optically active compound with high helical twisting power (HTP), or by increasing the amount of addition.

Specifically, a negative type c-plate may be prepared by limiting $\lambda$ to no greater than 350 nm and preferably no greater than 200 nm. The negative type c-plate can serve as an optical compensation film which is suitable for a VAN, VAC or OCB type liquid crystal display element.

The optically active compound added may be any optically active compound which can be appropriately mixed with the polymerizable liquid crystal composition acting as the base composition to produce the helical structure. For example, the following optically active compounds (Op-1) to (Op-13) are suitable.

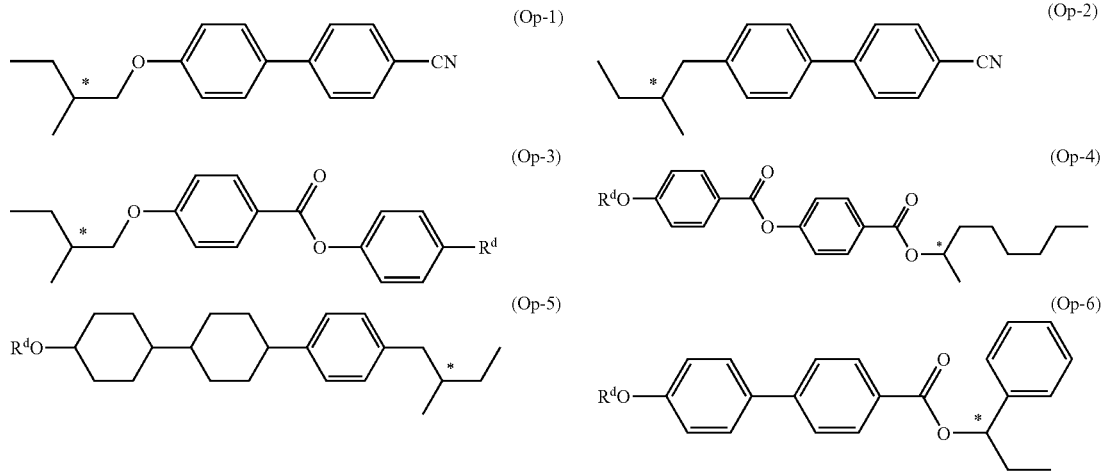

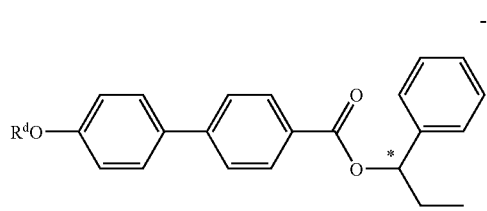
(Op-7)

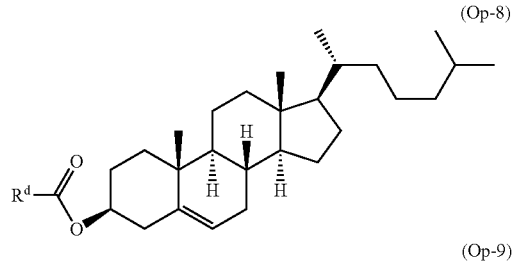
(Op-8)

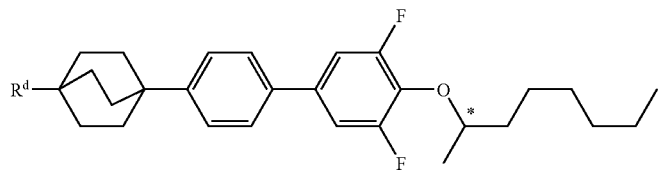
(Op-9)

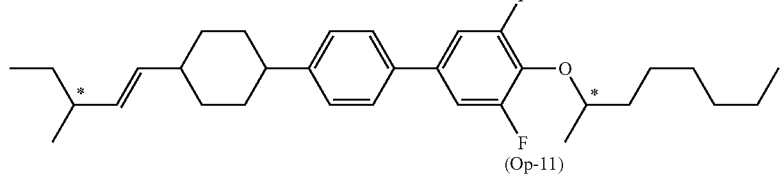
(Op-10)

(Op-11)

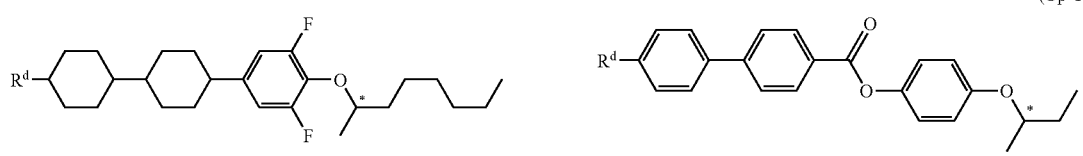
(Op-12)

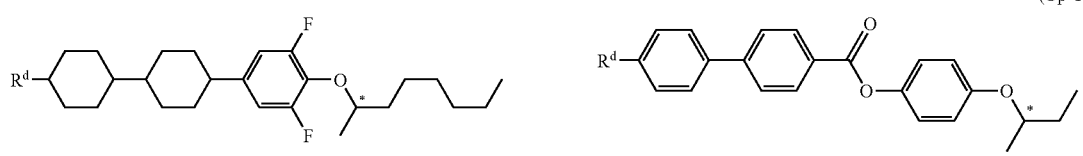
(Op-13)

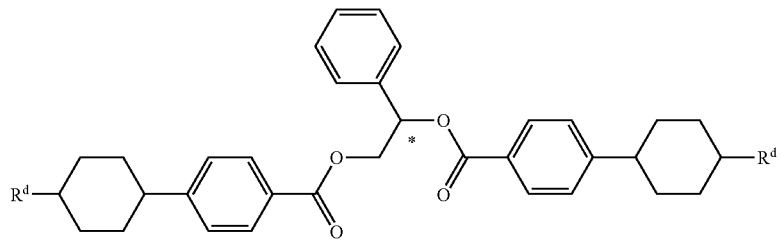

wherein Rd represents C1–10 alkyl and the carbon indicated by * is an asymmetric carbon.

The optically active compound added may be either a polymerizable compound or non-polymerizable compound, as optimal for the purpose. A polymerizable compound is preferred when considering thermal stability and solvent stability. The optically active compound added is preferably one with high helical twisting power (HTP) in order to shorten the helical pitch. Examples of compounds with high helical twisting power are disclosed in DE10221751. Particularly preferred compounds are shown below as compounds (Op-14) to (Op-19).

Compounds (Op-14) to (Op-16) are polymerizable compounds, and compounds (Op-17) to (Op-19) are non-polymerizable compounds. Introduction of a polymerizable group at the terminal —$C_3H_7$ of the compounds (Op-17) to (Op-19) can yield optically active compounds with useful polymerizability.

(Op-14)

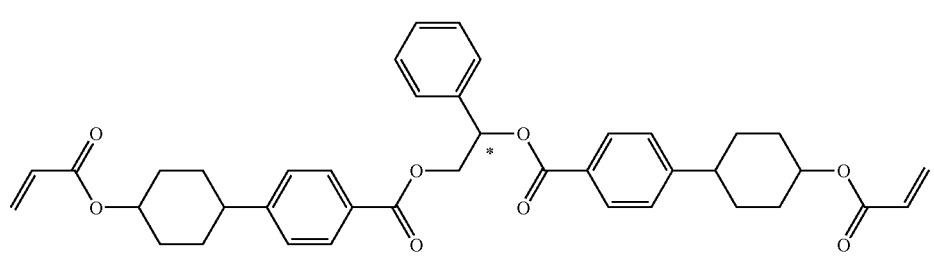

-continued

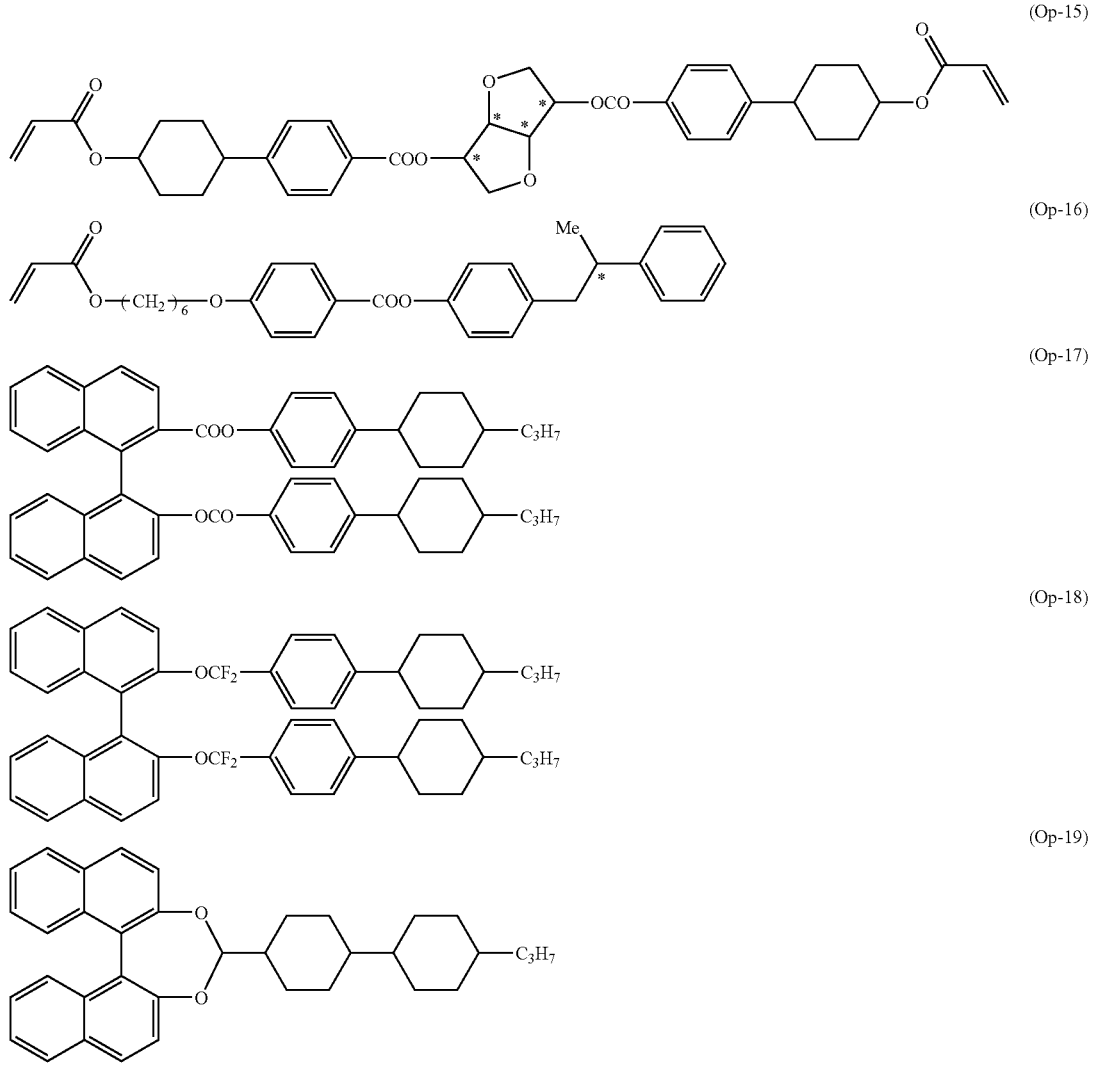

Thermal polymerization is preferred for fabrication of an alignment layer, anti-reflection film, viewing angle compensation film or the like. For thermal polymerization, Compound (1) and the other polymerizable compound as an optional component are polymerized in the presence of a radical polymerization initiator. Preferred initiators for radical polymerization by heat include benzoyl peroxide, diisopropyl peroxydicarbonate, t-butylperoxy-2-ethyl hexanoate, t-butyl peroxypivalate, di-t-butyl peroxide (DTBPO), t-butyl peroxydiisobutyrate, lauroyl peroxide, dimethyl 2,2'-azobisisobutyrate (MAIB), azobisisobutyronitrile (AIBN), azobiscyclohexanecarbonitrile (ACN) and the like. The polymerization is generally carried out at a reaction temperature of 0–150° C. for 1–100 hours.

Preferred initiators for anionic polymerization and coordination polymerization include alkali metal alkyl compounds, aluminum compounds, transition metal compounds and the like, including n-$C_4H_9$Li and t-$C_4H_9$Li—$R_3$Al.

The compounds of formula (1) and compositions containing them may be polymerized by cationic polymerization. Cationic polymerization can be initiated by photoirradiation and heat. A cationic polymerization initiator may also be added to shorten the reaction time and increase the polymerization degree. As photocations there may be suitably used Bronsted acids, halogenated metal compounds and onium salts. For specific examples, refer to Makromolekulare Chemie, VCH Verlag, Weinheim and An Introduction to Polymer Science, VCH Verlag, Weinheim.

The polymerization is preferably carried out in an inert gas atmosphere such as nitrogen or argon, but the polymerization may also be carried out in air if the initiator and compound structure are optimized.

When the polymerizable site is one of formula (6), the compound of formula (1) reacts with a nucleophilic reagent such as a phenol or amine to produce a secondary alcohol. A polymer may be produced by using a polyfunctional nucleophilic reagent.

For the polymerization, another solvent may also be added as a catalyst for Compound (1) or the polymerizable composition. Examples of preferred solvents include benzene, toluene, xylene, mesitylene, hexane, heptane, octane, nonane, decane, tetrahydrofuran, γ-butyrolactone, N-methylpyrrolidone, dimethylformamide, dimethylsulfoxide, cyclohexane, methylcyclohexane, cyclopentanone, cyclohexanone, PGMEA and their mixtures. For production of an alignment film, anti-reflection film, viewing angle compensation film or the like by photopolymerization, a solution of the composition may be spin coated onto a substrate and the solvent removed, prior to irradiation with light for polymerization. A publicly known coater (doctor blade, coating apparatus, etc.) may be used for coating of the composition onto the substrate. There is no particular reason to limit the proportion of solvent used for the polymerization, and it may be determined for each individual case in consideration of the polymerization efficiency, solvent cost or energy cost.

The isolated polymer may be dissolved in a solvent for molding. Preferred solvents include N-methylpyrrolidone, dimethylsulfoxide, N,N-dimethylacetamide, N,N-dimethylformamide, N,N-dimethylacetamidedimethylacetal, tetrahydrofuran, chloroform, 1,4-dioxane, bis(methoxyethyl)ether, γ-butyrolactone, tetramethyl urea, trifluoroacetic acid, ethyl trifluoroacetate, hexafluoro-2-propanol, cyclohexane, methylcyclohexane, cyclopentanone, cyclohexanone and PGMEA. However, the solvent is not limited to these, and it may also be a mixture with common organic solvents such as acetone, benzene, toluene, heptane, methylene chloride and the like. Incidentally, there is no particular reason to limit the proportion of solvent used for the process, as for polymerization, and it may be determined for each individual case in consideration of the thickness of the thin-film to be produced, the vapor pressure of the solvent in the production environment, and the like. Depending on the purpose of use, two or more polymers of the invention may be used in admixture, or they may be used as a laminate. When used as a laminate, the polymers may be formed directly into a thin-film by photopolymerization without being isolated first.

Since a polymer according to the invention has optical anisotropy, it may be used alone in a retardation film. The polymer may also be combined with other retardation films for utilization in polarizing plates, circular polarizing plates, elliptical polarizing plates, anti-reflection films, color compensation films, viewing angle compensation films, and the like. Compounds according to the invention may also be utilized as adhesives, synthetic polymers with mechanical anisotropy, cosmetics, decorations, nonlinear optical materials and information recording materials.

The polymers of the invention exhibit refractive indexes of 1.35 to 1.60. The refractive index may be optimized by selecting the structure of the compound of formula (1). Specifically, a large refractive index can be obtained with a greater number of unsaturated bonds, and a small refractive index can be obtained with a lower number of unsaturated bonds. The refractive index may be adjusted by adding fine inorganic particles. Addition of fine particles can increase the refractive index to about 2.50, while also enhancing the adhesion property and mechanical strength. For this purpose, there may be used fine particles of $TiO_2$, $SiO_2$, $SnO_2$ or the like having particle sizes of about 10 nm to 1 μm.

The compounds of formula (1) have polymerizable sites at both ends and therefore allow easy production of polymers with high polymerization degrees and high molecular weights. When a composition comprises a compound of formula (1) and compounds not represented by formula (1) and the compounds not represented by formula (1) include numerous compounds having one polymerizable site, the molecular weight of the resulting polymer will be reduced and the glass transition temperature and melting point will be lower, thereby resulting in superior processability. The preferred molecular weight range for purposes requiring such properties is a weight-average molecular weight of 500–500,000. When the compounds not represented by formula (1) are polyfunctional, the molecular weight of the obtained polymer will be higher, thereby resulting in superior chemical resistance and heat resistance. The preferred molecular weight range for purposes requiring such properties is a weight-average molecular weight of 500,000 or greater. When a composition of the invention is coated and polymerized on a substrate to fix the molecular alignment in order to obtain optical anisotropy, the size of the molecular weight is not a problem because there is no further need for processing. It is then sufficient to satisfy the conditions for the environment of use.

A crosslinking agent may also be added for further increased molecular weight. There is no upper limit restriction on the molecular weight, and thus polymers with very excellent chemical resistance and heat resistance can be obtained. Any crosslinking agents which are publicly known to those skilled in the art may be used.

The compounds and compositions of the invention have high polymerizability. In order to facilitate handling, a stabilizer may also be added. Any stabilizers which are publicly known to those skilled in the art may be used, and as examples there may be mentioned hydroquinone, 4-ethoxyphenol and 3,5-di-t-butyl-4-hydroxytoluene (BHT).

Any substrate publicly known to those skilled in the art may be suitably used for formation of an optical anisotropic thin-film. As examples there may be mentioned glass, polyesters such as polyethylene terephthalate (PET), polyvinyl alcohol (PVA), polycarbonate (PC), triacetylcellulose (TAC), and norbornene-based polymers such as ZEONOR™ (Zeon Corp.), ZEONEX™ (Zeon Corp.) and ARTON™ (JSR). These substrates are preferred because polymers of the invention have excellent adhesion therewith.

Alignment of a composition of the invention on the substrate can be achieved by subjecting an alignment film coated on a substrate to rubbing treatment and then coating the composition of the invention thereover. The object can be achieved using any alignment film publicly known to those skilled in the art so long as it allows alignment control, but polyimide, polyamide and polyvinyl alcohol-based alignment films are preferred. Alternatively, the substrate itself may be rubbed with a rubbing cloth or the like and then coated directly with the composition of the invention to achieve alignment. This is an industrially advantageous method since the aligned composition may be polymerized by photoirradiation or the like to yield an optical anisotropic material.

The compounds, compositions and polymers of the invention may be used in the liquid crystal display elements of color filters, holographic elements, PDLCs (Polymer Dispersed Liquid Crystals) PSCTs (Polymer Stabilized Cholesteric Textures) and the like.

The compounds of formula (1) are particularly suitable for use in alignment-controlled liquid crystal polymer thin-films. They can be easily applied to liquid crystal display elements if they are publicly known to those skilled in the art. The examples provided below, therefore, are merely a small group of examples to facilitate comprehension by those skilled in the art, and are not intended to restrict the invention or its application in any way.

EXAMPLES

The invention will now be explained in greater detail by examples, with the understanding that these examples are not limitative on the invention. The structures of the compounds were confirmed by nuclear magnetic resonance spectroscopy and mass spectroscopy. For the nuclear magnetic resonance spectroscopy, d represents "doublet", dd represents "double doublet", t represents "triplet", q represents "quartet" and m represents "multiplet". The units of the phase transition temperature are °C., C represents "crystals", N represents "nematic phase" and I represents "isotropic liquid phase". The liter units for the volume are represented by the symbol L. The measuring methods for the physical properties were as follows.

<Weight-average Molecular Weight and Number-average Molecular Weight>

These were measured using a Shimadzu LC-9A gel Permeation Chromatograph by Shimadzu Corp. and a Shodex GF-7M HQ Column (developing solvent: DMF) by Showa Denko Co., Ltd.

Example 1

Production of 2-trifluoromethyl-1,4-bis[4-(6-acryloyloxyhexyloxy)benzoyloxy]benzene (Compound 1a-2-5)

Compound (1a-2-5) was produced by the following reaction path.

for liquid separation and the aqueous layer was extracted three times with diethyl ether. The organic layers were combined, washed with an 1 M aqueous sodium hydroxide solution and dried over anhydrous magnesium sulfate. The solvent was distilled off under reduced pressure to obtain 19.3 g of Compound (b).

$^1$H-NMR(CDCl$_3$; δ ppm): 7.33(t, 1H), 7.61(d, 1H), 7.11 (s, 1H), 7.02(dd, 1H), 4.01(q, 2H), 1.40(t, 3H).

Stage 2 Synthesis of 2-bromo-5-ethoxybenzotrifluoride (c)

Bromine (18.2 g) was slowly added dropwise to Compound (b) (19.3 g) at room temperature, and then the mixture was stirred at room temperature for 1 hour. Water and ether were added for liquid separation, and the aqueous layer was extracted three times with ether. The organic layers were combined, washed with saturated aqueous sodium bicarbonate and water, and then dried over anhydrous magnesium sulfate. The solvent was distilled off under reduced pressure to obtain 21.0 g of Compound (c).

$^1$H-NMR(CDCl$_3$; δ ppm): 7.55(d, 1H), 7.20(d, 1H), 6.88 (dd, 1H), 4.02(q, 2H), 1.42(t, 3H).

Stage 3 Synthesis of 4-ethoxy-2-trifluoromethylphenylboric Acid (d)

Compound (c) (10.0 g) dissolved in tetrahydrofuran (THF) (40 mL) was cooled to −78° C., a 1.6 M butyllithium/

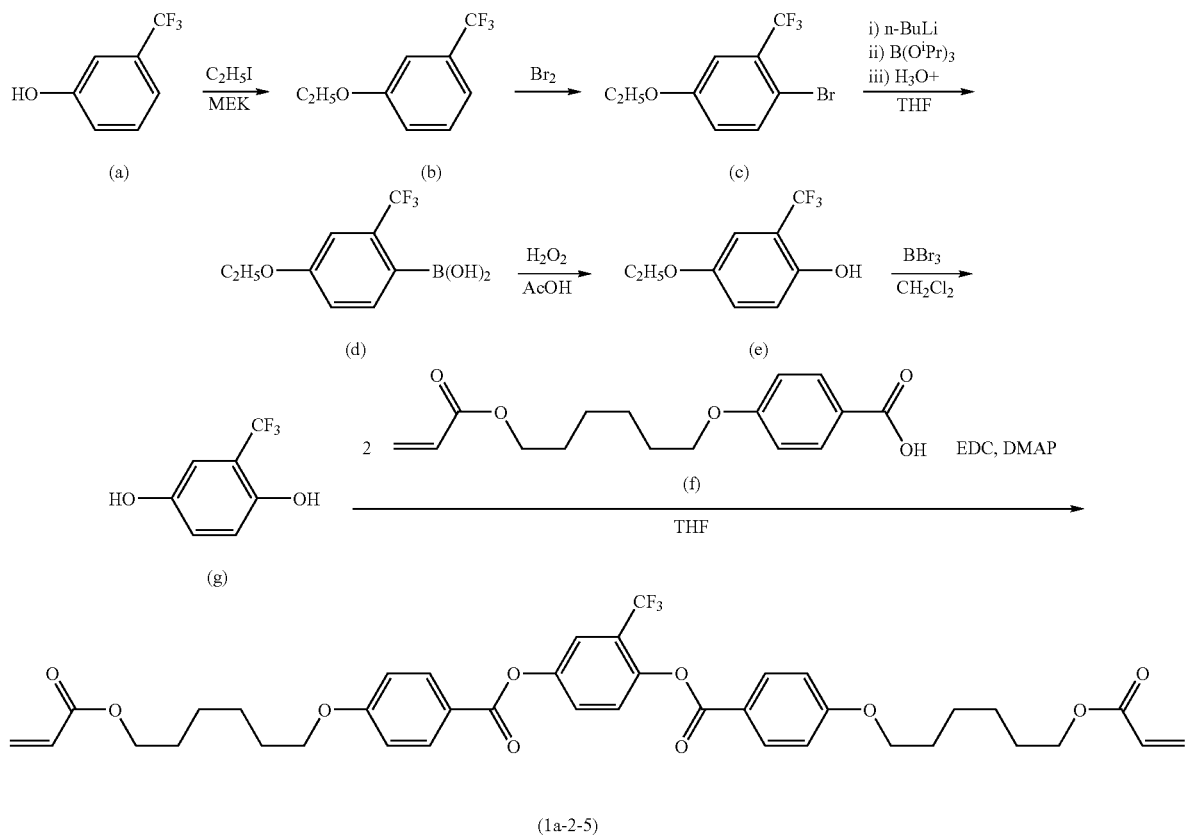

Stage 1 Synthesis of 3-ethoxybenzotrifluoride (b)

Potassium carbonate (22.6 g) and then a mixture of methyl ethyl ketone (MEK) (150 mL) and ethyl iodide (47.8 g) were added to a mixture of MEK (310 mL) and 3-trifluoromethylphenol (a) (25.0 g) at room temperature, and the reaction mixture was heated and stirred for 2 hours. After returning the mixture to room temperature, water was added hexane solution (30 mL) was slowly added dropwise and the mixture was stirred at the same temperature for 2 hours. Triisopropyl borate (14.0 g) dissolved in THF (20 mL) was then slowly added dropwise at −78° C., and the mixture was stirred at the same temperature for 1 hour. The temperature was increased to room temperature and the final solution was stirred. After adding 3 M hydrochloric acid (200 mL)

dropwise at ice-cooling temperature, the aqueous layer was extracted three times with ether. The organic layers were combined, washed with water and dried over anhydrous magnesium sulfate. The solvent was distilled off under reduced pressure to obtain 8.28 g of Compound (d).

Stage 4 Synthesis of 4-ethoxy-2-trifluoromethylphenol (e)

Acetic acid (21.3 g) was added to a mixture of THF (200 mL) and Compound (d) (8.28 g) at room temperature, and the mixture was stirred at 0° C. under a nitrogen atmosphere. After adding 30% hydrogen peroxide water (40.1 g) dropwise, the resulting reaction mixture was carefully heated and stirred at 50° C. for 4 hours. Saturated aqueous sodium hydrogen sulfite (200 mL) was then slowly added dropwise at 0° C., and the reaction mixture was extracted three times with ether. The organic layers were combined, washed with aqueous saturated sodium hydrogen sulfite, and dried over anhydrous magnesium sulfate. The solvent was distilled off under reduced pressure to obtain 6.67 g of Compound (e).

$^1$H-NMR(CDCl$_3$;δ ppm): 7.03(d, 1H), 6.95(dd, 1H), 6.88 (d, 1H), 3.99(q, 2H), 1.39(t, 3H).

Stage 5 Synthesis of 2-trifluoromethylhydroquinone (g)

Boron tribromide (11.8 g) was slowly added dropwise to dichloromethane (41 mL) cooled to −78° C., and then Compound (e) (6.47 g) dissolved in dichloromethane (60 mL) was slowly added dropwise at the same temperature and the mixture was stirred at room temperature for 2 hours. The reaction mixture was then poured into ice water and the aqueous layer was extracted with ether. The organic layers were combined, washed with saturated aqueous sodium chloride, and dried over anhydrous magnesium sulfate. The solvent was distilled off under reduced pressure to obtain 3.53 g of Compound (g).

$^1$H-NMR(CDCl$_3$;δ ppm): 7.03(d, 1H), 6.92(dd, 1H), 6.86 (d, 1H).

Stage 6 Synthesis of Compound (1a-2-5)

A mixture of Compound (g) (2.02 g), 4-(6-acryloyloxyhexyloxy)benzoic acid (f) (7.90 g), 4-dimethylaminopyridine(3.37 g) and THF (70 mL) was cooled in an ice bath. After adding 1-ethyl-3-(3-dimethylaminopropyl) carbodiimide (7.73 g) thereto, the mixture was stirred overnight. Distilled water was added and the reaction mixture was extracted twice with methylene chloride. The organic layers were combined, washed with 2 M hydrochloric acid and saturated aqueous sodium bicarbonate, and dried over anhydrous sodium sulfate. The solvent was distilled off and purified by column chromatography (silica gel) to obtain 7.03 g of the target product as colorless crystals with a nematic phase (yield: 85.3%).

Phase transition temperature: C 73.7 N 78.8 I $^1$H-NMR(CDCl$_3$; δ ppm): 8.16–8.13(m, 4H), 7.58(d, 1H), 7.50–7.46(m, 2H), 6.99(dd, 4H), 6.41(dd, 2H), 6.13(dd, 2H), 5.83(dd, 2H), 4.19(t, 4H), 4.06(t, 4H), 1.88–1.83(m, 4H), 1.76–1.71(m, 4H), 1.58–1.45(m, 8H).

Example 2

Compounds (1a-1-1) to (1f-4-1) are produced according to the method of Example 1. Compound (1a-2-5) produced in Example 1 is also shown.

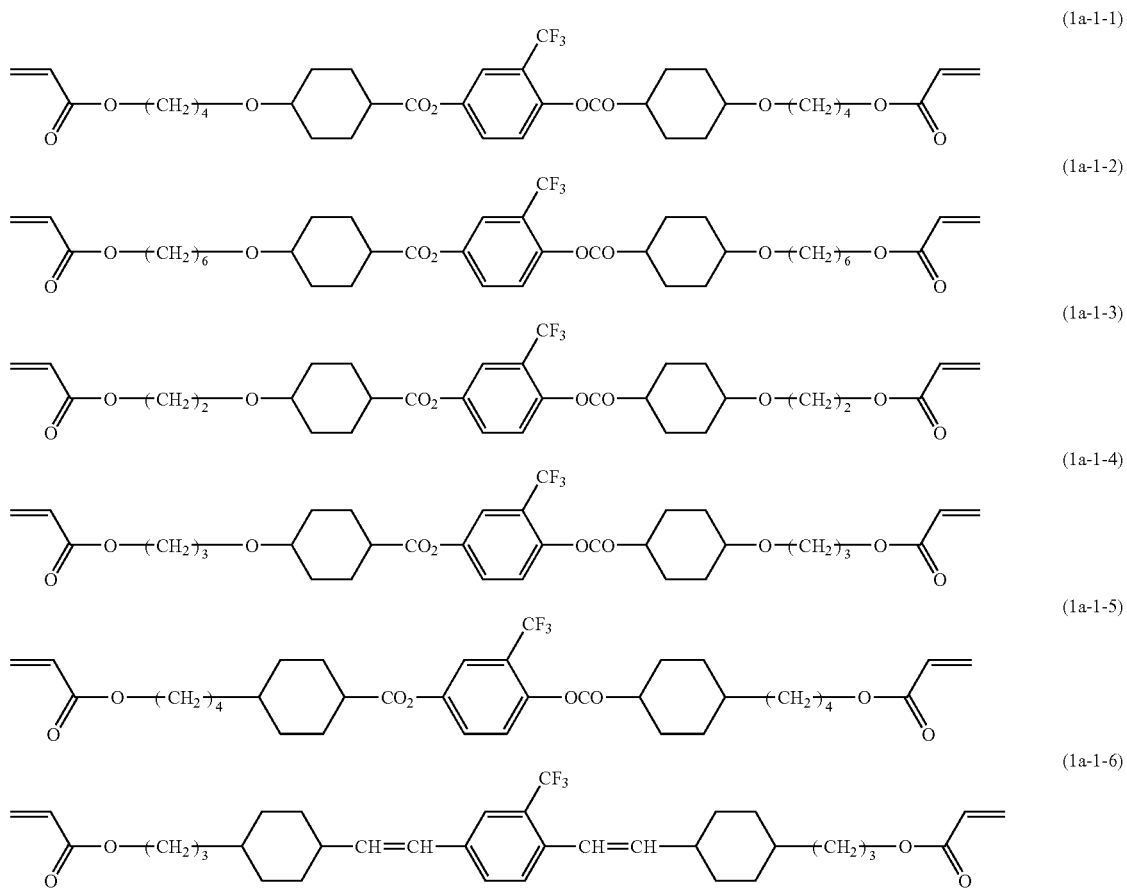

-continued
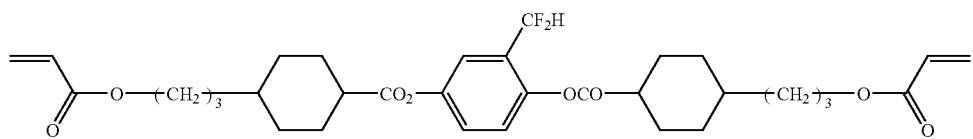
(1a-1-7)
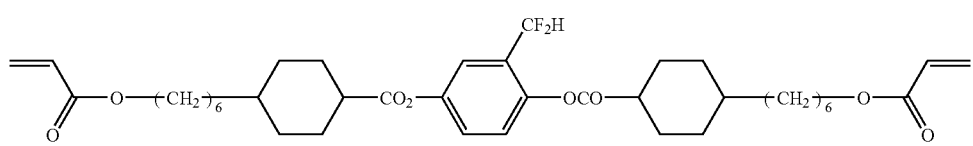
(1a-1-8)
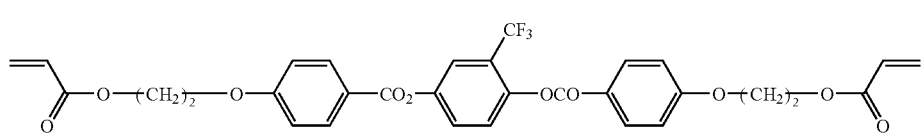
(1a-2-1)
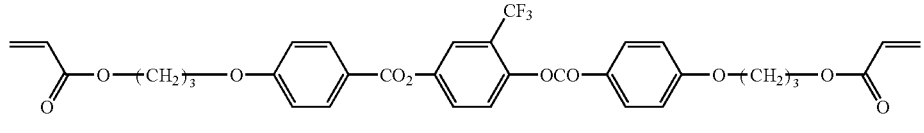
(1a-2-2)
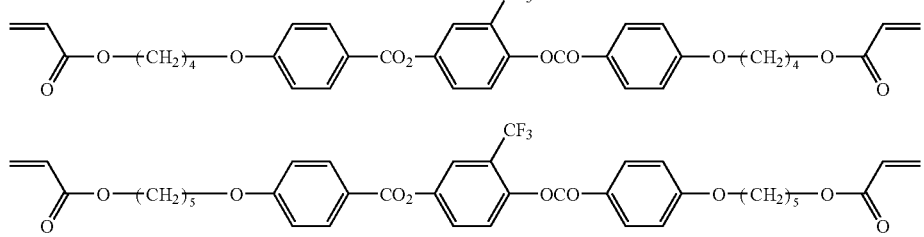
(1a-2-3)
(1a-2-4)
C 73.7 N 78.81
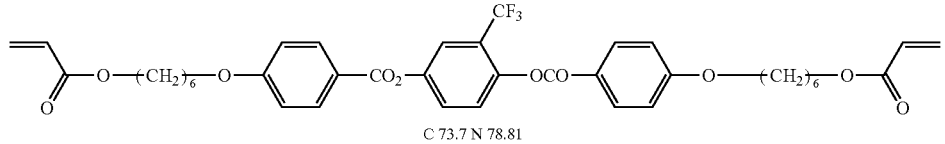
(1a-2-5)
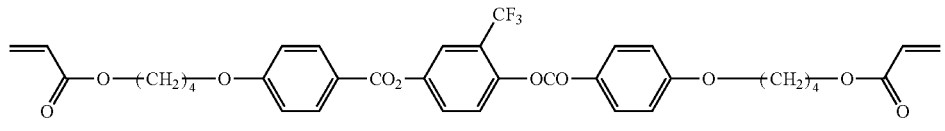
(1a-2-6)
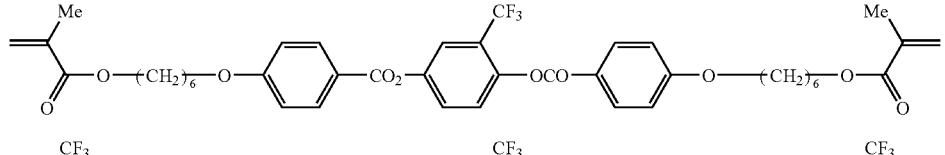
(1a-2-7)
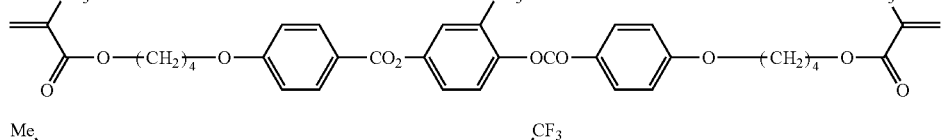
(1a-2-8)
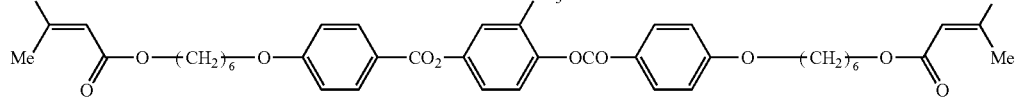
(1a-2-9)
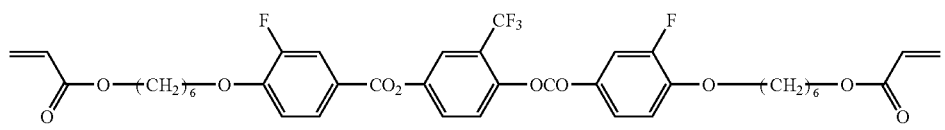
(1a-2-10)

-continued
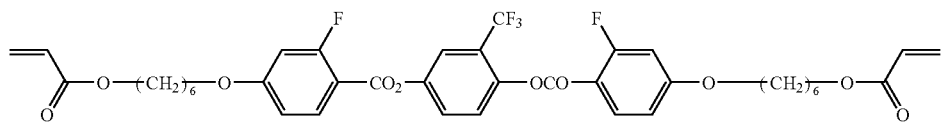
(1a-2-11)
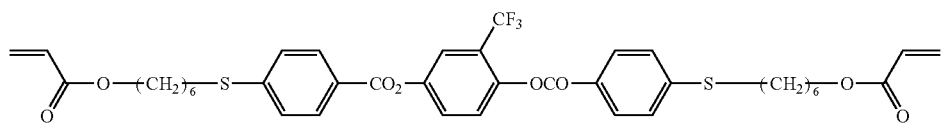
(1a-2-11′)
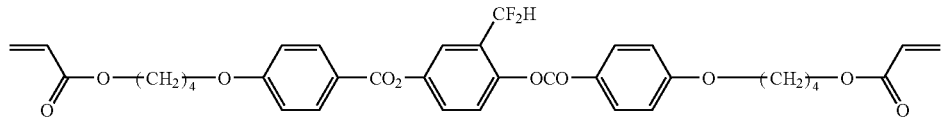
(1a-2-12)
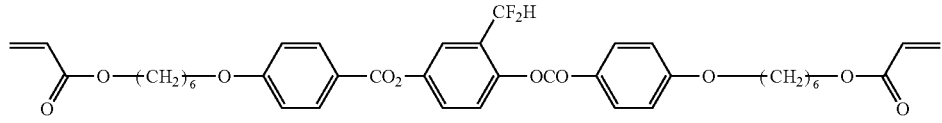
(1a-2-13)
C 73.8 N 85.41
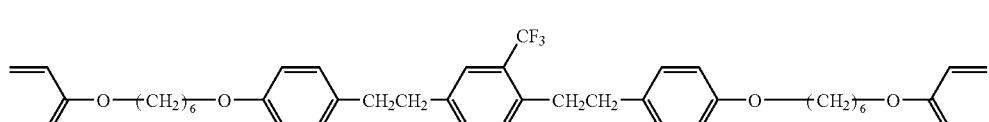
(1a-2-14)
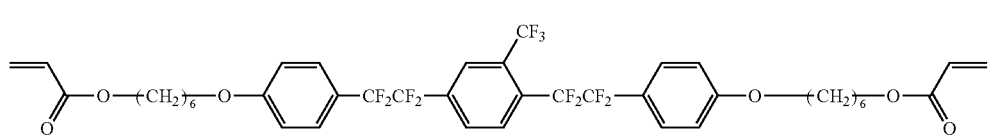
(1a-2-15)
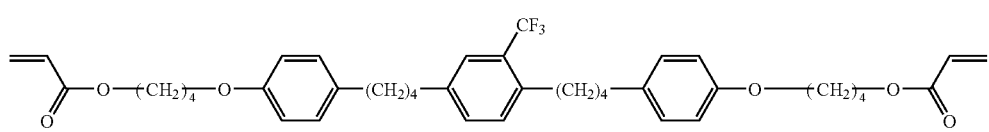
(1a-2-16)
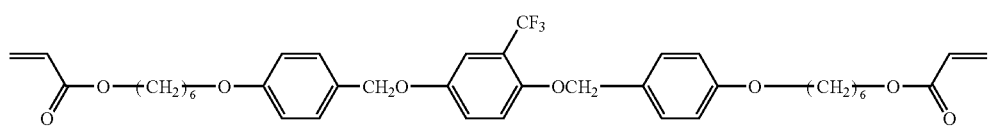
(1a-2-17)
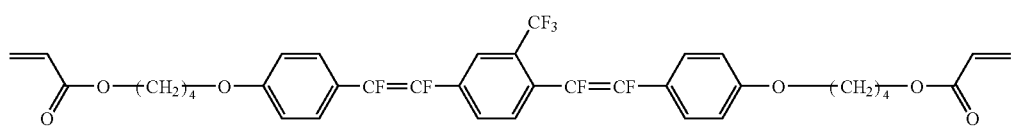
(1a-2-18)
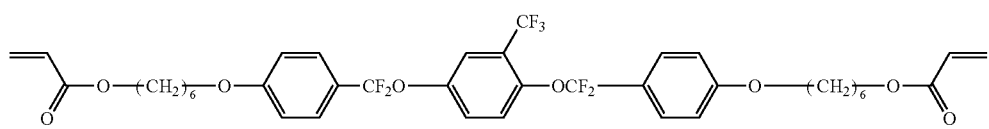
(1a-2-19)
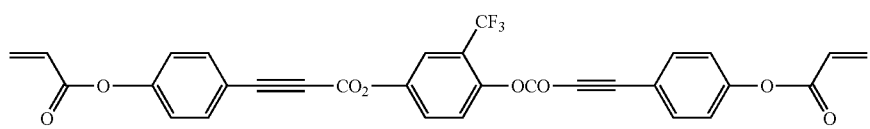
(1a-2-20)
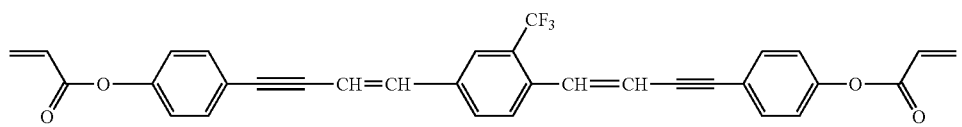
(1a-2-21)

-continued
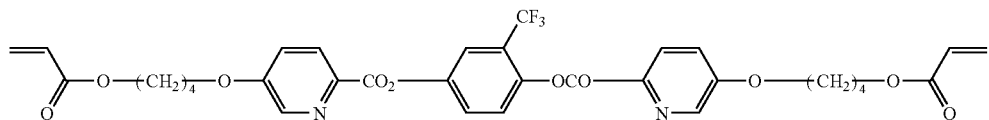
(1a-2-22)
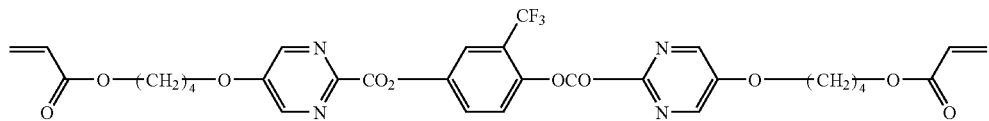
(1a-2-23)
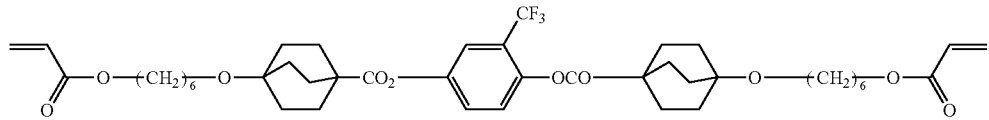
(1a-2-24)
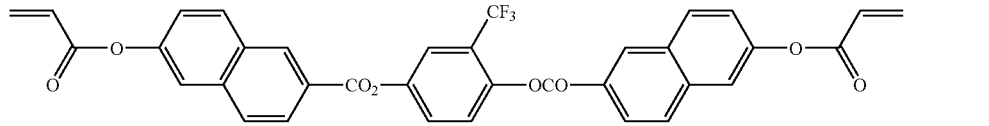
(1a-2-25)
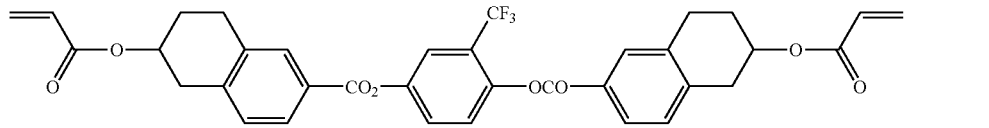
(1a-2-26)
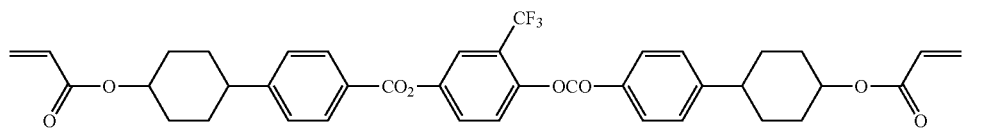
(1a-2-27)
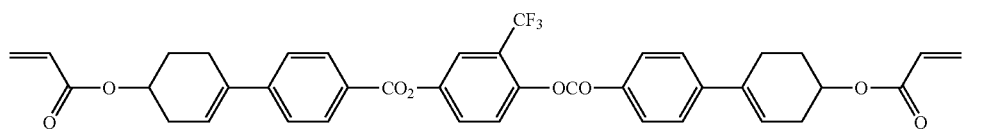
(1a-2-28)
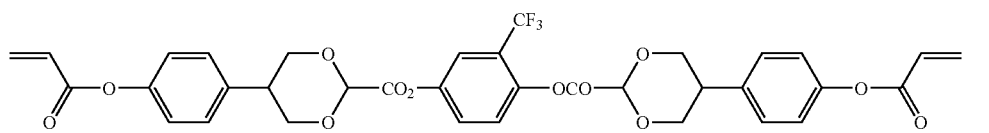
(1a-2-29)
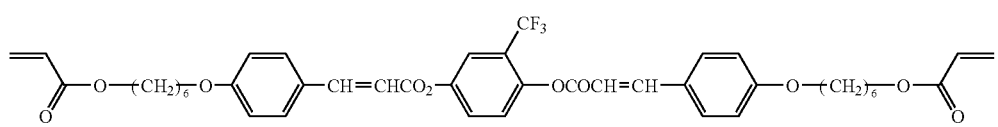
(1a-2-30)
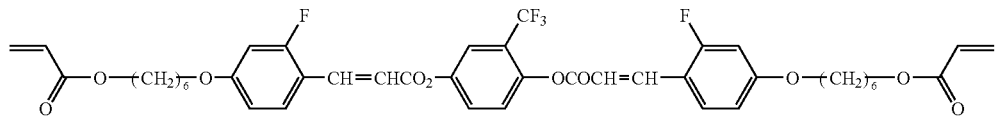
(1a-2-31)
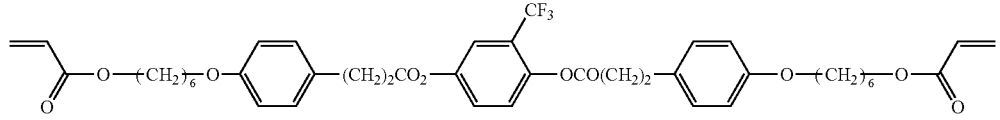
(1a-2-32)
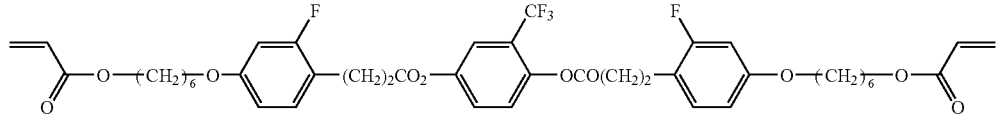
(1a-2-33)

-continued
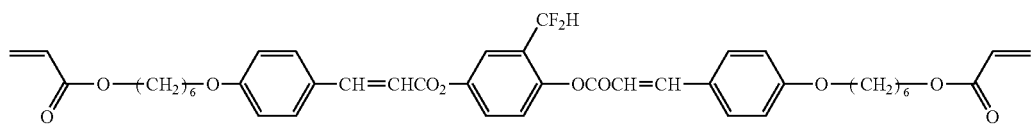 (1a-2-34)
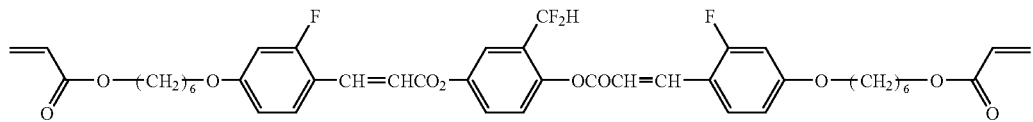 (1a-2-35)
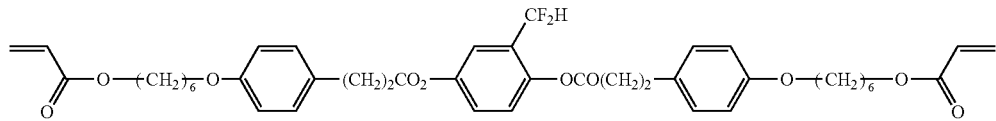 (1a-2-36)
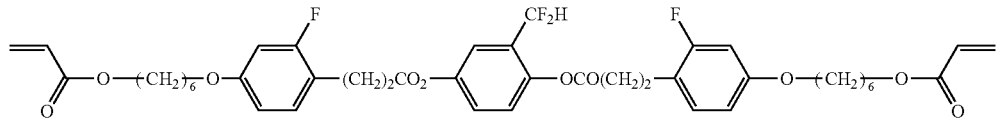 (1a-2-37)
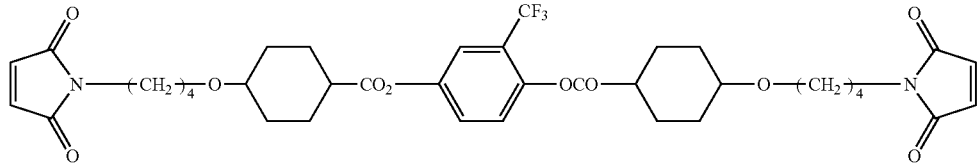 (1b-1-1)
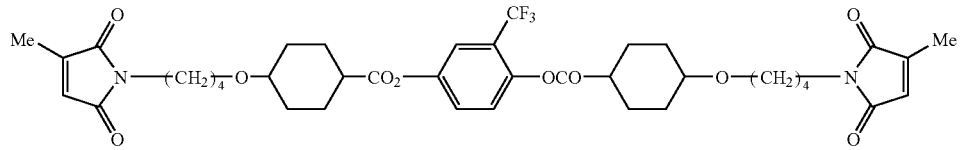 (1b-1-2)
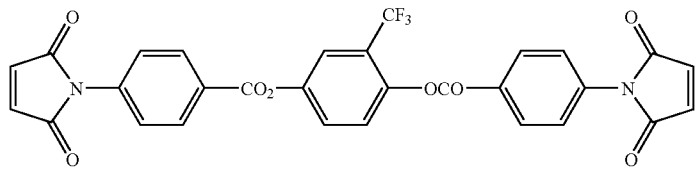 (1b-2-1)
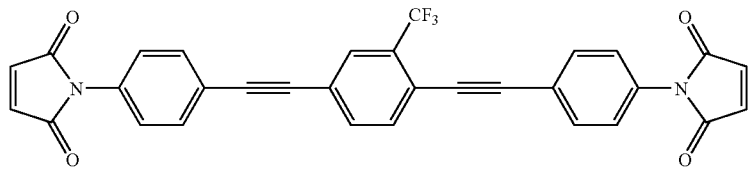 (1b-2-2)
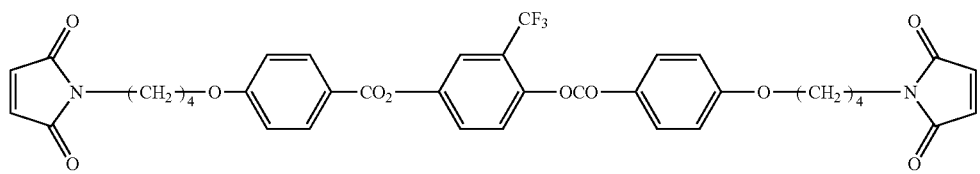 (1b-2-3)
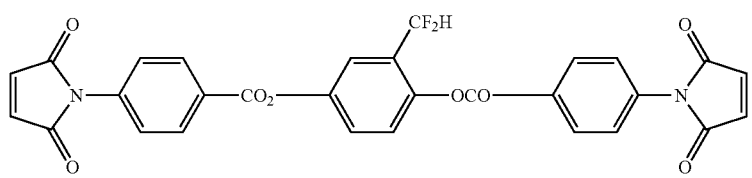 (1b-2-4)

-continued
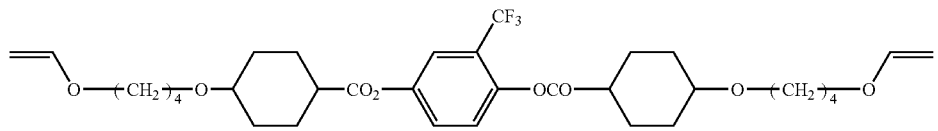
(1c-1-1)
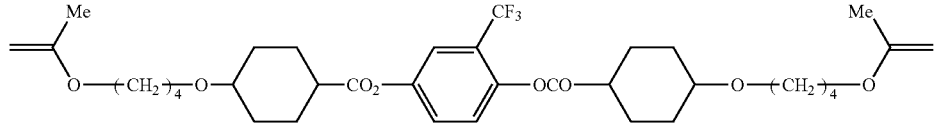
(1c-1-2)
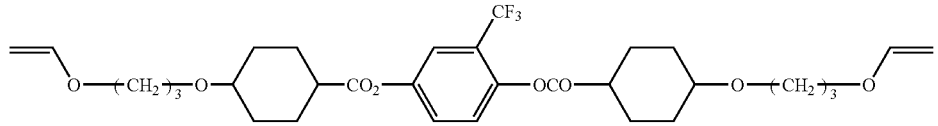
(1c-1-3)
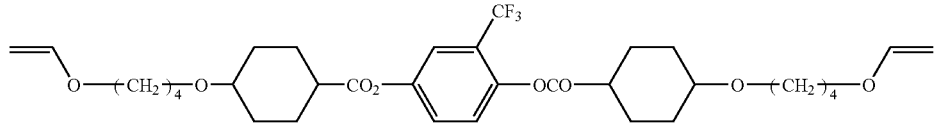
(1c-1-4)
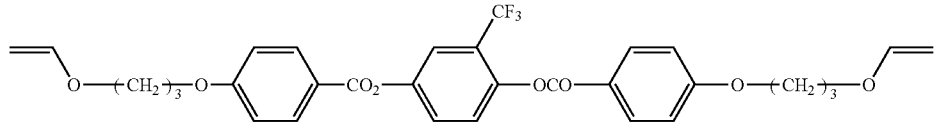
(1c-2-1)
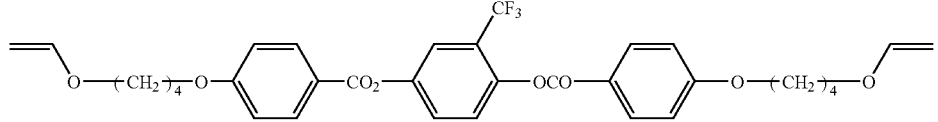
(1c-2-2)
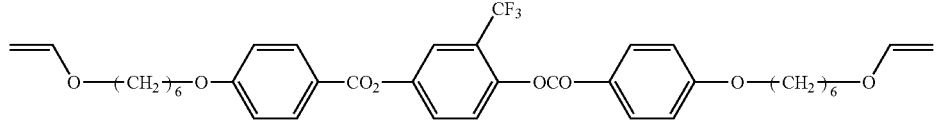
(1c-2-3)
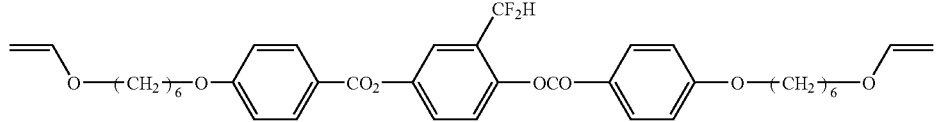
(1c-2-4)
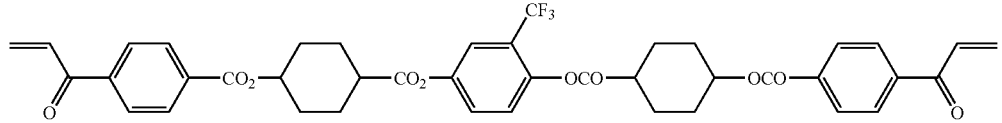
(1d-1-1)
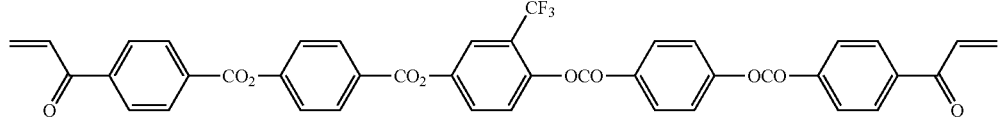
(1d-2-1)
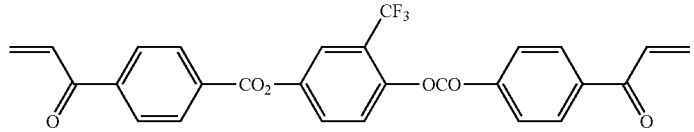
(1d-3-1)

-continued
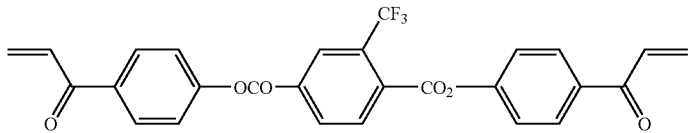
(1d-3-2)
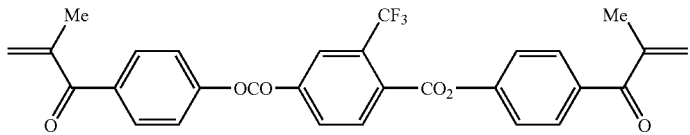
(1d-3-3)
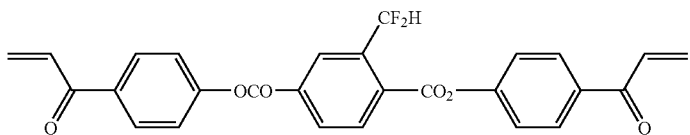
(1d-3-4)
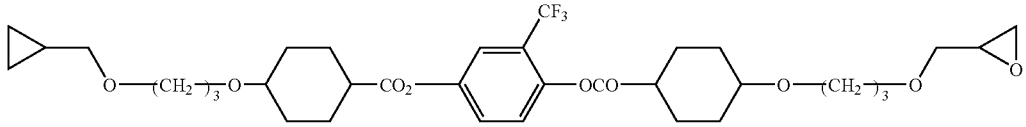
(1e-1-1)
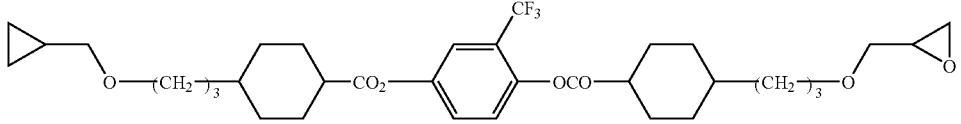
(1e-1-2)
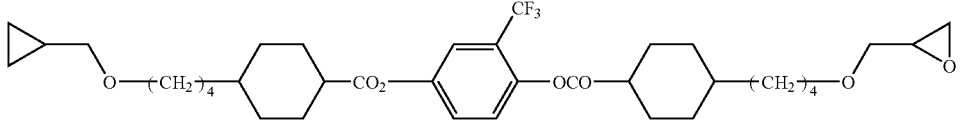
(1e-1-3)
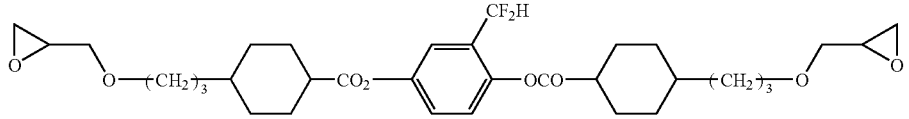
(1e-1-4)
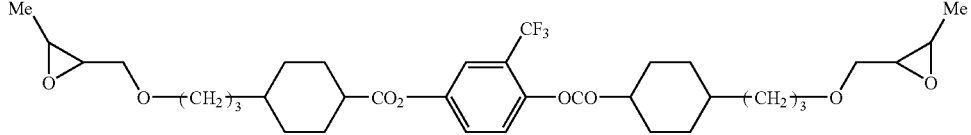
(1e-1-5)
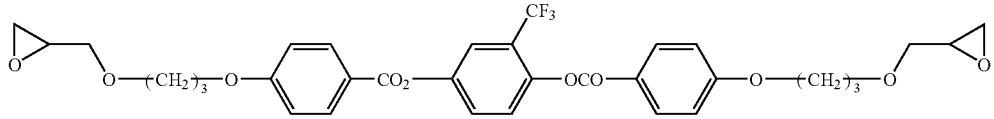
(1e-2-1)
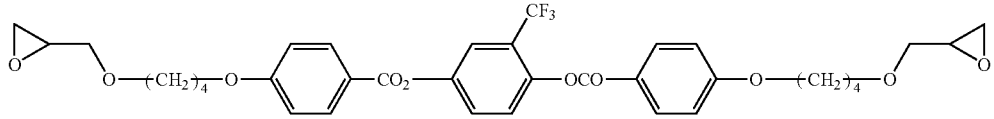
(1e-2-2)
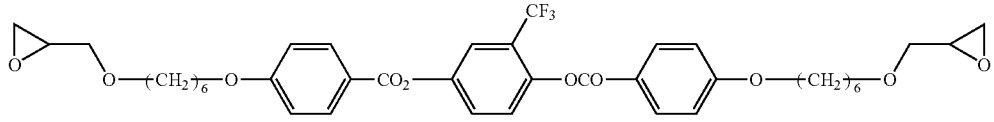
(1e-2-3)

-continued
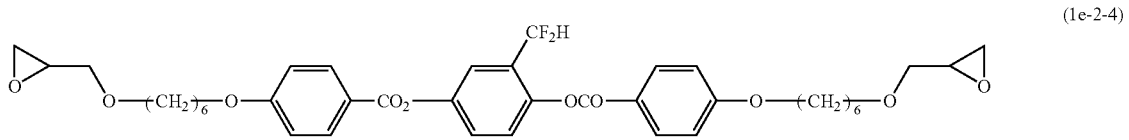
(1e-2-4)
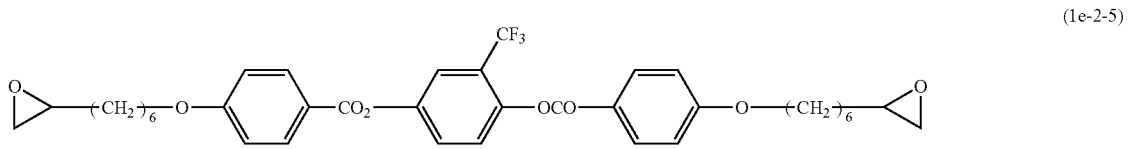
(1e-2-5)
C 51 N 122 I
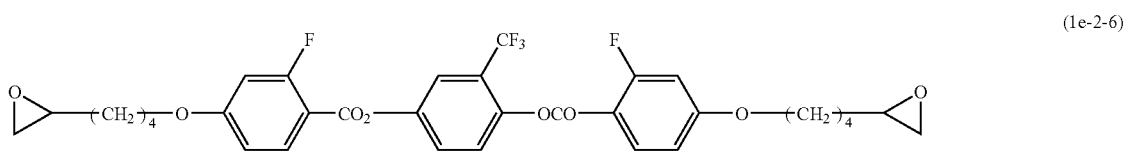
(1e-2-6)
C 58 N 91 I
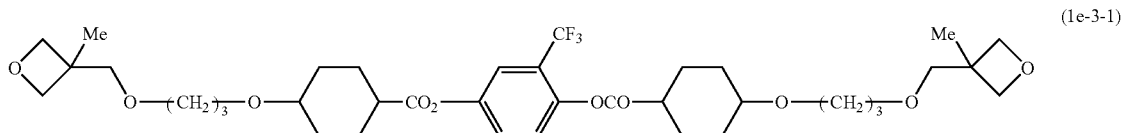
(1e-3-1)
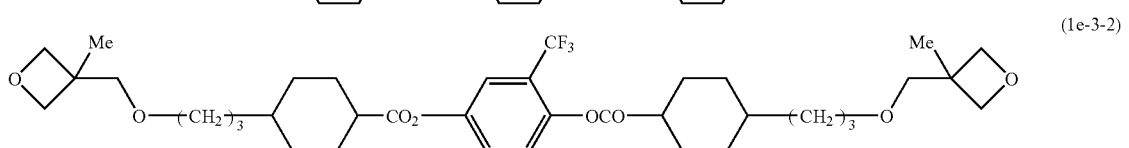
(1e-3-2)
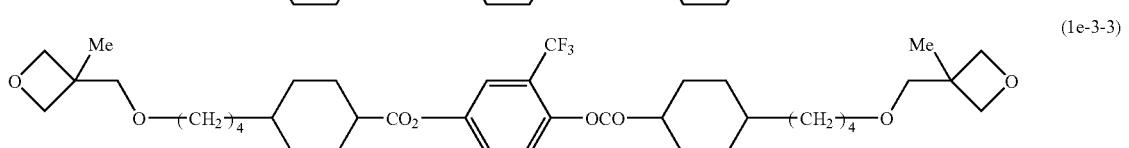
(1e-3-3)
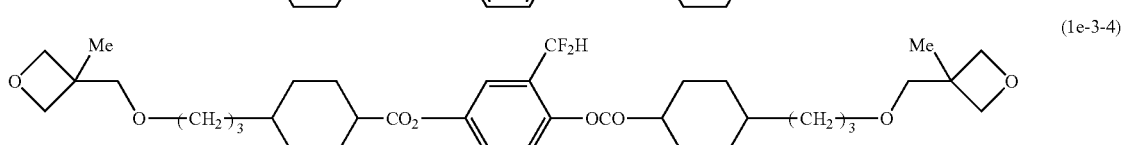
(1e-3-4)
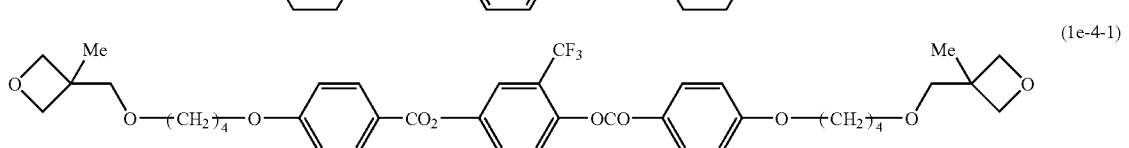
(1e-4-1)
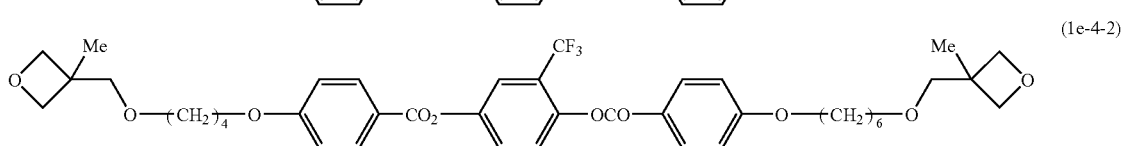
(1e-4-2)
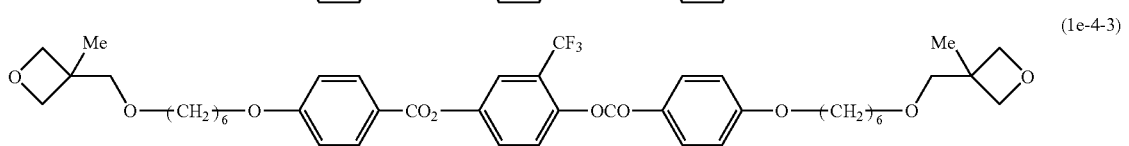
(1e-4-3)
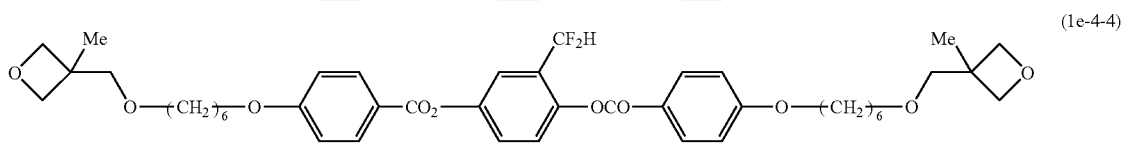
(1e-4-4)

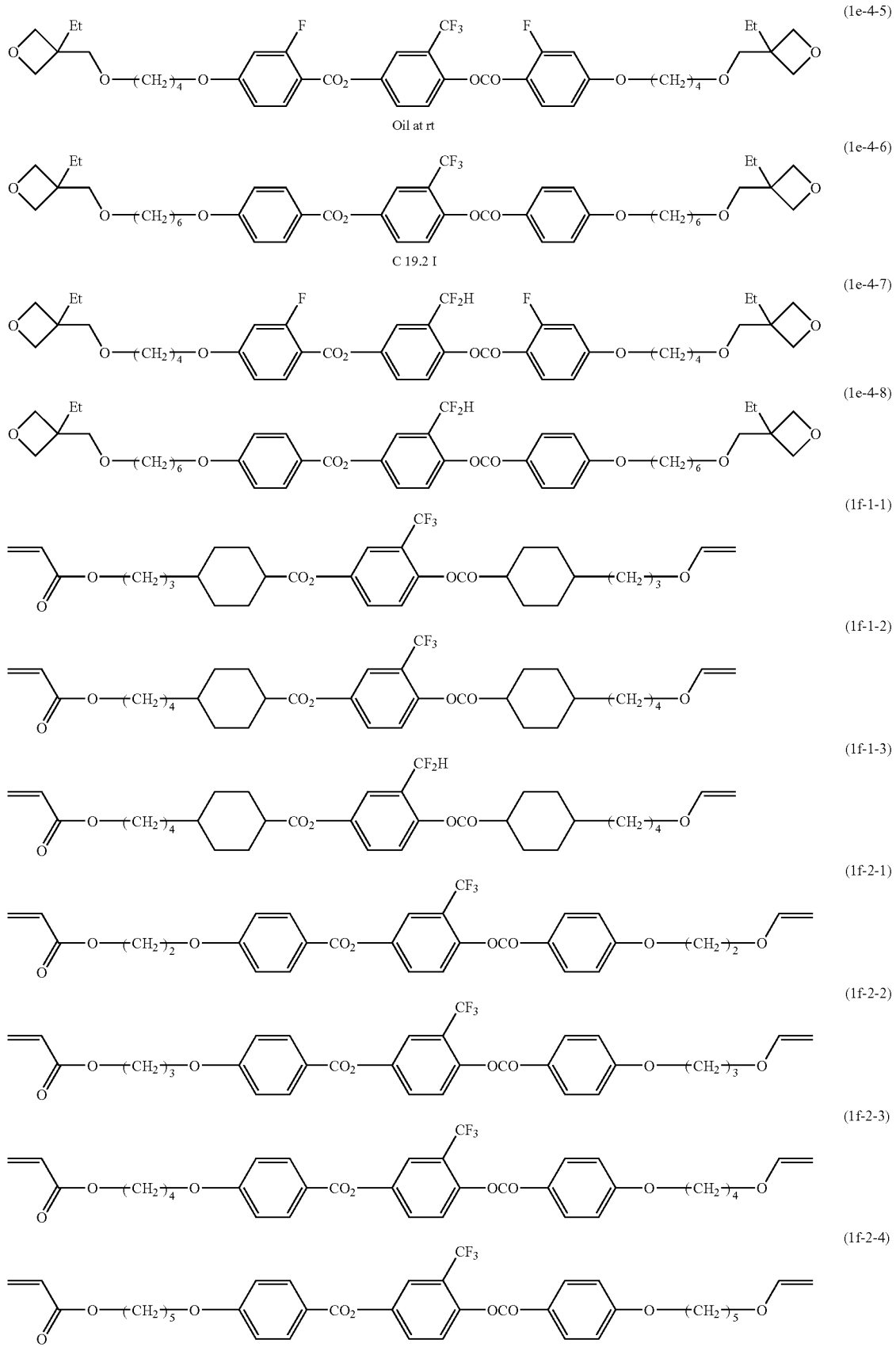

-continued
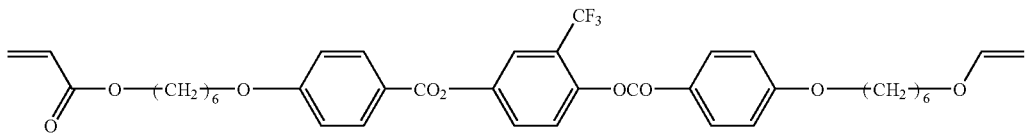
(1f-2-5)
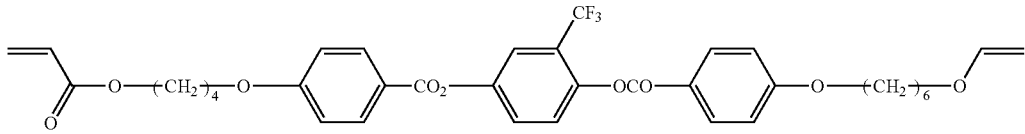
(1f-2-6)
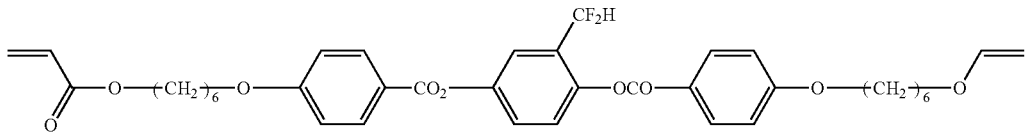
(1f-2-7)
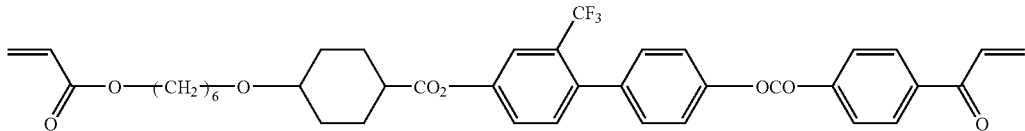
(1f-3-1)
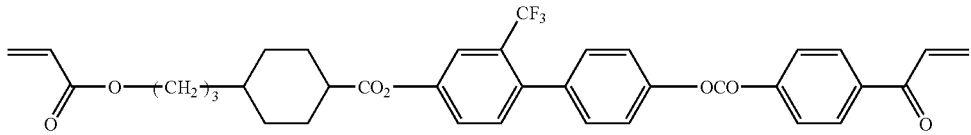
(1f-3-2)
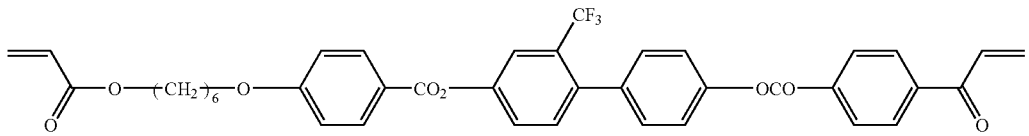
(1f-4-1)
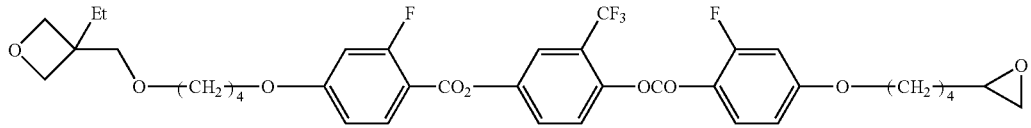
(1g-1)
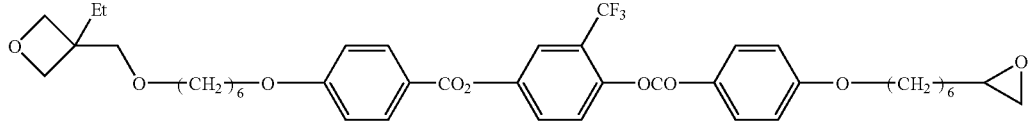
(1g-2)
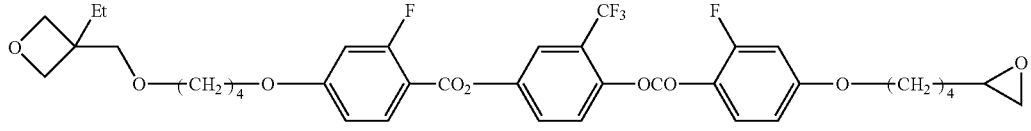
(1g-3)
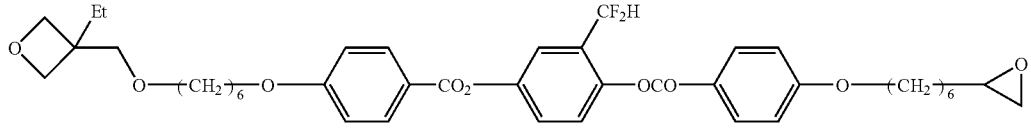
(1g-4)

Example 3

Three parts by weight of the photopolymerization initiator IRGACURE 907 (trade name of Ciba Specialty Chemicals) was added to a composition comprising 80 parts by weight of Compound (1a-2-5) produced in Example 1, 5 parts by weight of 4-(trans-4-propylcyclohexyl)cyanobenzene, 5 parts by weight of 4-(trans-4-pentylcyclohexyl)cyanobenzene, 5 parts by weight of 4-(trans-4-heptylcyclohexyl)cyanobenzene and 5 parts by weight of 4'-(trans-4-heptylcyclohexyl)-4-cyano-1,1'-biphenyl. A polymerizable composition (103 parts by weight) containing this photopolymerization initiator was dissolved in 412 parts by weight of cyclopentanone to prepare a 20 wt % concentration solution. The solution was coated onto a polyimide alignment film-attached glass substrate which had been subjected to rubbing alignment treatment using a bar coater capable of producing an approximately 12 μm wet film thickness. This was placed for 120 seconds onto a hot plate heated to 70° C. for drying of the solvent and alignment of the liquid crystals. A 250 W/cm super-high pressure mercury lamp was used for irradiation of light with an intensity of 30 mW/cm$^2$ (center wavelength: 365 nm) for 20 seconds at room temperature in a nitrogen atmosphere for polymerization. Observation of the optical thin-film obtained in this manner with a polarizing light microscope confirmed that uniform liquid crystal alignment with no alignment defects had been obtained. The retardation value was 135 nm as determined using a Berek compensator. The optical thin-film was then sandwiched between cross Nicol polarizers so that the angle between the rubbing direction and the polarizer absorption axis was 45°, and the state of light transmission was observed on a back light. Observation of the state of light transmission while tilting in the rubbing direction confirmed right-left symmetrical variation around the front face. This suggests that the alignment vector of the liquid crystal backbone of the optical thin-film was approximately parallel to the glass substrate.

Example 4

Compound (1a-2-5) produced in Example 1 (10 mg), azobiscyclohexanecarbonitrile (0.1 mg) and benzene (100 μL) were placed in a glass ampule. The mixture was cooled to −60° C., adequately deaired with a vacuum pump and then sealed. The ampule was heated at 110° C. for 24 hours. The obtained reaction mixture was reprecipitated three times from methanol (15 mL) to obtain a polymer (7.5 mg). The weight-average molecular weight ($M_w$) as measured by GPC was 31,000. The polydispersity (Mw/Mn) was 2.11. The polymer (1.211 mg) was immersed in purified water (1 mL) and allowed to stand for 10 days at 50° C. The polymer was then removed and thoroughly dried, and its weight was measured to be 1.211 mg. This indicates that the moisture absorption of the polymer was low.

Example 5

Five parts by weight of the polymer produced in Example 4 was dissolved in 100 parts by weight of NMP. The solution was applied onto two thoroughly cleaned glass substrates using a spin coater. The glass substrates were heated at 200° C. for 3 hours, and the solvent was removed to form thin films of the polymer on the glass substrates. The surfaces of the polymer thin-films formed on the glass substrates were subjected to rubbing treatment by rubbing in one direction with a roller carrying a rubbing cloth. The two glass plates were attached sandwiching a 10 μm-thick spacer with the polymer thin-films facing each other and with their rubbing directions matched, to fabricate a cell. A liquid crystal composition ZLI-1132 (trade name of Merck & Co., Inc.) was injected into the cell at room temperature. The liquid crystal composition in the liquid crystal cell exhibited uniform homogeneous alignment.

Example 6

Three parts by weight of the photopolymerization initiator IRGACURE 907 (trade name of Chiba Specialty Chemicals) was added to a polymerizable composition comprising 30 parts by weight of Compound (1a-2-5) produced in Example 1, 40 parts by weight of 2,7-bis[4-(6-acryloyloxyhexyloxy)benzoyloxy]-9-methylfluorene (BRM-b-10), and 30 parts by weight of 4-cyano-4'-(6-acryloyloxyhexyloxy)-1,1'-biphenyl (BRM-a-5). A polymerizable composition (103 parts by weight) containing this photopolymerization initiator was dissolved in 309 parts by weight of cyclopentanone to prepare a 25 wt % concentration solution. The solution was coated onto a polyimide alignment film-attached glass substrate which had been subjected to rubbing alignment treatment using a bar coater capable of producing an approximately 12 μm wet film thickness. This was placed for 120 seconds onto a hot plate heated to 70° C. for drying of the solvent and alignment of the liquid crystals. A 250 W super-high pressure mercury lamp was used for irradiation of light with an intensity of 30 mW/cm$^2$ (center wavelength: 365 nm) for 20 seconds at room temperature in a nitrogen atmosphere for polymerization, while heating at 70° C. on the hot plate. Observation of the optical thin-film obtained in this manner with a polarizing light microscope confirmed that uniform liquid crystal alignment with no alignment defects had been obtained. The retardation value was 210 nm as determined using a Berek compensator. The optical thin-film was then sandwiched between cross Nicol polarizers so that the angle between the rubbing direction and the polarizer absorption axis was 45°, and the state of light transmission was observed on a back light. Observation of the state of light transmission while tilting in the rubbing direction confirmed right-left symmetrical variation around the front face. This suggests that the alignment vector of the liquid crystal backbone of the optical thin-film was approximately parallel to the glass substrate.

Example 7

Three parts by weight of the photopolymerization initiator IRGACURE 907 (trade name of Chiba Specialty Chemicals) was added to a polymerizable composition comprising 65 parts by weight of the composition of Example 6 and 35 parts by weight of the optically active Compound (Op-16). A polymerizable composition (103 parts by weight) containing this photopolymerization initiator was dissolved in 206 parts by weight of cyclopentanone to prepare an approximately 33 wt % concentration solution. The solution was coated onto a polyimide alignment film-attached glass substrate which had been subjected to rubbing alignment treatment using a bar coater capable of producing an approximately 12 μm wet film thickness. This was placed for 120 seconds onto a hot plate heated to 65° C. for drying of the solvent and alignment of the liquid crystals. A 250 W super-high pressure mercury lamp was used for irradiation of light with an intensity of 30 mW/cm$^2$ (center wavelength: 365 nm) for 20 seconds in a nitrogen atmosphere for polymerization, while heating at 65° C. on the hot plate. This produced an optical thin-film exhibiting green selective reflection. This suggests that the alignment vector of the liquid crystal backbone of the optical thin-film had a helical structure.

Example 8

Four parts by weight of the photopolymerization initiator IRGACURE 907 (trade name of Ciba Specialty Chemicals) was added to a polymerizable composition comprising 10 parts by weight of Compound (1a-2-5) produced in Example 1, 45 parts by weight of 2,7-bis[4-(6-acryloyloxyhexyloxy)benzoyloxy]-9-methylfluorene (BRM-b-10) and 45 parts by weight of 4-cyano-4'-(6-acryloyloxyhexyloxy)-1,1'-biphenyl (BRM-a-5). A polymerizable composition (104 parts by weight) containing this photopolymerization initiator was dissolved in 416 parts by weight of cyclopentanone to prepare a 20 wt % concentration solution. The solution was coated onto a polyimide alignment film-attached glass substrate which had been subjected to rubbing alignment treatment using a bar coater capable of producing an approximately 12 μm wet film thickness. This was placed for 120 seconds onto a hot plate heated to 70° C. for drying of the solvent and alignment of the liquid crystals. A 250 W super-high pressure mercury lamp was used for irradiation of light with an intensity of 30 mW/cm$^2$ (center wavelength: 365 nm) for 20 seconds in a nitrogen atmosphere for polymerization, while heating at 70° C. on the hot plate. Observation of the optical thin-film obtained in this manner with a polarizing light microscope confirmed that uniform liquid crystal alignment with no alignment defects had been obtained. The retardation value was 60 nm as determined using a Berek compensator. The optical thin-film was then sandwiched between cross Nicol polarizers so that the angle between the rubbing direction and the polarizer absorption axis was 45°, and the state of light transmission was observed on a back light. Observation of the state of light transmission while tilting in the rubbing direction confirmed right-left asymmetrical variation around the front face. This suggests that the alignment vector of the liquid crystal backbone of the optical thin-film was tilted with respect to the glass substrate.

Example 9

Preferred examples of compositions that can be prepared using compounds of formula (1) of the invention are shown below as Composition Examples 1 to 6. All of these compositions yield optical anisotropic materials? media? upon polymerization by UV irradiation. The percentage values shown below are based on weight.

Composition Example 1

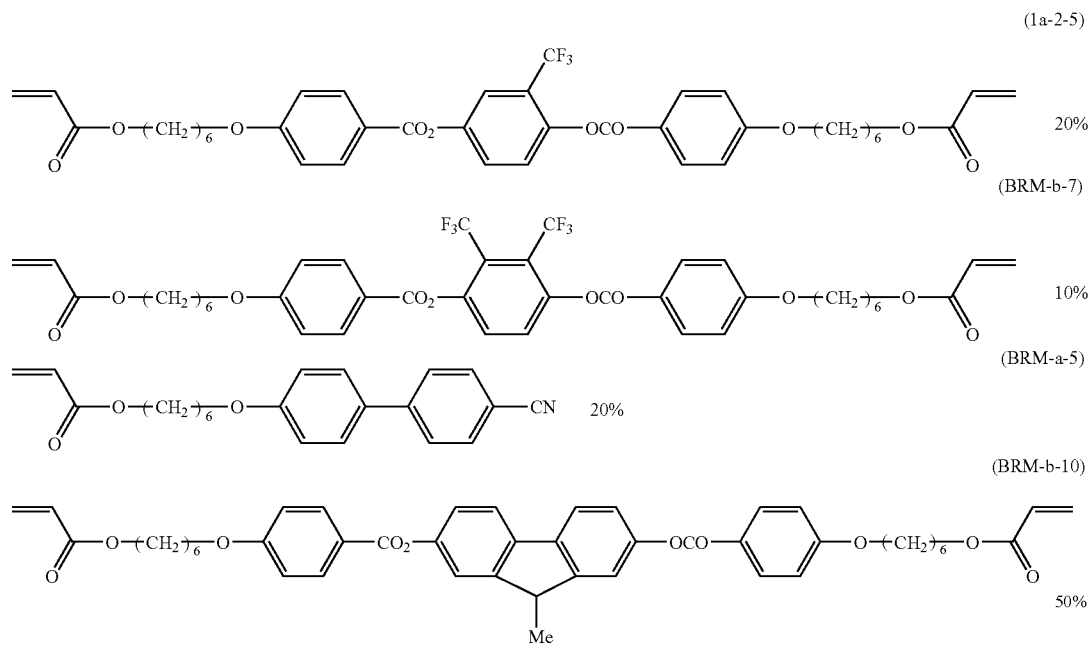

Composition Example 2

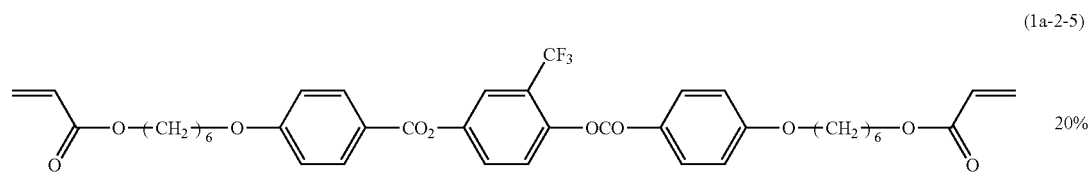

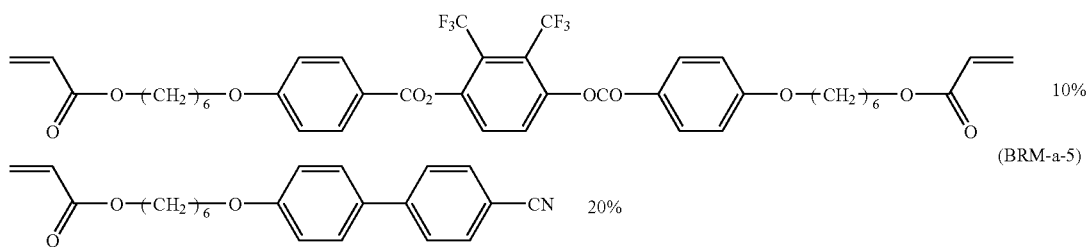
Composition Example 3
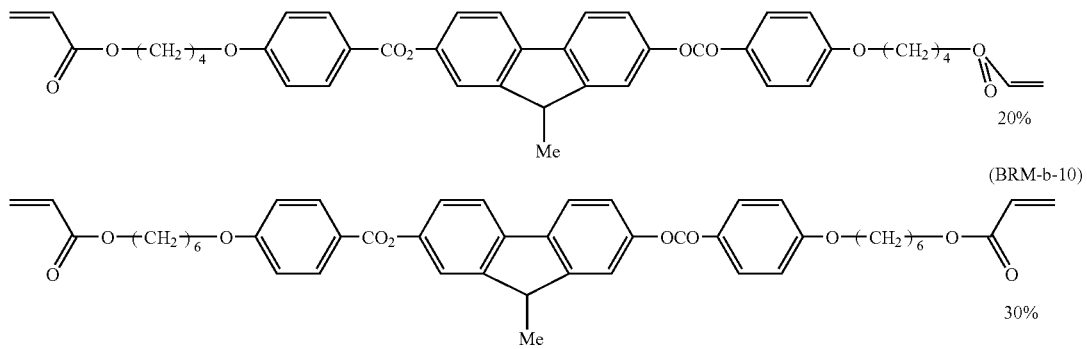
Composition Example 4
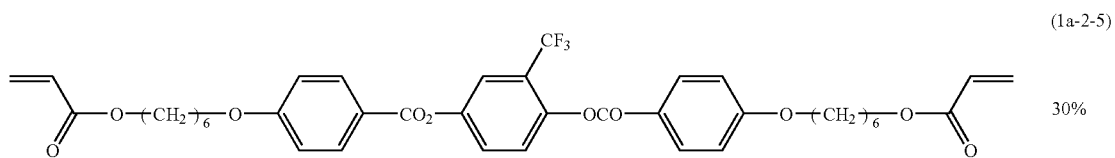

-continued
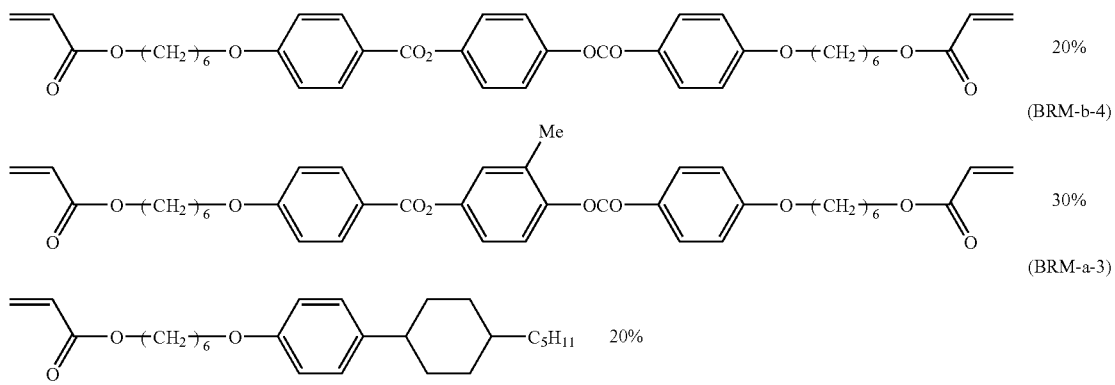
Composition Example 5
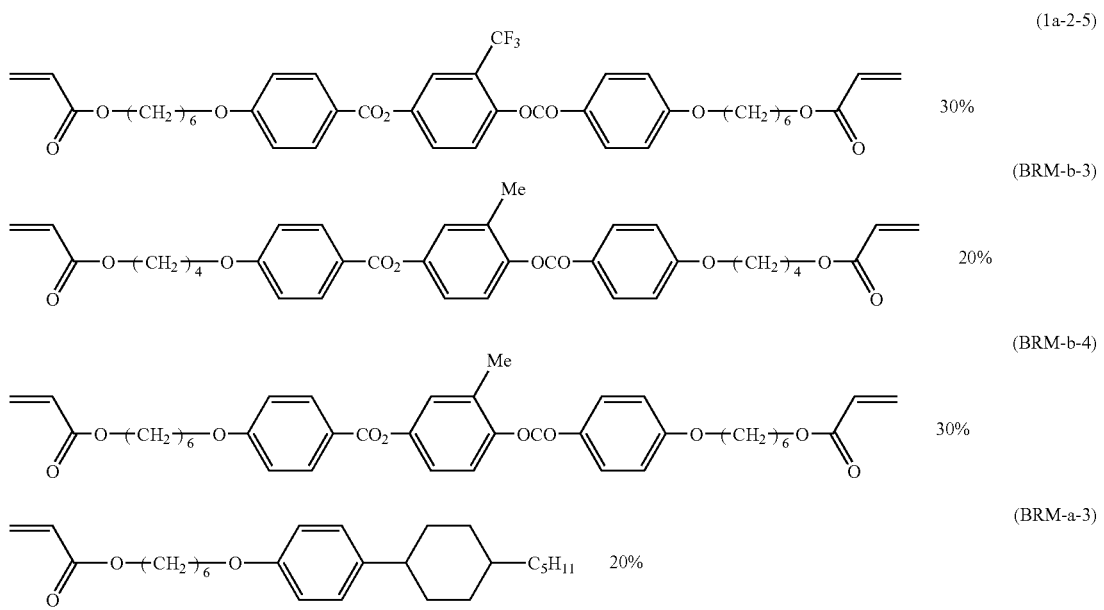
Composition Example 6
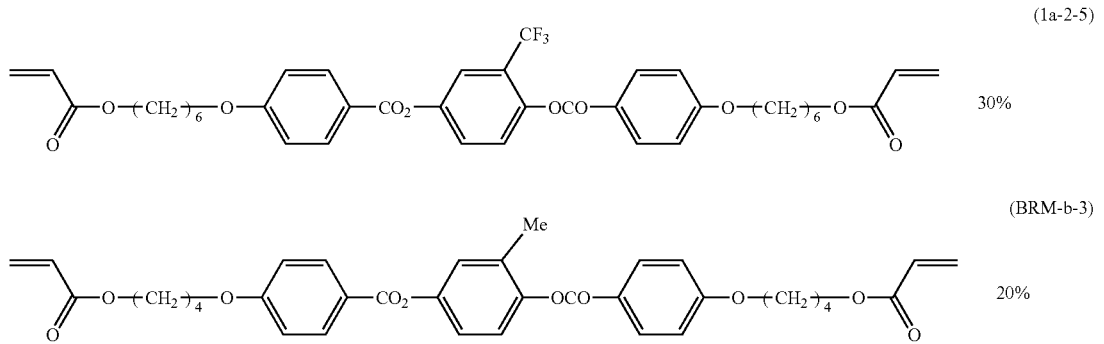

-continued

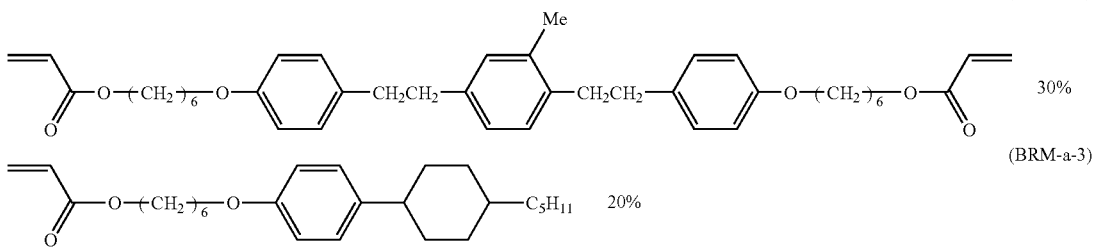

Liquid crystal compounds according to the invention comprising a polymerizable functional group and 2-trifluoromethyl- or 2-difluoromethyl-1,4-phenylene, compositions containing the compounds, and polymers thereof may be utilized in retardation films, polarizing elements, liquid crystal alignment layers, anti-reflection films, selective reflection films and viewing angle compensation films, as components of liquid crystal display elements. The compounds of the invention may also be utilized as adhesives, synthetic polymers with mechanical anisotropy, cosmetics, decorations, nonlinear optical materials and information recording materials.

What is claimed is:

1. A compound represented by the following formula (1):

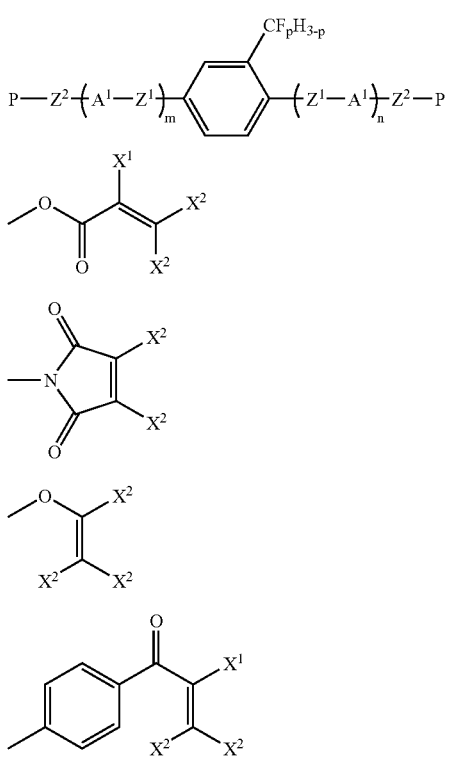

-continued

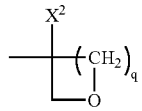

wherein identical symbols in these formulas may have the same structure or they may have independently different structures; each P is independently a polymerizable group of any of formulas (2) to (6) above; each $A^1$ is independently 1,4-cyclohexylene, 1,4-cyclohexenylene, 1,4-phenylene, naphthalene-2,6-diyl, tetrahydronaphthalene-2,6-diyl, fluorene-2,7-diyl, or bicyclo[2.2.2]octane-1,4-diyl, where any —$CH_2$— of these rings is optionally replaced with —O—, any —CH= is optionally replaced with —N=, and any hydrogen is optionally replaced with a halogen, C1–5 alkyl or halogenated alkyl; each $Z^1$ is independently a single bond, —$(CH_2)_2$—, —$(CF_2)_2$—, —$(CH_2)_4$—, —$CH_2O$—, —$OCH_2$—, —COO—, —OCO—, —CH=CH—, —CF=CF—, —C≡C—, —C≡C—COO—, —OCO—C≡C—, —CH=CH—COO—, —OCO—CH=CH—, —$(CH_2)_2$—COO—, —OCO—$(CH_2)_2$—, —C≡C—CH=CH—, —CH=CH—C≡C—, —$OCF_2$—, or —$CF_2O$—; each $Z^2$ is independently a single bond or C1–20 alkylene, where any —$CH_2$— in the alkylene is optionally replaced with —O—, —S—, —COO—, or —OCO—; $X^1$ is hydrogen, a halogen, $CF_3$ or C1–5 alkyl; each $X^2$ is independently hydrogen, a halogen or C1–5 alkyl; m and n are each independently 0, 1 or 2; each p is 2 or 3; each q is 0 or 1; and when at least one $Z^1$ is —C≡C—, P is formula (3), (4) or (5).

2. The compound according to claim 1, wherein each $A^1$ in formula (1) is independently 1,4-cyclohexylene or 1,4-phenylene.

3. The compound according to claim 1, wherein each $A^1$ in formula (1) is independently 1,4-cyclohexylene or 1,4-phenylene, and each $Z^1$ is independently a single bond, —$(CH_2)_2$—, —COO— or —OCO—.

4. The compound according to claim 1 which is represented by any on of the following formulas (1a) to (1e):

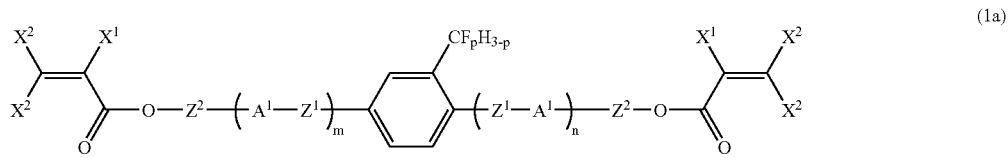

-continued

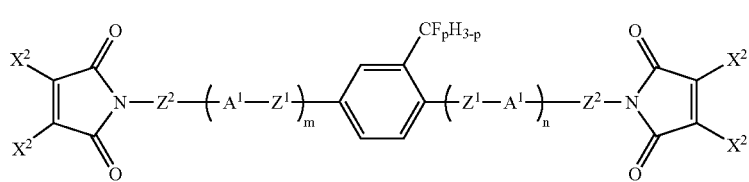
(1b)

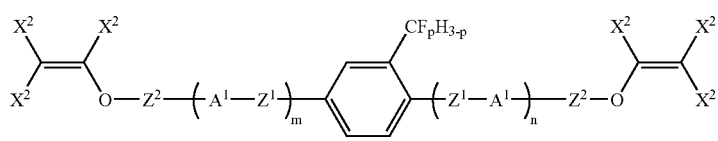
(1c)

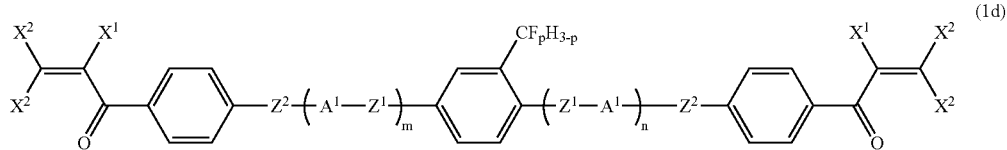
(1d)

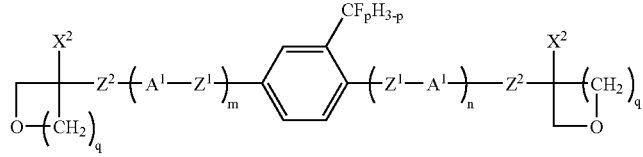
(1e)

wherein $A^1$, $Z^1$, $Z^2$, $X^1$, $X^2$, m, n, p and q are as defined above.

5. The compound according to claim 4, wherein each $A^1$ in formulas (1a) to (1e) is independently 1,4-cyclohexylene or 1,4-phenylene.

6. The Compound according to claim 4, wherein each $A^1$ in formulas (1a) to (1e) is independently 1,4-cyclohexylene or 1,4-phenylene, and each $Z^1$ is independently a single bond, —$(CH_2)_2$—, —COO— or —OCO—.

7. The compound according to claim 4, wherein each $A^1$ in formulas (1a) to (1e) is independently 1,4-cyclohexylene or 1,4-phenylene, and each $Z^1$ is independently —$CH_2O$—, —$OCH_2$—, —CH=CH—COO—, —OCO—CH=CH—, —$(CH_2)_2$—COO— or —OCO—$(CH_2)_2$—.

8. The compound according to claim 4, wherein each $Z^2$ in formulas (1a) to (1e) is independently a single bond, linear C1–20 alkylene, linear C3–20 alkylene having any one of —$CH_2$— optionally replaced with —O—, —S—, —COO— or —OCO—, or linear C4–20 alkylene having any two of —$CH_2$— optionally replaced with —O— or —S—, with the proviso that both —$Z^2$—P and P—$Z^2$— in formula (1) have none of moieties including —O—O—, —O—S—, —S—O— and —S—S—.

9. The compound according to claim 4, wherein each $A^1$ in formulas (1a) to (1e) is independently 1,4-cyclohexylene or 1,4-phenylene, and each $Z^2$ is independently a single bond, linear C1–20 alkylene, linear C3–20 alkylene having any one of —$CH_2$— optionally replaced with —O—, —S—, —COO— or —OCO—, or linear C4–20 alkylene having any two of —$CH_2$— optionally replaced with —O— or —S—, with the proviso that both —$Z^2$—P and P—$Z^2$— in formula (1) have none of moieties including —O—O—, —O—S—, —S—O— and —S—S—.

10. The compound according to claim 4, wherein each $A^1$ in formulas (1a) to (1e) is independently 1,4-cyclohexylene or 1,4-phenylene, and each $Z^1$ is independently a single bond, —$(CH_2)_2$—, —COO—, —OCO—, —$CH_2O$—, —$OCH_2$—, —CH=CH—COO—, —OCO—CH=CH—, —$(CH_2)_2$—COO— or —OCO—$(CH_2)_2$—, and each $Z^2$ is independently a single bond, linear C1–20 alkylene, linear C3–20 alkylene having any one of —$CH_2$— optionally replaced with —O—, —S—, —COO— or —OCO—, or linear C4–20 alkylene having any two of —$CH_2$— optionally replaced with —O— or —S—, with the proviso that both —$Z^2$—P and P—$Z^2$— in formula (1) have none of moieties including —O—O—, —O—S—, —S—O— and —S—S—.

11. The compound according to claim 4, wherein each of $X^1$ and $X^2$ in formulas (1a) to (1e) is independently fluorine or chlorine.

12. The compound according to claim 4, wherein each $A^1$ in formulas (1a) to (1e) is independently 1,4-cyclohexylene or 1,4-phenylene, and each $Z^1$ is independently a single bond, —$(CH_2)_2$—, —COO—, —OCO—, —$CH_2O$—, —$OCH_2$—, —CH=CH—COO—, —OCO—CH=CH—, —$(CH_2)_2$—COO— or —OCO—$(CH_2)_2$—, and each $Z^2$ is independently a single bond, linear C1–20 alkylene, linear C3–20 alkylene having any one of —$CH_2$— optionally replaced with —O—, —S—, —COO— or —OCO—, or linear C4–20 alkylene having any two of —$CH_2$— optionally replaced with —O— or —S—, with the proviso that both —$Z^2$—P and P—$Z^2$— in formula (1) have none of moieties including —O—O—, —O—S—, —S—O— and —S—S—, and each of $X^1$ and $X^2$ is independently fluorine or chlorine.

13. A compound represented by any one of the following formulas:

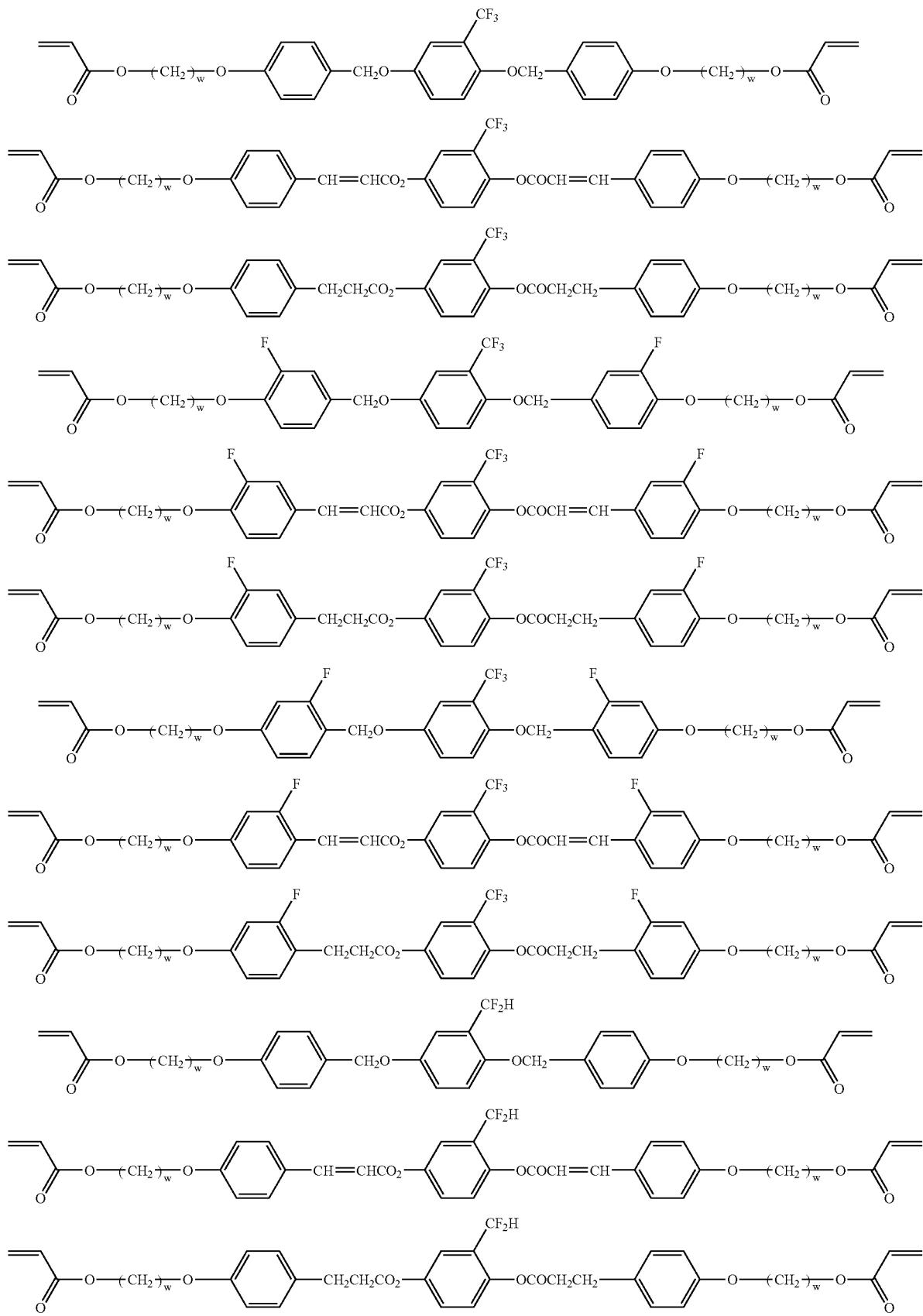

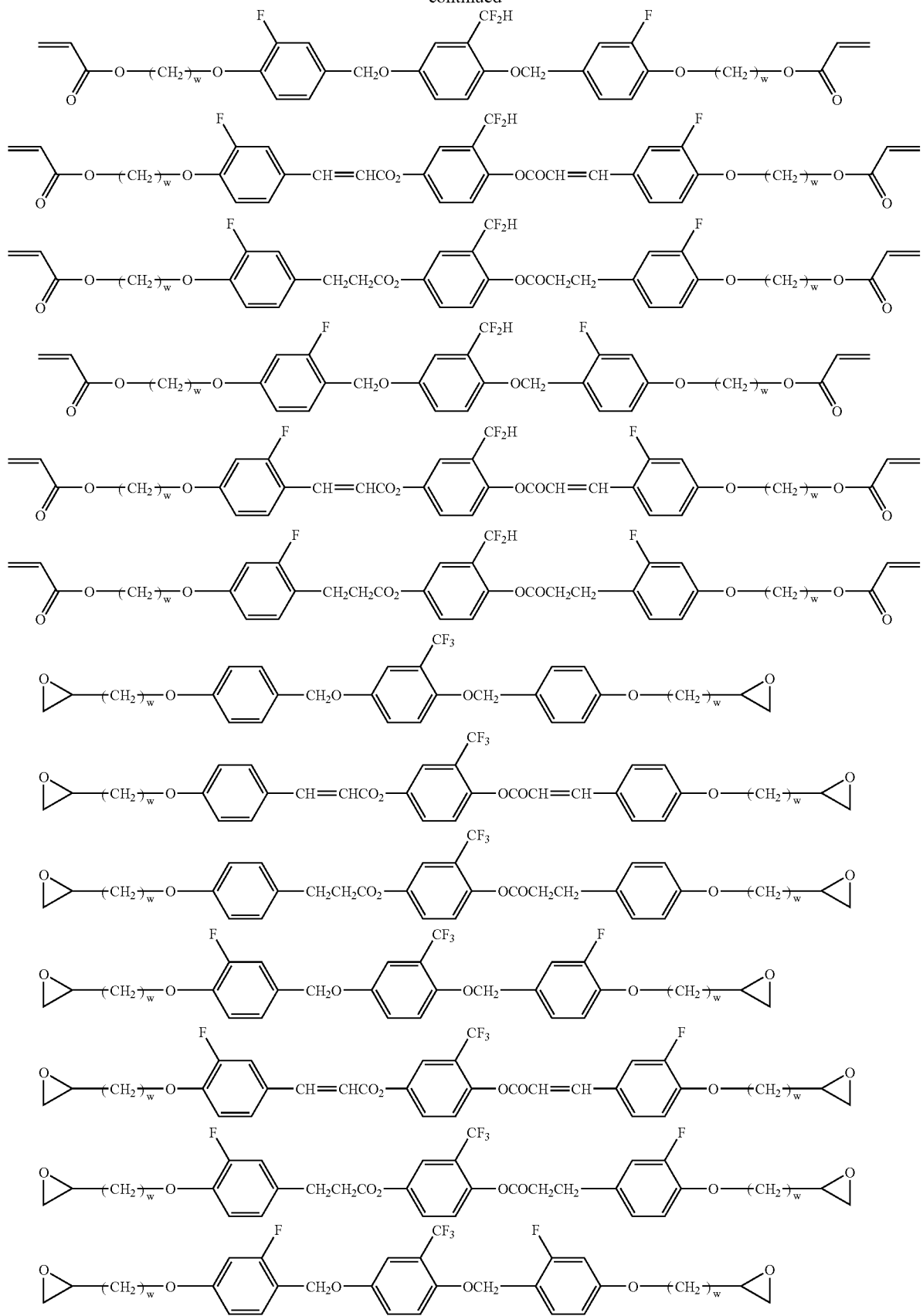

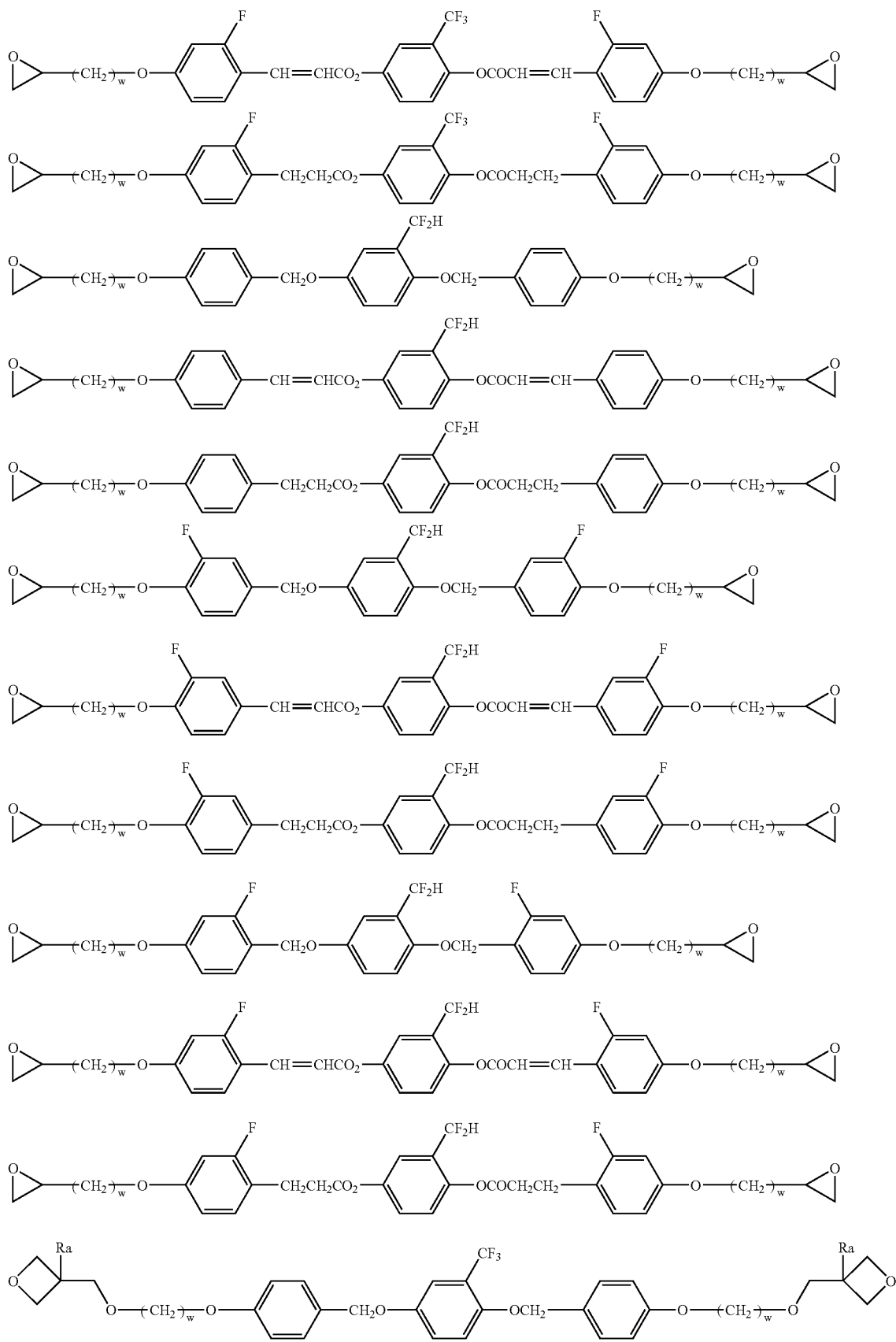

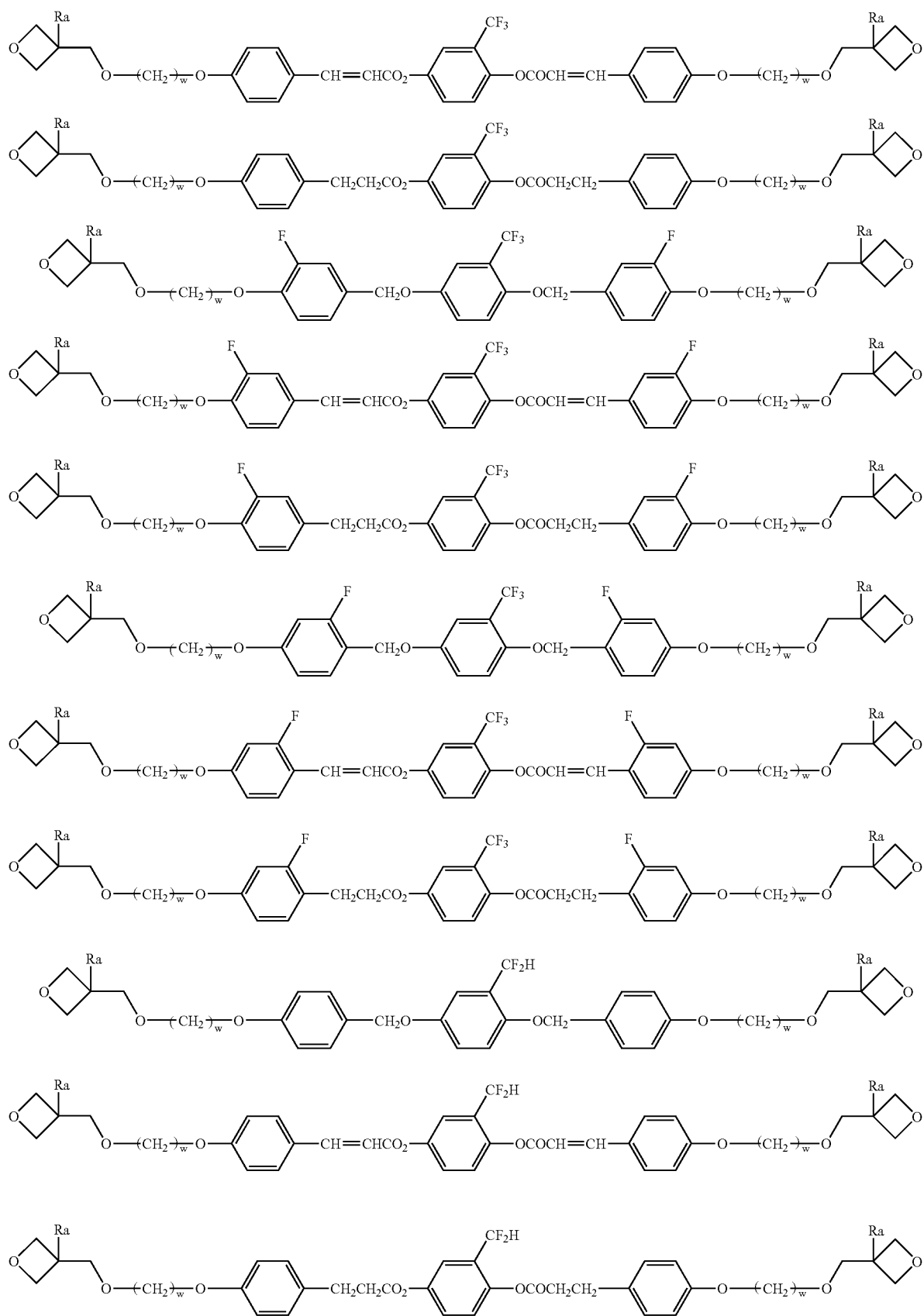

-continued

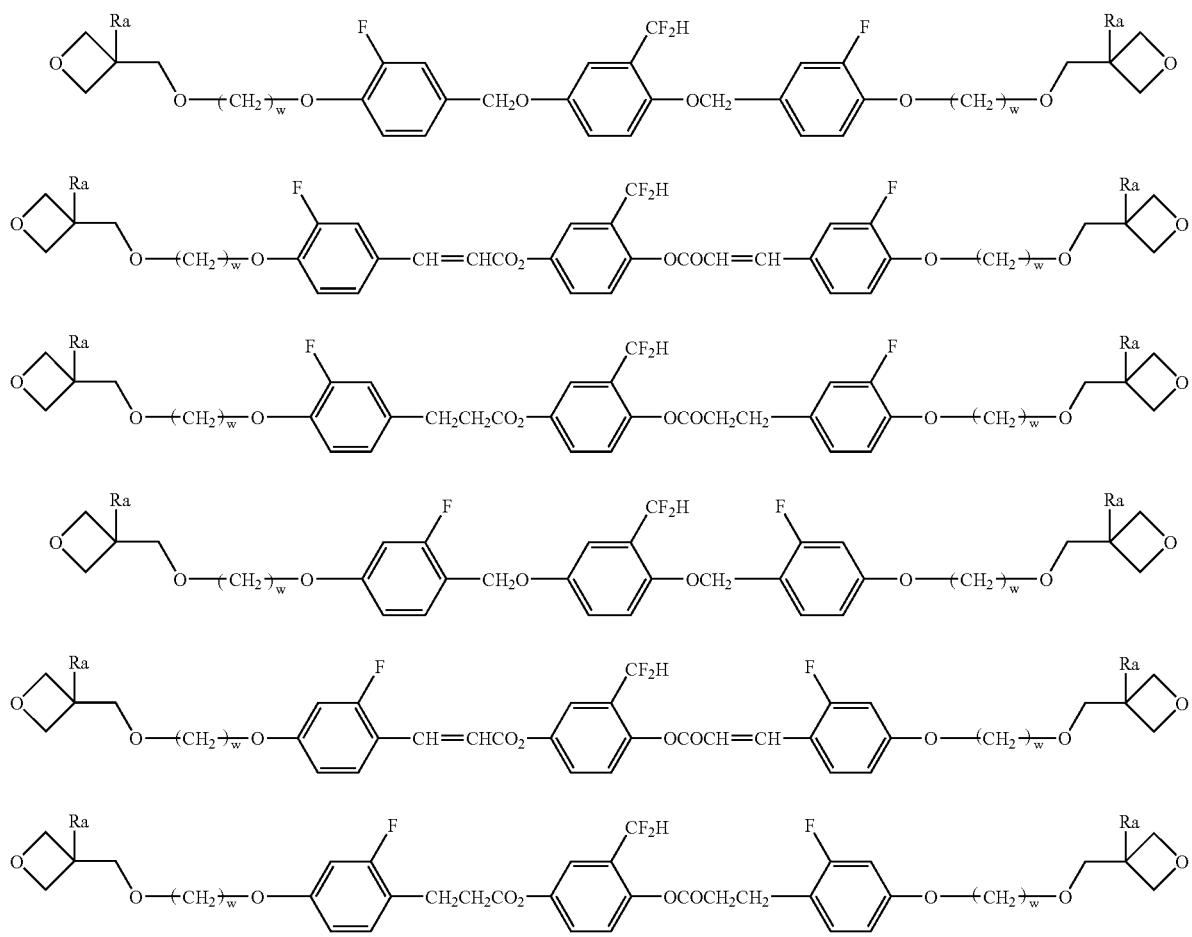

wherein each w is independently an integer of 2 to 8, each Ra independently represents methyl, ethyl or propyl.

14. A liquid crystal composition comprising at least two compounds, wherein at least one of the compounds is the compound according to claim 1.

15. A liquid crystal composition comprising at least two compounds, wherein at least one of the compounds is the compound according to claim 4.

16. A liquid crystal composition comprising at least two compounds, wherein at least one of the compounds is the compound according to claim 12.

17. A liquid crystal composition comprising at least two compounds, wherein at least one of the compounds is the compound according to claim 13.

18. The liquid crystal composition according to claim 14, wherein all of the compounds are polymerizable compounds.

19. The liquid crystal composition according to claim 15, wherein all of the compounds are polymerizable compounds.

20. The liquid crystal composition according to claim 16, wherein all of the compounds are polymerizable compounds.

21. The liquid crystal composition according to claim 17, wherein all of the compounds are polymerizable compounds.

22. A liquid crystal composition which comprises at least two compounds, wherein all of those are polymerizable compounds, and at least one of those is the compound according to claim 1, and further at least one of those is a compound other than said compound.

23. A liquid crystal composition which comprises at least two compounds, wherein all of those are polymerizable compounds, and at least one of those is the compound according to claim 4, and further at least one of those is a compound other than said compound.

24. A liquid crystal composition which comprises at least two compounds, wherein all of those are polymerizable compounds, and at least one of those is the compound according to claim 12, and further at least one of those is a compound other than said compound.

25. A liquid crystal composition which comprises at least two compounds, wherein all of those are polymerizable compounds, and at least one of those is the compound according to claim 13, and further at least one of those is a compound other than said compound.

26. A liquid crystal composition which comprises at least two compounds, wherein all of those are polymerizable compounds, and at least one of those is the compound according to claim 1, and further at least one of those is a compound selected from the group consisting of compounds represented by the following formulas (A), (B) and (C):

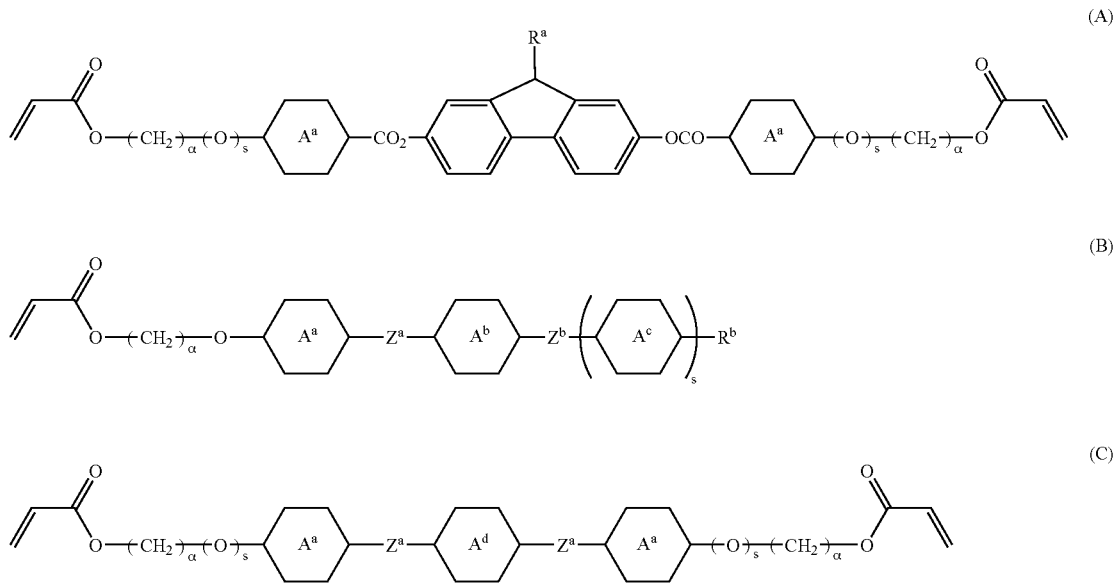

wherein $R^a$ is hydrogen, methyl, ethyl or propyl; $R^b$ is CN, C1–20 alkyl or C1–20 alkoxy; rings $A^a$, $A^b$ and $A^c$ are each independently 1,4-cyclohexylene, 1,4-phenylene or 1,4-phenylene having any hydrogen optionally replaced with fluorine; ring $A^d$ is 1,4-phenylene, 2-methyl-1,4-phenylene or 2,3-bis(trifluoromethyl)-1,4-phenylene; $Z^a$ and $Z^b$ are each independently a single bond, —(CH$_2$)$_2$—, —COO—, or —OCO—; each α is independently an integer of 1–20; and s is 0 or 1.

27. A liquid crystal composition which comprises at least two compounds, wherein all of those are polymerizable compounds, and at least one of those is the compound according to claim 4, and further at least one of those is a compound selected from the group consisting of compounds represented by the following formulas (A), (B) and (C):

wherein $R^a$ is hydrogen, methyl, ethyl or propyl; $R^b$ is CN, C1–20 alkyl or C1–20 alkoxy; rings $A^a$, $A^b$ and $A^c$ are each independently 1,4-cyclohexylene, 1,4-phenylene or 1,4-phenylene having any hydrogen optionally replaced with fluorine; ring $A^d$ is 1,4-phenylene, 2-methyl-1,4-phenylene or 2,3-bis(trifluoromethyl)-1,4-phenylene; $Z^a$ and $Z^b$ are each independently a single bond, —(CH$_2$)$_2$—, —COO—, or —OCO—; each α is independently an integer of 1–20; and s is 0 or 1.

28. A liquid crystal composition which comprises at least two compounds, wherein all of those are polymerizable compounds, and at least one of those is the compound according to claim 12, and further at least one of those is a compound selected from the group consisting of compounds represented by the following formulas (A), (B) and (C).

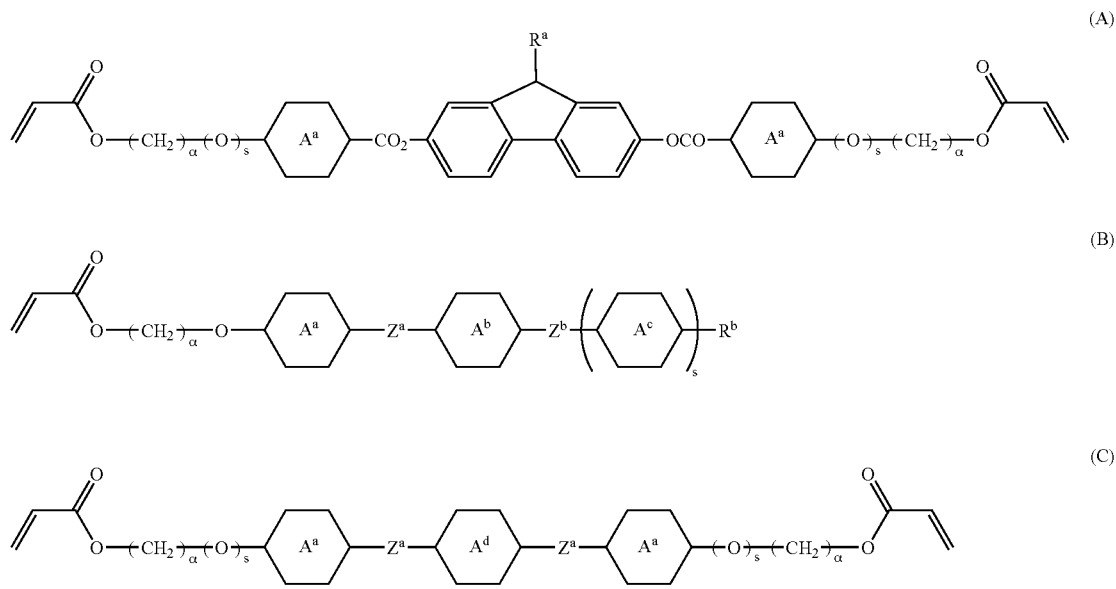

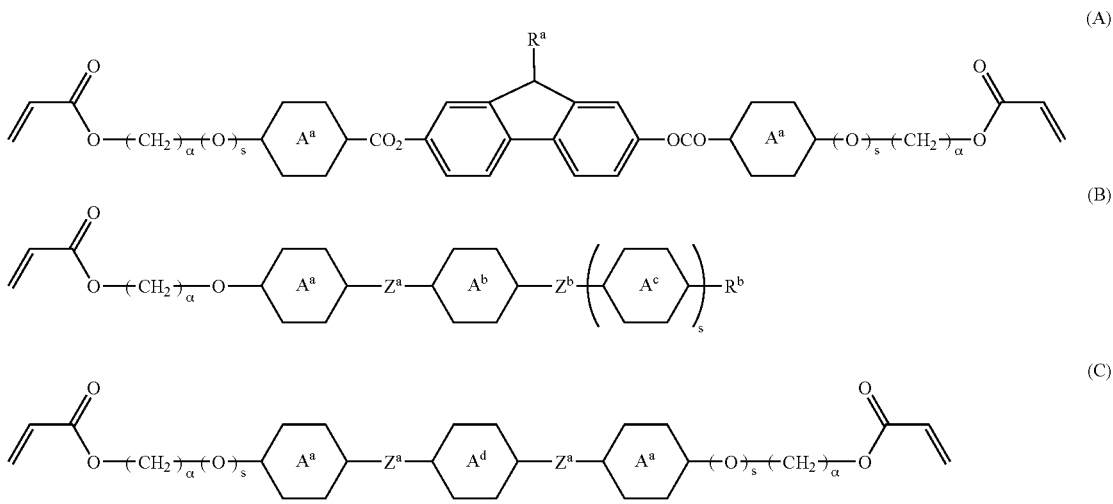

wherein $R^a$ is hydrogen, methyl, ethyl or propyl; $R^b$ is CN, C1–20 alkyl or C1–20 alkoxy; rings $A^a$, $A^b$ and $A^c$ are each independently 1,4-cyclohexylene, 1,4-phenylene or 1,4-phenylene having any hydrogen optionally replaced with fluorine; ring $A^d$ is 1,4-phenylene, 2-methyl-1,4-phenylene or 2,3-bis(trifluoromethyl)-1,4-phenylene; $Z^a$ and $Z^b$ are each independently a single bond, —(CH$_2$)$_2$—, —COO—, or —OCO—; each α is independently an integer of 1–20; and s is 0 or 1.

29. A liquid crystal composition which comprises at least two compounds, wherein all of those are polymerizable compounds, and at least one of those is the compound according to claim 13, and further at least one of those is a compound selected from the group consisting of compounds represented by the following formulas (A), (B) and (C).

30. The liquid crystal composition according to claim 17, wherein the liquid crystal composition further comprises an optically active compound.

31. The liquid crystal composition according to claim 18, wherein the liquid crystal composition further comprises an optically active compound.

32. The liquid crystal composition according to claim 19, wherein the liquid crystal composition further comprises an optically active compound.

33. The liquid crystal composition according to claim 20, wherein the liquid crystal composition further comprises an optically active compound.

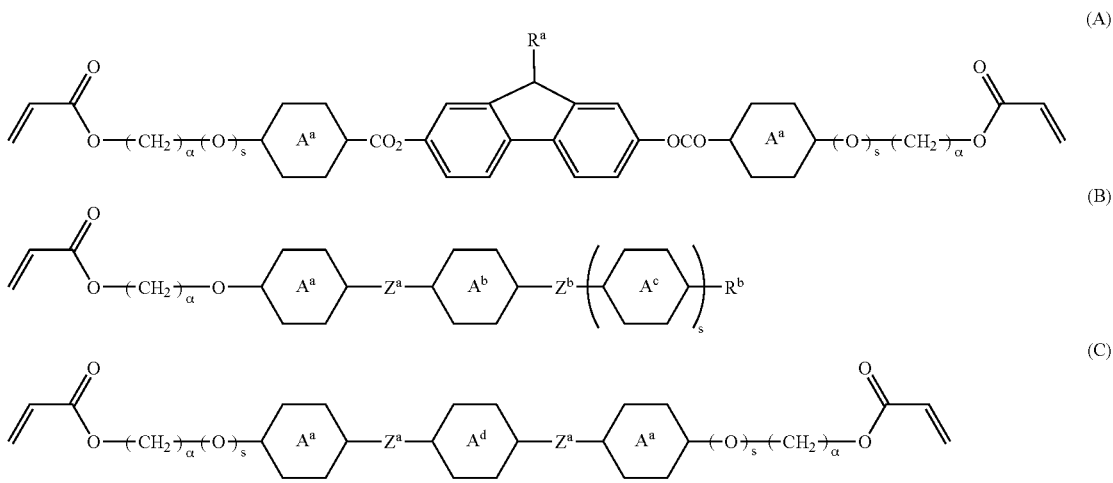

wherein $R^a$ is hydrogen, methyl, ethyl or propyl; $R^b$ is CN, C1–20 alkyl or C1–20 alkoxy; rings $A^a$, $A^b$ and $A^c$ are each independently 1,4-cyclohexylene, 1,4-phenylene or 1,4-phenylene having any hydrogen optionally replaced with fluorine; ring $A^d$ is 1,4-phenylene, 2-methyl-1,4-phenylene or 2,3-bis(trifluoromethyl)-1,4-phenylene; $Z^a$ and $Z^b$ are each 34. The liquid crystal composition according to claim 21, wherein the liquid crystal composition further comprises an optically active compound.

35. The liquid crystal composition according to claim 24, wherein the liquid crystal composition further comprises an optically active compound.

36. The liquid crystal composition according to claim 28, wherein the liquid crystal composition further comprises an optically active compound.

37. A polymer comprising at least one of the constituent units represented by the following formulas (2p) to (6p):

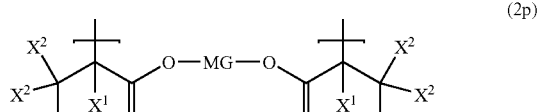
(2p)

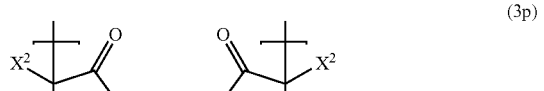
(3p)

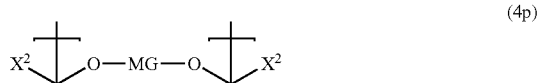
(4p)

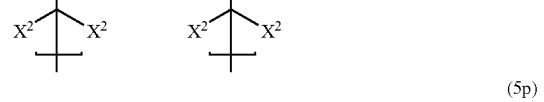
(5p)

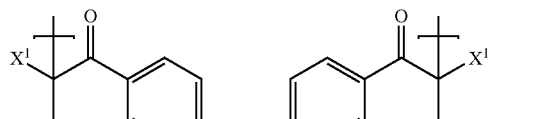
(6p)

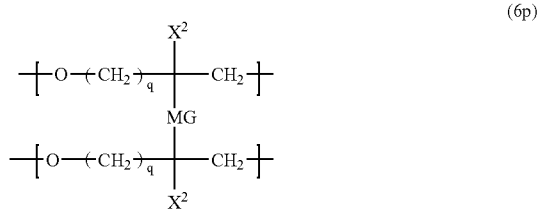
(1p)

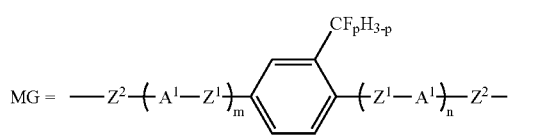

wherein MG represents the mesomorphic residue portion (1p) of formula (1); each $A^1$ is independently 1,4-cyclohexylene, 1,4-cyclohexenylene, 1,4-phenylene, naphthalene-2,6-diyl, tetrahydronaphthalene-2,6-diyl, fluorene-2,7-diyl, or bicyclo[2.2.2]octane-1,4-diyl, where any —$CH_2$— of these rings is optionally replaced with —O—, any —CH= is optionally replaced with —N=, and any hydrogen is optionally replaced with a halogen, C1–5 alkyl or halogenated alkyl; each $Z^1$ is independently a single bond, —$(CH_2)_2$—, —$(CF_2)_2$—, —$(CH_2)_4$—, —$CH_2O$—, —$OCH_2$—, —COO—, —OCO—, —CH=CH—, —CF=CF—, —C≡C—, —C≡C—COO—, —OCO—C≡C—, —CH=CH—COO—, —OCO—CH=CH—, —$(CH_2)_2$—COO—, —OCO—$(CH_2)_2$—, —C≡C—CH=CH—, —CH=CH—C≡C—, —$OCF_2$—, or —$CF_2O$—; each $Z^2$ is independently a single bond or C1–20 alkylene, where any —$CH_2$— in the alkylene is optionally replaced with —O—, —S—, —COO—, or —OCO—; $X^1$ is hydrogen, a halogen, $CF_3$ or C1–5 alkyl; each $X^2$ is independently hydrogen, a halogen or C1–5 alkyl; m and n are each independently 0, 1 or 2; each p is 2 or 3; each q is 0 or 1; with the proviso that $Z^1$ is not —C≡C— in formulas (2p) and (6p).

38. The polymer according to claim 37, wherein each $A^1$ in formula (1p) is independently 1,4-cyclohexylene or 1,4-phenylene, and each $Z^1$ is independently a single bond, —$(CH_2)_2$—, —COO—, —OCO—, —$CH_2O$—, —$OCH_2$—, —CH=CH—COO—, —OCO—CH=CH—, —$(CH_2)_2$—COO— or —OCO—$(CH_2)_2$—, and each $Z^2$ is independently a single bond, linear C1–20 alkylene, linear C3–20 alkylene having any one of —$CH_2$— optionally replaced with —O—, —S—, —COO— or —OCO—, or linear C4–20 alkylene having any two of —$CH_2$—optionally replaced with —O— or —S—, with the proviso that both —$Z^2$—P and P—$Z^2$— in formula (1) have none of moieties including —O—O—, —O—S—, —S—O— and —S—S—.

39. A polymer obtained by polymerization of the composition according to claim 27.

40. The polymer according to claim 39, wherein the weight-average molecular weight is at least 500 and no greater than 500,000.

41. The polymer according to claim 39, wherein the weight-average molecular weight is 500,000 or greater.

42. The polymer according to claim 39, wherein the refractive index is at least 1.35 and no greater than 1.60.

43. A film made of a polymer comprising at least one of the constituent units represented by the following formulas (2p) to (6p):

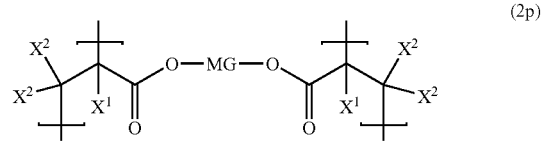
(2p)

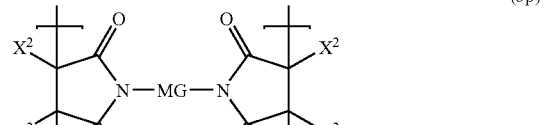
(3p)

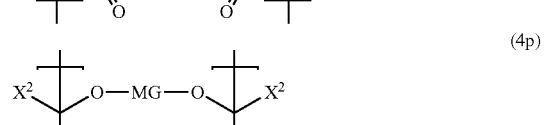
(4p)

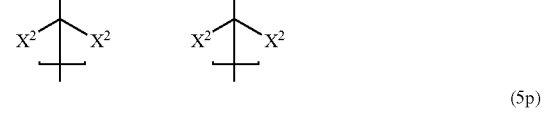
(5p)

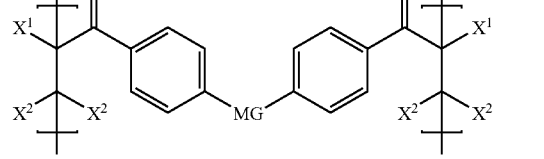

-continued

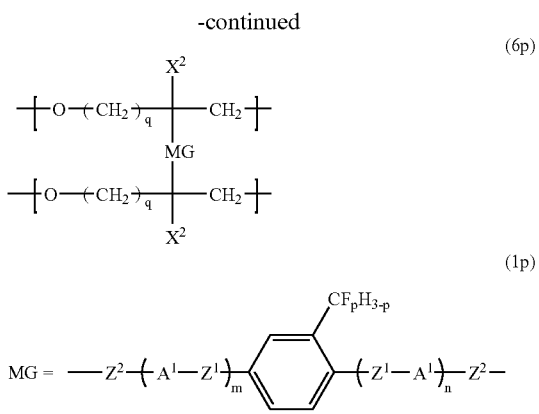

wherein MG represents the mesomorphic residue portion (1p) of formula (1); each $A^1$ is independently 1,4-cyclohexylene, 1,4-cyclohexenylene, 1,4-phenylene, naphthalene-2,6-diyl, tetrahydronaphthalene-2,6-diyl, fluorene-2,7-diyl, or bicyclo[2.2.2]octane-1,4-diyl, where any —$CH_2$— of these rings is optionally replaced with —O—, any —CH= is optionally replaced with —N=, and any hydrogen is optionally replaced with a halogen, C1–5 alkyl or halogenated alkyl; each $Z^1$ is independently a single bond, —$(CH_2)_2$—, —$(CF_2)_2$—, —$(CH_2)_4$—, —$CH_2O$—, —$OCH_2$—, —COO—, —OCO—, —CH=CH—, —CF=CF—, —C≡C—, —C≡C—COO—, —OCO—C≡C—, —CH=CH—COO—, —OCO—CH=CH—, —$(CH_2)_2$—COO—, —OCO—$(CH_2)_2$—, —C≡C—CH=CH—, —CH=CH—C≡C—, —$OCF_2$—, or —$CF_2O$—; each $Z^2$ is independently a single bond or C1–20 alkylene, where any —$CH_2$— in the alkylene is optionally replaced with —O—, —S—, —COO—, or —OCO—; $X^1$ is hydrogen, a halogen, $CF_3$ or C1–5 alkyl; each $X^2$ is independently hydrogen, a halogen or C1–5 alkyl; m and n are each independently 0, 1 or 2; each p is 2 or 3; each q is 0 or 1; with the proviso that $Z^1$ is not —C≡C— in formulas (2p) and (6p).

44. The film according to claim 43, wherein each $A^1$ in formula (1p) is independently 1,4-cyclohexylene or 1,4-phenylene, and each $Z^1$ is independently a single bond, —$(CH_2)_2$—, —COO—, —OCO—, —$CH_2O$—, —$OCH_2$—, —CH=CH—COO—, —OCO—CH=CH—, —$(CH_2)_2$—COO— or —OCO—$(CH_2)_2$—, and each $Z^2$ is independently a single bond, linear C1–20 alkylene, linear C3–20 alkylene having any one of —$CH_2$— optionally replaced with —O—, —S—, —COO— or —OCO—, or linear C4–20 alkylene having any two of —$CH_2$— optionally replaced with —O— or —S—, with the proviso that both —$Z^2$—P and P—$Z^2$— in formula (1) have none of moieties including —O—O—, —O—S—, —S—O— and —S—S—.

45. A ¼ wavelength functional plate employing an optical anisotropic material made of the polymer according to claim 39.

46. A ½ wavelength functional plate employing an optical anisotropic material made of the polymer according to claim 39.

47. An optical anisotropic material comprising the polymer according to claim 39, wherein the liquid crystal backbone in the thin layer of the optical anisotropic material exhibits a hybrid alignment.

48. An optical anisotropic material comprising the polymer according to claim 39, wherein the liquid crystal backbone in the thin layer of the optical anisotropic material exhibits a homogeneous alignment.

49. An optical anisotropic material comprising the polymer according to claim 39, wherein the liquid crystal backbone in the thin layer of the optical anisotropic material exhibits a tilted alignment.

50. An optical anisotropic material comprising the polymer according to claim 39, wherein the liquid crystal backbone in the thin layer of the optical anisotropic material exhibits a homeotropic alignment.

51. An optical anisotropic material comprising the polymer according to claim 39 having a chiral nematic phase or cholesteric phase, wherein the liquid crystal backbone in the thin layer exhibits a helical structure.

52. The optical anisotropic material according to claim 51, which selectively reflects all or a portion of the region of light in a wavelength range of 350–750 nm.

53. The optical anisotropic material according to claim 51, which selectively reflects all or a portion of the region of light in a wavelength range of 100–350 nm.

54. The optical anisotropic material according to claim 51, wherein the pitch of the helical structure induced by the chiral nematic phase or cholesteric phase varies continuously in the direction of thickness of the optical anisotropic material.

55. An optical compensation element comprising the optical anisotropic material according to claim 51.

56. An optical element comprising a combination of the optical anisotropic material according to claim 51 with a polarizing plate.

57. A liquid crystal display element comprising the optical anisotropic material according to claim 51.

* * * * *